(12) United States Patent
Sayre et al.

(10) Patent No.: US 11,842,145 B1
(45) Date of Patent: *Dec. 12, 2023

(54) SYSTEMS, DEVICES, AND METHODS FOR SOFTWARE CODING

(71) Applicant: HITPS LLC, New York, NY (US)

(72) Inventors: Mark Sayre, Springfield, MA (US); Karen Fontaine, Springfield, MA (US); Harish Krishnaswamy, Springfield, MA (US); Sam Elsamman, Springfield, MA (US)

(73) Assignee: HITPS LLC, New York, NY (US)

( * ) Notice: Subject to any disclaimer, the term of this patent is extended or adjusted under 35 U.S.C. 154(b) by 54 days.

This patent is subject to a terminal disclaimer.

(21) Appl. No.: 17/152,380

(22) Filed: Jan. 19, 2021

Related U.S. Application Data

(63) Continuation of application No. 16/685,552, filed on Nov. 15, 2019, now Pat. No. 10,896,288, which is a continuation of application No. 15/863,510, filed on Jan. 5, 2018, now Pat. No. 10,496,737.

(60) Provisional application No. 62/442,784, filed on Jan. 5, 2017.

(51) Int. Cl.
| | |
|---|---|
| *G06F 40/174* | (2020.01) |
| *G06F 16/25* | (2019.01) |
| *G06F 16/583* | (2019.01) |
| *G06F 16/951* | (2019.01) |
| *G06F 16/958* | (2019.01) |
| *G06F 16/901* | (2019.01) |
| *G06F 40/18* | (2020.01) |
| *G06F 40/186* | (2020.01) |
| *G06V 30/41* | (2022.01) |
| *H04L 67/10* | (2022.01) |
| *G06V 30/19* | (2022.01) |

(52) U.S. Cl.
CPC .......... *G06F 40/174* (2020.01); *G06F 16/252* (2019.01); *G06F 16/583* (2019.01); *G06F 16/9024* (2019.01); *G06F 16/951* (2019.01); *G06F 16/986* (2019.01); *G06F 40/18* (2020.01); *G06F 40/186* (2020.01); *G06V 30/41* (2022.01); *G06V 30/19* (2022.01); *H04L 67/10* (2013.01)

(58) Field of Classification Search
None
See application file for complete search history.

(56) References Cited

U.S. PATENT DOCUMENTS

| | | |
|---|---|---|
| 5,416,895 A | 5/1995 | Anderson et al. |
| 5,835,900 A | 11/1998 | Fagg et al. |
| 5,897,642 A | 4/1999 | Capossela et al. |
| 5,983,277 A | 11/1999 | Heile et al. |
| 6,314,415 B1 | 11/2001 | Mukherjee |
| 6,341,292 B1 | 1/2002 | Cho et al. |

(Continued)

*Primary Examiner* — Justin S Lee
(74) *Attorney, Agent, or Firm* — FOLEY & LARDNER LLP

(57) ABSTRACT

Methods and systems described herein allow dynamic rendering of a reflexive questionnaire based on a modifiable spreadsheet for users with little to no programming experience and knowledge. The method and system allow retrieving a spreadsheet to generate a dynamic and reflexive graphical user interface and to pre-populate one or more input elements within the reflexive graphical user interface based on user information retrieved from a disparate data source, where the spreadsheet may be configured for a worksheet inheritance or where the worksheet may be accessed through a check-in/check-out functionality.

20 Claims, 17 Drawing Sheets

(56) References Cited

U.S. PATENT DOCUMENTS

| | | |
|---|---|---|
| 7,379,945 B1 | 5/2008 | Hirsch |
| 7,970,796 B1 | 6/2011 | Narayanan |
| 8,145,990 B2 | 3/2012 | Le Brazidec et al. |
| 9,009,582 B2 | 4/2015 | Rochelle et al. |
| 9,262,384 B2 | 2/2016 | Davis |
| 9,558,170 B2 | 1/2017 | Barrus et al. |
| 9,959,098 B1 | 5/2018 | Smith Devine |
| 9,990,678 B1 | 6/2018 | Cabrera et al. |
| 10,216,494 B2 | 2/2019 | Stachura |
| 10,699,067 B2 | 6/2020 | Hurley et al. |
| 2001/0016839 A1 | 8/2001 | Nichols |
| 2002/0010743 A1 | 1/2002 | Ryan et al. |
| 2002/0062258 A1 | 5/2002 | Bailey et al. |
| 2002/0065846 A1 | 5/2002 | Ogawa et al. |
| 2002/0169799 A1 | 11/2002 | Voshell |
| 2003/0001893 A1 | 1/2003 | Haley |
| 2004/0205524 A1 | 10/2004 | Richter et al. |
| 2004/0268229 A1 | 12/2004 | Paoli et al. |
| 2005/0065933 A1 | 3/2005 | Goering |
| 2005/0081141 A1 | 4/2005 | Jonsson |
| 2005/0182773 A1 | 8/2005 | Feinsmith |
| 2006/0026240 A1 | 2/2006 | Anthony et al. |
| 2006/0026501 A1 | 2/2006 | Anthony et al. |
| 2006/0080665 A1 | 4/2006 | Chavoustie et al. |
| 2006/0206860 A1 | 9/2006 | Dardinski et al. |
| 2007/0050322 A1 | 3/2007 | Vigesaa et al. |
| 2007/0106933 A1 | 5/2007 | Nene et al. |
| 2007/0130503 A1 | 6/2007 | Voshell |
| 2007/0162844 A1 | 7/2007 | Woodall et al. |
| 2007/0233652 A1 | 10/2007 | Chaushev |
| 2007/0233811 A1 | 10/2007 | Rochelle et al. |
| 2007/0250764 A1 | 10/2007 | Jiang |
| 2007/0277090 A1 | 11/2007 | Raja et al. |
| 2008/0065426 A1 | 3/2008 | Ziade et al. |
| 2008/0313595 A1 | 12/2008 | Boulineau et al. |
| 2009/0083614 A1 | 3/2009 | Wedekind |
| 2009/0182763 A1 | 7/2009 | Hawking |
| 2009/0327851 A1 | 12/2009 | Raposo |
| 2010/0217694 A1 | 8/2010 | Knighton |
| 2011/0041140 A1 | 2/2011 | Harm et al. |
| 2012/0011463 A1 | 1/2012 | Payne et al. |
| 2012/0189203 A1 | 7/2012 | Lin et al. |
| 2012/0192050 A1 | 7/2012 | Campbell et al. |
| 2013/0013993 A1 | 1/2013 | Oh |
| 2013/0035947 A1 | 2/2013 | Sundararam et al. |
| 2013/0055060 A1 | 2/2013 | Folsom et al. |
| 2013/0218721 A1 | 8/2013 | Borhan et al. |
| 2014/0074805 A1 | 3/2014 | Kapoor et al. |
| 2014/0173405 A1 | 6/2014 | Ferrara et al. |
| 2014/0310015 A1 | 10/2014 | Goldner |
| 2015/0032478 A1 | 1/2015 | Humpherys |
| 2015/0278183 A1 | 10/2015 | Chang |
| 2016/0026616 A1 | 1/2016 | Vogel |
| 2016/0055374 A1 | 2/2016 | Zhang et al. |
| 2016/0070733 A1 | 3/2016 | Gould et al. |
| 2016/0103564 A1 | 4/2016 | Chao |
| 2016/0125197 A1 | 5/2016 | Winters |
| 2016/0147730 A1 | 5/2016 | Cicerone |
| 2016/0179934 A1 | 6/2016 | Stubley et al. |
| 2017/0035628 A1 | 2/2017 | Naber et al. |
| 2017/0185668 A1 | 6/2017 | Convertino et al. |
| 2017/0286844 A1 | 10/2017 | El Mernissi et al. |
| 2017/0315967 A1 | 11/2017 | Boucher et al. |
| 2017/0357628 A1 | 12/2017 | Hurley et al. |
| 2018/0157468 A1 | 6/2018 | Stachura |
| 2018/0301222 A1 | 10/2018 | Dew et al. |

| Question Number | Appears Based On: (If the question always appears, this will be blank) | Question | Responses Allowed |
|---|---|---|---|
| 1 | | Are you the person being insured? | Yes; No, my spouse; No, my partner or fiance |
| 101 | | Are you the person who will own this policy? | Yes; No, my spouse; No, my partner or fiance |
| Owner – Questions 102 – 191 will only appear if the Owner and Insured are different, these questions refer to the Owner ||||
| 102 | If Q1 is not the same as Q101 | What is your full name? | [open field] |
| 103 | If Q1 is not the same as Q101 | What is your email? | [open field] |
| 104 | If Q1 is not the same as Q101 | What is your date of birth? | [mm/dd/yyyy] |
| 105 | If Q1 is not the same as Q101 | What is your citizenship? | US Citizen & Resident, Other |
| 106 | If Q1 is not the same as Q101 | What is your address? | [Address line 1] [Address line 2] [City] [State] [Zip] |
| 107 | If Q1 is not the same as Q101 | What is your phone? | [xxx-xxx-xxxx] |
| 108 | If Q1 is not the same as Q101 | What is your Social Security Number? | [SSN], I don't have an SSN |
| 109 | If Q108 = I don't have an SSN | What is your Taxpayer Identification Number? | [TIN], I don't have a TIN |
| 191 | If Q1 is not the same as Q101 | If you die, who would you like ownership to be transferred to? | Your Spouse, Your Partner or Fiance, Your estate |
| 201 | | Is the purpose of this policy primarily to protect your family? | Yes; No, it's for other purposes |
| 202 | If Q201 = No | What is your main purpose in buying this policy? | Family Income, Personal, Retirement, Education, Investment, Estate Planning, Business, Other, None, Unknown |
| Insured – The below questions are not duplicate, but refer to the insured, questions 102 – 191 will not appear if Insured and Owner are the same ||||
| 2 | | What is your full name? | [First] [MI] [Last] |
| 3 | | What is your email? | [open field] |
| 10 | | What is your gender? | Male, Female |
| 11 | | What is your height? | [feet] [inches] |
| 12 | | What is your weight? | [pounds] |
| 4 | | What is your date of birth? | [mm/dd/yyyy] |
| 5 | | What is your citizenship? | US Citizen & Resident, Other |
| 6 | | What is your address? | [Address line 1] [Address line 2] [Zip] |
| 7 | | What is your phone number? | Mobile, Home, Other [Number] |
| 8 | | What is your Social Security Number? | [SSN], I don't have an SSN |
| 9 | If Q8 = I don't have an SSN | What is your Taxpayer Identification Number? | [TIN], I don't have a TIN |
| 13 | | What is your driver's license? | [Number] [State of Issue] [Date of Expiration] |
| 14 | | Where were you born? | Country Dropdown |
| 14.01 | If Q14 = United States | Which state? | State Dropdown |
| 14.02 | If Q14 <> United States | Which city and state/province? | [open field] |
| 301 | If Q5 = Other | What is your residency and citizenship status? | US citizen living abroad, Foreign citizen living in the US, Other |

SYSTEMS, DEVICES, AND METHODS FOR SOFTWARE CODING

CROSS-REFERENCE TO RELATED PATENT APPLICATIONS

This patent application is a continuation of U.S. patent application Ser. No. 16/685,552, filed Nov. 15, 2019, which is a continuation of U.S. patent application Ser. No. 15/863,510, filed on Jan. 5, 2018, which claims priority to U.S. Provisional Patent Application No. 62/442,784, filed on Jan. 5, 2017, all of which are hereby incorporated by reference in their entireties for all purposes.

TECHNICAL FIELD

Generally, this disclosure relates to computing. More particularly, this disclosure relates to software coding and dynamic rendering of graphical user interfaces.

BACKGROUND

Data intake forms (e.g., questionnaires) may provide an interactive cellular interface for data intake and processing. Online questionnaires can be locally run or network-based. The questionnaires can contain a single worksheet or a plurality of worksheets, whether related or unrelated to each other in content or form. As the processing power of computers allow for greater computer functionality and the Internet technology era allows for interconnectivity between computing systems, many institutions rely on online questionnaires to receive data from users and potential clients. However, new technical challenges have been identified. For example, conventional software solutions utilize a static method to display data intake questionnaires by rendering the questionnaires based on existing code (e.g., code stored within an internal or an external database). To combat this problem, many existing software solutions have attempted to dynamically render the questionnaires by allowing an employee to update and/or modify the corresponding code. However, this method requires the employees to be familiar with complex coding algorithms; this task has been proven difficult because most employees have little or no software programming knowledge. For example, an employee must be familiar with XML or HTML in order to modify the code and to customize the data intake questionnaire. The technical challenges become more challenging if the network page (displaying the questionnaire) should contain a set of labels and a set of fields, both of which would dynamically change in real-time, whether in content or type, based on a set of user inputs into the set of fields. The technical challenges become even more challenging if the set of labels must precisely match a preexisting content output, such as a paper document or an electronic document. The technical challenges become yet even more challenging if a file should be generated based on the set of user inputs.

Furthermore, many data intake questionnaires are associated with sensitive data, such as medical or personal data. These data intakes questionnaires may be regulated by various state and/or federal laws. For example, several federal and/or state laws require various disclaimers to be displayed based upon a potential client's responses to certain questions. Conventional online questionnaires display all the disclaimers associated with the data intake (whether relevant to the potential client's responses or not). These disclaimers are complicated, wordy, and confusing; therefore, conventional solutions create a negative user experience by "crowding" the graphical user interface provided to the potential clients. Some disclaimers are often unnecessary and not-applicable to all users. However, conventional software solutions usually include all the relevant disclaimers because modifying the code that controls the rendering of the graphical user interface is too burdensome and technically challenging. Moreover, many entities are not willing to risk allowing employees to modify the code because the employees (e.g., field agents) typically do not have proper programming experience and knowledge.

SUMMARY

For the aforementioned reasons, there is a need for an accurate and efficient computer-implemented system and method for dynamically generating and rendering a reflexive online data intake questionnaire or form, which is configured to be modified by a person with a minimal knowledge of programming. For example, as described herein, a server can capture information about a user, generate a form that includes information pre-populated about the user, and dynamically adjusts the form to include only fields relevant to that user.

In an embodiment, a computer-implemented method comprises receiving, by a server, from a first computing device, a first file comprising a spreadsheet, wherein the spreadsheet comprises at least a first row and a second row, wherein the first row comprises a first statement cell comprising a first statement, a first data type cell comprising a first data type identifier, a first logic cell comprising a first logic, and a first field cell comprising a first field identifier, wherein the second row comprises a second statement cell comprising a second statement, a second data type cell comprising a second data type identifier, a second logic cell comprising a second logic, and a second field cell comprising a second field identifier; dynamically rendering, by the server, a graphical user interface configured to be displayed on a second computing device, wherein the graphical user interface comprises a first label and a first input element, wherein the first label comprises the first statement sourced from and corresponding to the first statement cell, wherein the first input element is configured for a first input according to the first data type identifier sourced from and corresponding to the first data type cell; in response to receiving, by the server, the first input from the second computing device: evaluating, by the server, the first input against the first logic, and in response to the first input corresponding to the first logic: dynamically rendering, by the server, a second label and a second input element to be displayed on the graphical user interface, wherein the second label comprises the second statement sourced from and corresponding to the second statement cell, and wherein the second input element is configured for a second input according to the second data type identifier sourced from and corresponding to the second data type cell; and in response to receiving, by the server, the second input: evaluating, by the server, the second input against the second logic, and in response to the second input corresponding to the second logic: generating, by the server, a second file, wherein the server inserts the first input into a first field of the second file based on the first field identifier and inserts the second input into a second field of the second file based on the second field identifier; and transmitting, by the server, the second file comprising the first input and the second input to the first computing device.

In another embodiment, a computer system comprises a server, which is configured to a server configured to: receive, from a first computing device, a first file comprising a spreadsheet, wherein the spreadsheet comprises at least a first row and a second row, wherein the first row comprises a first statement cell comprising a first statement, a first data type cell comprising a first data type identifier, a first logic cell comprising a first logic, and a first field cell comprising a first field identifier, wherein the second row comprises a second statement cell comprising a second statement, a second data type cell comprising a second data type identifier, a second logic cell comprising a second logic, and a second field cell comprising a second field identifier; dynamically render a graphical user interface configured to be displayed on a second computing device, wherein the graphical user interface comprises a first label and a first input element, wherein the first label comprises the first statement sourced from and corresponding to the first statement cell, wherein the first input element is configured for a first input according to the first data type identifier sourced from and corresponding to the first data type cell; in response to receiving the first input from the second computing device: evaluate the first input against the first logic, and in response to the first input corresponding to the first logic: dynamically render a second label and a second input element to be displayed on the graphical user interface, wherein the second label comprises the second statement sourced from and corresponding to the second statement cell, and wherein the second input element is configured for a second input according to the second data type identifier sourced from and corresponding to the second data type cell; and in response to receiving the second input: evaluate the second input against the second logic, and in response to the second input corresponding to the second logic: generate a second file, wherein the server inserts the first input into a first field of the second file based on the first field identifier and inserts the second input into a second field of the second file based on the second field identifier; and transmit the second file comprising the first input and the second input to the first computing device.

In another embodiment, a computer-implemented method comprises receiving, by a server, from a first computing device, a rendering request comprising a request to render a graphical user interface displayed on a second computing device; querying, by the server, a database to retrieve a spreadsheet associated with the graphical user interface, wherein the spreadsheet comprises at least a first row and a second row, wherein the first row comprises a first statement cell comprising a first statement, a first data type cell comprising a first data type identifier, a first logic cell comprising a first logic, and a first field cell comprising a first field identifier, wherein the second row comprises a second statement cell comprising a second statement, a second data type cell comprising a second data type identifier, a second logic cell comprising a second logic, and a second field cell comprising a second field identifier; upon retrieving the spreadsheet, dynamically rendering, by the server, the graphical user interface on the second computing device, wherein the graphical user interface comprises a first label and a first input element, wherein the first label comprises the first statement sourced from and corresponding to the first statement cell, wherein the first input element is configured for a first input according to the first data type identifier sourced from and corresponding to the first data type cell; upon displaying the first label, receiving, by the server, a first input from the second computing device; in response to receiving the first input: evaluating, by the server, the first input against the first logic, and in response to the first input corresponding to the first logic: dynamically rendering, by the server, a second label and a second input element to be displayed on the graphical user interface, wherein the second label comprises the second statement sourced from and corresponding to the second statement cell, and wherein the second input element is configured for a second input according to the second data type identifier sourced from and corresponding to the second data type cell; and in response to receiving, by the server, the second input: evaluating, by the server, the second input against the second logic.

In another embodiment, a computer system comprises a server, which is configured to: receive from a first computing device, a rendering request comprising a request to render a graphical user interface displayed on a second computing device; query a database to retrieve a spreadsheet associated with the graphical user interface, wherein the spreadsheet comprises at least a first row and a second row, wherein the first row comprises a first statement cell comprising a first statement, a first data type cell comprising a first data type identifier, a first logic cell comprising a first logic, and a first field cell comprising a first field identifier, wherein the second row comprises a second statement cell comprising a second statement, a second data type cell comprising a second data type identifier, a second logic cell comprising a second logic, and a second field cell comprising a second field identifier; upon retrieving the spreadsheet, dynamically render the graphical user interface on the second computing device, wherein the graphical user interface comprises a first label and a first input element, wherein the first label comprises the first statement sourced from and corresponding to the first statement cell, wherein the first input element is configured for a first input according to the first data type identifier sourced from and corresponding to the first data type cell; upon displaying the first label, receive a first input from the second computing device; in response to receiving the first input: evaluate the first input against the first logic, and in response to the first input corresponding to the first logic: dynamically render a second label and a second input element to be displayed on the graphical user interface, wherein the second label comprises the second statement sourced from and corresponding to the second statement cell, and wherein the second input element is configured for a second input according to the second data type identifier sourced from and corresponding to the second data type cell; and in response to receiving the second input: evaluate the second input against the second logic.

In another embodiment, a computer-implemented method comprises retrieving, by a server, a file comprising a spreadsheet, wherein the spreadsheet comprises at least a parent worksheet, wherein the parent worksheet comprises a first row, wherein the first row comprises a first statement cell comprising a first statement, a first data type cell comprising a first data type identifier, and a first logic cell comprising a first logic; in response to receiving, by the server, a rendering request from a first client computing device, generating, by the server, a child worksheet in the spreadsheet, wherein the child worksheet comprises a second row, wherein the second row inherits the first row such that the second row comprises a second statement cell corresponding to the first statement, a second data type cell corresponding to the first data type identifier, and a second logic cell corresponding to the first logic; receiving, by the server, from the first client computing device, a modification request to modify at least one of the first statement in the second statement cell, the first data type identifier in the second data type cell, and the first logic in the second logic cell, wherein the modification request comprises a modification input; modifying, by the server, at least one of the first statement in the second statement cell, the first data type identifier in the second data type cell, or the first logic in the second logic cell in the child worksheet based on the modification input; upon modifying the child worksheet, rendering, by the server, on a second client computing device, a graphical user interface corresponding to the modified child worksheet In another embodiment, a computer system comprises a server, which is configured to retrieve a file comprising a spreadsheet, wherein the spreadsheet comprises at least a parent worksheet, wherein the parent worksheet comprises a first row, wherein the first row comprises a first statement cell comprising a first statement, a first data type cell comprising a first data type identifier, and a first logic cell comprising a first logic; in response to receiving a rendering request from a first client computing device, generate a child worksheet in the spreadsheet, wherein the child worksheet comprises a second row, wherein the second row inherits the first row such that the second row comprises a second statement cell corresponding to the first statement, a second data type cell corresponding to the first data type identifier, and a second logic cell corresponding to the first logic; receive from the first client computing device, a modification request to modify at least one of the first statement in the second statement cell, the first data type identifier in the second data type cell, and the first logic in the second logic cell, wherein the modification request comprises a modification input; modify at least one of the first statement in the second statement cell, the first data type identifier in the second data type cell, or the first logic in the second logic cell in the child worksheet based on the modification input; upon modifying the child worksheet, render on a second client computing device, a graphical user interface corresponding to the modified child worksheet.

In another embodiment, a computer-implemented method comprises displaying, by a server, a first graphical user interface to a first client, wherein the first graphical user interface comprises a check-out element configured for a check-out input related to a file and a check-in element configured for a check-in input related to the file, wherein the file comprises at least one spreadsheet, wherein the spreadsheet comprises at least one row, wherein the at least one row comprises a statement cell comprising a statement, a data type cell comprising a data type identifier, and a logic cell comprising a logic; in response to receiving, by the server, the check-out input from the first client, checking-out, by the server, the file such that the file cannot be modified by a second client until the server receives the check-in input from the first client; receiving, by the sever, from the first client, a write request associated with the checked-out file and a write input associated with the write request; modifying, by the server, at least one of the statement, the data type identifier, or the logic based on the write request and the write input from the first client; in response to receiving, by the server, the check-in input from the first client after the modification, checking-in, by the server, the file such that the file can be modified by the second client; generating, by the server, a set of rendering instructions corresponding to a second graphical user interface based on the spreadsheet such that the second graphical user interface comprises a label and an input element, wherein the label comprises the statement as modified, wherein the input element is configured for an input based on the data type identifier as modified; and transmitting, by the server, the set of rendering instructions to a computing device associated with a third client, whereby the set of rendering instructions causes the computing device associated with the third client to display the second graphical user interface.

In another embodiment, a computer system comprises a server, which is configured to display a first graphical user interface to a first client, wherein the first graphical user interface comprises a check-out element configured for a check-out input related to a file and a check-in element configured for a check-in input related to the file, wherein the file comprises at least one spreadsheet, wherein the spreadsheet comprises at least one row, wherein the at least one row comprises a statement cell comprising a statement, a data type cell comprising a data type identifier, and a logic cell comprising a logic; in response to receiving the check-out input from the first client, check-out the file such that the file cannot be modified by a second client until the server receives the check-in input from the first client; receive from the first client, a write request associated with the checked-out file and a write input associated with the write request; modify at least one of the statement, the data type identifier, or the logic based on the write request and the write input from the first client; in response to receiving the check-in input from the first client after the modification, check-in the file such that the file can be modified by the second client; generate a set of rendering instructions corresponding to a second graphical user interface based on the spreadsheet such that the second graphical user interface comprises a label and an input element, wherein the label comprises the statement as modified, wherein the input element is configured for an input based on the data type identifier as modified; and transmit the set of rendering instructions to a computing device associated with a third client, whereby the set of rendering instructions causes the computing device associated with the third client to display the second graphical user interface.

In another embodiment, a method comprises receiving, by a server via a computing device, a rendering request comprising a request to render a graphical user interface to be displayed on the computing device; querying, by the server, a first database to retrieve a spreadsheet associated with the graphical user interface, the spreadsheet comprising at least a first row and a second row, the first row comprising a first statement cell comprising a first statement, a first data type cell comprising a first data type identifier, and a first logic cell comprising a first logic, the second row comprising a second statement cell comprising a second statement, a second data type cell comprising a second data type identifier, and a second logic cell comprising a second logic; receiving, by the server, an image from a user operating the computing device; performing, by the server, optical character recognition to parse and extract identification data from the image; upon extracting identification data from the image, querying, by the server, a second database based on the identification data to retrieve user information corresponding to the user operating the computing device; upon retrieving user information, dynamically rendering, by the server, the graphical user interface comprising a first label and a first input element on the computing device, the first label comprising the first statement sourced from and corresponding to the first statement cell, wherein the first input element corresponds to the first data type identifier and the first data type cell, wherein the first input element is pre-populated with at least one of the identification data and user information retrieved from the second database; and evaluating, by the server, the first input element against the first logic, when the first input corresponds to the first logic, dynamically rendering, by the server, the graphical user interface for display of a second label, a second input element, a third label, and a third input element corresponding to a second data type identifier, a second data type cell, a third data type identifier, and a third data type cell in the spreadsheet respectively, wherein the second label and the second input element correspond to the pre-populated data of the first input element; and when the first input does not correspond to the first logic, dynamically rendering, by the server, the graphical user interface for display of the third label and the third input element while not displaying the second label or the second input element.

In yet another embodiment, a computer system comprises a computing device configured to request a graphical user interface to be displayed on the computing device, which is operated by a user; a plurality of databases including at least a first database and a second database, the first database configured to store a spreadsheet and the second database configured to store user information corresponding to the user operating the computing device, the spreadsheet comprising at least a first row and a second row, the first row comprising a first statement cell comprising a first statement, a first data type cell comprising a first data type identifier, and a first logic cell comprising a first logic, the second row comprising a second statement cell comprising a second statement, a second data type cell comprising a second data type identifier, and a second logic cell comprising a second logic; and a server in communication with the plurality of computing devices and the plurality of databases, wherein the server is configured to: receive, via the computing device, a rendering request comprising a request to render a graphical user interface to be displayed on the computing device; query a first database to retrieve a spreadsheet associated with the graphical user interface, the spreadsheet comprising at least a first row and a second row, the first row comprising a first statement cell comprising a first statement, a first data type cell comprising a first data type identifier, and a first logic cell comprising a first logic, the second row comprising a second statement cell comprising a second statement, a second data type cell comprising a second data type identifier, and a second logic cell comprising a second logic; receive an image from a user operating the computing device; perform optical character recognition to parse and extract identification data from the image; upon extracting identification data from the image, query a second database based on the identification data to retrieve user information corresponding to the user operating the computing device; upon retrieving user information, dynamically render the graphical user interface comprising a first label and a first input element on the computing device, the first label comprising the first statement sourced from and corresponding to the first statement cell, wherein the first input element corresponds to the first data type identifier and the first data type cell, wherein the first input element is pre-populated with at least one of the identification data and user information retrieved from the second database; evaluate the first input element against the first logic, when the first input corresponds to the first logic, dynamically rendering, by the server, the graphical user interface for display of a second label, a second input element, a third label, and a third input element corresponding to a second data type identifier, a second data type cell, a third data type identifier, and a third data type cell in the spreadsheet respectively, wherein the second label and the second input element correspond to pre-populated data of the first input element; and when the first input does not correspond to the first logic, dynamically rendering, by the server, the graphical user interface for display of the third label and the third input element while not displaying the second label or the second input element.

Additional features and advantages of various embodiments are set forth in a detailed description that follows.

Various objectives and other advantages of this disclosure are realized and attained by various structures particularly pointed out in various exemplary embodiments in the detailed description and claims hereof as well as in a set of appended drawings. Note that the detailed description is exemplary and explanatory and is intended to provide further explanation of this disclosure as claimed. This disclosure at least partially addresses at least one of the above challenges. However, this disclosure can prove useful to other technical areas. Therefore, at least some claims should not be construed as necessarily limited to addressing any of the above challenges.

BRIEF DESCRIPTION OF DRAWINGS

The accompanying drawings constitute a part of this specification and illustrate an embodiment of the present disclosure and together with the specification, explain the present disclosure.

FIGS. 7A-B show a screenshot of an embodiment of a spreadsheet containing a parent worksheet being active for data input as selected via a parent worksheet tab and a child worksheet being inactive for data input as not selected via a child worksheet tab according to an embodiment.

FIG. 8A shows a screenshot of an embodiment of a spreadsheet containing a parent worksheet being inactive for data input as not selected via a parent worksheet tab and a child worksheet being active for data input as selected via a child worksheet tab according to an embodiment.

FIG. 9 shows a screenshot of an embodiment of a single network page generated based on a spreadsheet according to an embodiment.

FIG. 10 shows an embodiment of a table of reflexive questions and rules, where the reflexive questions appear in a dynamically adjusted network page based on the rules, where the rules determine when a question will or will not be asked according to the present disclosure.

DETAILED DESCRIPTION

This disclosure more fully references to the accompanying drawings, in which various embodiments of this disclosure are shown. This disclosure may, however, be embodied in many different forms and should not be construed as necessarily being limited to the embodiments disclosed herein. Rather, these embodiments are provided so that the present disclosure is thorough and complete, and fully conveys the concepts of the present disclosure to those skilled in the relevant art.

As described herein, various disclosed technologies can be implemented via a plurality of computers (servers/clients) utilizing a plurality of data structures/messages. Such implementations include data structure/message generation/formation, storage, retrieval, population, copying, moving, editing, modifying, sorting, searching, sending, receiving, updating, deleting, encrypting, decrypting, de-duplicating, converting, uploading, downloading, or any other local or network-based data structure/message operation associated with a structure/message (data shell) or the data itself (content). For example, the structure/message (shell) can comprise a file, a table, a spreadsheet, an array, a matrix, a linked list, a tree, a string, a quadtree, a stack, a deck, or any other structures of data. For example, a spreadsheet can be stored within a file. The data (content) can contain any alphanumeric, image, acoustic, binary, symbolic, equation, formula, or any other content. For example, a spreadsheet can comprise the data (content). Also, note that various disclosed algorithms are some non-limiting examples and other variations are possible.

Figure 1:
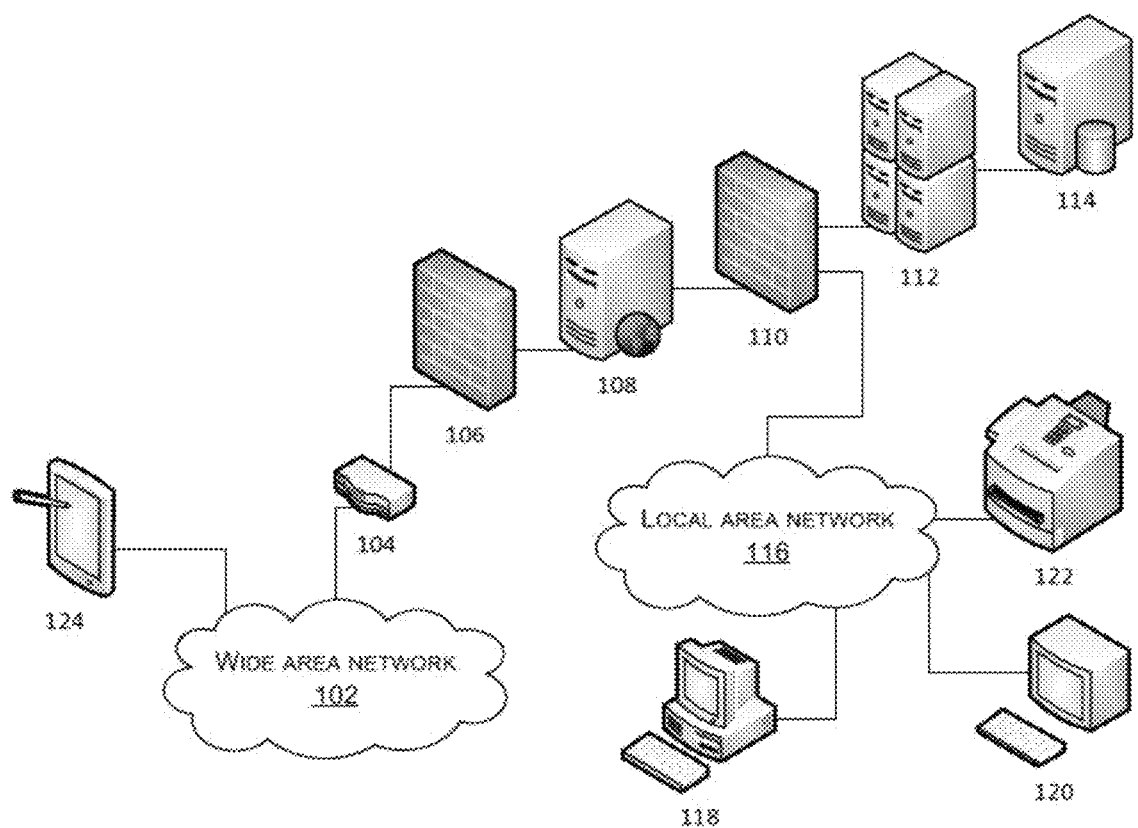
FIG. 1 shows a schematic view of an embodiment of a network topology according to an embodiment.

FIG. 1 shows a schematic view of an embodiment of a network topology according to the present disclosure. A topology 100 comprises a wide area network (WAN) 102 to which a plurality of equipment segments are coupled, whether directly or indirectly, whether in a wired or wireless manner. The segments include a first segment and a second segment.

The first segment is operated via a first operator and the second segment is operated via a second operator. The first segment comprises a router 104, a firewall 106, a network server 108, a firewall 110, an application server 112, a database server 114, a local area network (LAN) 116, a workstation 118, an administrator terminal 120, and a multifunction device 122.

The second segment comprises a client computing device 124 communicably coupled to the WAN 102, whether directly or indirectly, whether in a wired or a wireless manner. The client computing device 124 is operated by an end user, such as a potential or an actual service provider customer. In some embodiments, the first operator and the second operator are a single operator, such as for testing or maintenance of at least one of the first segment or the second segment.

The topology 100 is based on a distributed network operation model, which allocates tasks/workloads between servers, which provide a resource/service, and clients, which request the resource/service. Although the servers and the clients illustrate different computers/applications, in some embodiments, the servers and the clients reside in or share or are one system/application. Further, the topology 100 entails allocating a large number of resources to a small number of servers, where complexity of the clients, depends on how much computation is offloaded to the small number of servers, i.e., more computation offloaded from the clients onto the servers leads to lighter clients, such as being more reliant on network sources and less reliant on local computing resources. However, note that other computing models are possible as well. For example, such models can comprise decentralized computing, such as peer-to-peer (P2P), for instance Bit-Torrent, or distributed computing, such as via a computer cluster where a set of networked computers works together such that the computer can be viewed as a single system. For example, a communication may comprise sending a request to open a network port for access or a browsing request or a packet request or a page request or a file request or a record request.

Each component of the topology 100 can be implemented in a logic, whether hardware-based or software-based. For example, when the logic is hardware-based, then such logic can comprise circuitry, such as processors, memory, input devices, output devices, or other hardware, that is configured, such as via programming or design, to implement a functionality of a respective component. Likewise, when the logic is software-based, then such logic can comprise one or more instructions, such as assembly code, machine code, object code, source code, or any other type of instructions, which when executed, such as via running or compilation, implement a functionality of a respective component.

The WAN 102 is communicably interposed between the first segment and the second segment. The WAN 102 can be operated via the first operator, the second operator, or a third operator. The WAN 102 can be established via a telecommunication circuit. The WAN 102 can employ circuit switching or packet switching methods. The WAN 102 can employ network protocols including Transmission Control Protocol (TCP)/Internet Protocol (IP), which can be used deliver transport and addressing functions. However, other communication protocols can be used, whether additionally or alternatively, in whole or in part, such as File Transfer Protocol (FTP), Ethernet, Internet Message Access Protocol (IMAP) Internet Control Message Protocol (ICMP), Hypertext Transfer Protocol (HTTP), or others. The WAN 102 can comprise circuit switched telephone lines, radio wave transmission, or optic fiber. In some embodiments, the first segment and the second segment communicably interface with each other, while avoiding the WAN 102, such via direct communication, such as via the router 104.

Although the first segment is organized in a dual firewall configuration, the first segment can also be organized in a single firewall configuration, such as a three legged network model. The router 104 is communicably interposed between the WAN 102 and the firewall 106. The firewall 106 is communicably interposed between the router 104 and the network server 108. The network server 108 is communicably interposed between the firewall 106 and the firewall 110. For example, a demilitarized zone or a perimeter network can be formed, where the network server 108 is positioned therein. The firewall 110 is communicably interposed between the application server 112 and the network server 108. The firewall 110 is communicably interposed between the LAN 116 and the network server 108. The application server 112 is communicably interposed between the firewall 110 and the database server 114. The LAN 116 is communicably coupled to the firewall 110, the workstation 118, the administrator terminal 120, and the multifunction device 122. Note that communicative interpositioning or communicative coupling can be direct or indirect, whether wired or wireless. For example, the network server 108, the application server 112, and the server 112 can be contained in a single data center or distributed among a plurality of data centers in any permutational/combinatory manner.

The router 104 forwards data packets from the WAN 102 to the firewalls 106 and vice versa. Each of the firewalls 106, 110 is a network security system, whether hardware and/or software, which monitors and controls incoming and outgoing network traffic based on a set of security rules. Each of the firewalls 106, 110 can be a network firewall or a host-based firewall. Each of the firewalls 106, 110 can be identical or different from each other in structure or operation.

The network server 108 serves content, such as a network page, a data stream, or a data feed. For example, the network server 108 can serve content to the application server 112 in response receiving a corresponding request. For example, the network server 108 can push to or pull content from the application server 112. The network server 108 can serve content, such as a network page, such as via pushing or pulling, to the workstation 118, the administrator terminal 120, and the multifunction device 122 over the LAN 116 in response receiving a corresponding request. Such service can be via a protocol, such as via HTTP or a hypertext transfer protocol secure (HTTPS). For example, the network page can be file-based and can be static or dynamic. For example, the network page can be dynamically generated and can be markup language based, such as via a Hypertext Transfer Markup Language (HTML). For example, the network server 108 can comprises a web server, such as Apache, Microsoft® Internet Information Server (IIS), Novell's NetWare server, Google Web Server (GWS), or IBM Domino server.

The application server 112 hosts a software application and a set of business logic for the software application, such as a file comprising a spreadsheet or a worksheet. Therefore, as instructed by the software application, the application server 112 can communicably interface with the network server 108 through the firewall 110 and the database server 114. For example, the application server 112 can act as a middle-tier server, with the network server 108 acting as front-tier server, and the database server 114 acting as a back-end server. For example, the application server 112 can comprise an IBM Web Sphere application server or a SAP Web application server. In some embodiments, where the firewall 110 is lacking, then the application server 112 can still communicably interface with the network server 108, which may be directly.

The application server 112 can comprise a plurality of independent cores, such as a multicore processor comprising a computing component with two or more independent processing units, which are the units that read and execute program instructions, such as via multiprocessing or multithreading. The instructions are processing instructions, such as add, move data, or branch, but the cores can run multiple instructions concurrently, thereby increasing an overall operational speed for the software application, which is amenable to parallel computing. The cores can process in parallel when concurrently accessing a file or any other data structure, as disclosed herein, while being compliant with atomicity, consistency, isolation, and durability (ACID) principles, which ensure that such data structure operations/transactions, such as read, write, erase, or others, are processed reliably, such as for data security or data integrity. For example, a data structure can be accessed, such as read or written, via at least two cores concurrently, where each of the cores concurrently processes a distinct data structure record or a distinct set of data such that at least two data structure records or at least two sets of the data are processed concurrently, without locking the data structure between such cores. However, note that data locking is possible. Note that there can be at least two cores, such as two cores, three cores, four cores, six cores, eight cores, ten cores, twelve cores, or more. The cores may or may not share caches, and the cores may or may not implement message passing or shared-memory inter-core communication methods. Common network topologies to interconnect cores include bus, ring, two-dimensional mesh, and crossbar. Homogeneous multi-core systems include only identical cores, heterogeneous multi-core systems can have cores that are not identical. The cores in multi-core systems may implement architectures, such as very long instruction word (VLIW), superscalar, vector, or multithreading. In some embodiments, whether additionally or alternatively, in whole or in part, at least one of the network server 108, the database server 114, the workstation 118, the terminal 120, or the client 138 can comprise a plurality of independent cores, such as a multicore processor comprising a computing component with two or more independent processing units, which are the units that read and execute program instructions, such as via multiprocessing or multithreading, as disclosed herein. Such configurations may enable parallel processing of relevant information, as disclosed herein, such as when used via many users for various tasks disclosed herein and thereby efficiently increase system computational speed.

The database server 114 hosts a database and a database management system (DBMS), such as an Oracle database, a MS-SQL database, an MS Access database, a Filemaker database, a DB2 database, or others. The DBMS manages the database. The application hosted on the application server 112 can communicably interface with the DBMS in order to request various database operations, as disclosed herein, such as creating records, modifying records, retrieving records, searching records, identifying records, deleting records, sorting records, or others, in whole or in part. For example, some of various database input (I)/output (O) operations include reading, writing, editing, deleting, updating, searching, selecting, merging, sorting, erasing, formatting, or others. The DBMS can implement record locking on the database, such as for data integrity purposes. In some embodiments, the DBMS can avoid record locking.

The database stores data, whether in a raw state, a formatted state, an organized stated, or any other accessible state, and allows access to such data, whether directly and/or indirectly. The database can be a single database or a plurality of databases, whether hosted on a single machine or a plurality of machines, whether in a single data center or distributed among a plurality of data centers. The database can comprise at least one of a relational database, a non-relational database, a post-relational database, an in-memory database, a hybrid database, an Extensible Markup Language (XML) database, a parallel database, a distributed database, a graph database, a mobile database, an operation database, a probabilistic database, a real-time database, a spatial database, a temporal database, an object oriented database, an unstructured data database, a terminology oriented database, or others. For example, the database can store a spreadsheet with a parent worksheet and a child worksheet, as disclosed herein.

The workstation 118 is programmed to run an application on an operating system (OS), such as Windows, Linux, Android, MacOS, and/or others. For example, the application can comprise a browser, a productivity application, such as a word processor or a spreadsheet, a mobile app, or others.

The application is programmed to display a graphical user interface (GUI), as disclosed herein. The GUI is programmed to display an output and receive an input. For example, the output can comprise a display of a row of a parent worksheet populated, as disclosed herein, via an input device, such as a keyboard, a cursor device, a microphone, a camera, or a touchscreen, and a display of a tab of a child worksheet programmed for an activation via the input device, where the child worksheet is programmed for the input, such as to automatically and at least partially inherit a cellular format or cellular content from the parent worksheet for subsequent editing/modification/appending, if any, where, after the input, the parent worksheet or the child worksheet, in whole or in part, can be saved, submitted, or uploaded from the workstation 118 to the application server 112 or the database server 114, which may be through the network server 108 via the LAN 116 or directly to the application server 112 via the LAN 116. The input may be from a user, such as a service provider employee or another computer/software application. However, note that the GUI can receive and display other information as well, as disclosed herein. The workstation 118 can be configured to interface with the multifunction device 122, such as to print a report from the application via the multifunction device 122, such as in color or grayscale, such as via the LAN 116. The workstation 118 can communicate the input to the application server 112 via the LAN 116 and the firewall 110 or even without the firewall 110. In response, the application server 112 can perform various data operations, as disclosed herein, such as to execute the software application and the set of business logic for the software application accordingly or request the DBMS to identify or modify various records in the database hosted on the database server 114.

The administrator terminal 120 is programmed to allow maintenance or troubleshooting of the first segment, such as the router 104, the firewall 106, the network server 108, the firewall 110, the application server 112, the database server 114, the LAN 116, the workstation 118, and the multifunction device 122. Such maintenance or troubleshooting can involve spreadsheet or file settings, spreadsheet or file versioning, data structure maintenance, software updates, debugging, access control, simulation, event logging, event monitoring, automation, or others. In some embodiments, the maintenance or the troubleshooting can involve the second segment or the client computing device 124.

The multifunction device 122 can comprise a scanner, a fax, a printer, a network-based messaging interface, whether LAN or WAN based, such as email, or any other functionality, in whole or in part, in any combinatory manner. The multifunction device 122 can be used via the workstation 118, the administrator terminal 120, the application server 112, or other components of the first segment. The multifunction device 122 can host an optical character recognition (OCR) engine to perform an OCR process, such as offline, on a scan, a fax, an email, or other functionalities of the multifunction device 122. Alternatively or additionally, the OCR process can be performed remote to the multifunction device 122, where the multifunction device 122 sends a document or an image, whether as scanned, faxed, or emailed, to a remote computer and then receives the document or the image that has already been subject to the OCR process from the remote computer, whether the remote computer performs the OCR process or forward the document or the image to another machine to perform the OCR process. For example, the spreadsheet can be populated, as disclosed herein, in a paper form and submitted for the OCR process via the multifunction device 122, as disclosed herein. The client computing device 124 comprises a tablet computer. However, note that the client computing device 124 can be any type of a computer, such as a desktop, a laptop, a mobile device, a phone, or any other suitable computer.

Note that any of the servers disclosed herein can be hardware-based and/or software-based. Each of the servers is and/or is hosted on, whether directly and/or indirectly, a server computer, whether stationary or mobile, such as a kiosk, a workstation, a vehicle, whether land, marine, or aerial, a desktop, a laptop, a tablet, a mobile phone, a mainframe, a supercomputer, a server farm, and so forth. The server computer can comprise another computer system and/or a cloud computing network. The server computer can run any type of an OS, such as MacOS, Windows, Android, Unix, Linux, and/or others. The server computer can include and/or be coupled to, whether directly and/or indirectly, an input device, such as a mouse, a keyboard, a touchscreen, a biometric reader, a clicker, a microphone, or any other suitable input device. The server computer can include and/or be coupled to, whether directly and/or indirectly, an output device, such as a display, a speaker, a printer, or any other suitable output device. In some embodiments, the input device and the output device can be embodied in one unit, such as a touch-enabled display, which can be haptic. Each of the servers can employ load-balancing technologies and/or failover technologies for operational efficiency, continuity, and/or redundancy. Each of the servers can be task-dedicated. At least two of the servers can be a single server.

Note that the clients disclosed herein can be hardware-based and/or software-based. Each of the clients is and/or is hosted on, whether directly and/or indirectly, a client computer, whether stationary or mobile, such as a terminal, a kiosk, a workstation, a vehicle, whether land, marine, or aerial, a desktop, a laptop, a tablet, a mobile phone, a mainframe, a supercomputer, a server farm, and so forth. The client computer can comprise another computer system and/or cloud computing network. The client computer can run any type of an OS, such as MacOS, Windows, Android, Unix, Linux, and/or others. The client computer can include and/or be coupled to an input device, such as a mouse, a keyboard, a camera, an accelerometer, a touchscreen, a biometric reader, a clicker, a microphone, or any other suitable input device. The client computer can include and/or be coupled to an output device, such as a display, a speaker, a joystick, a printer, or any other suitable output device. In some embodiments, the input device and the output device can be embodied in one unit, such as a touch-enabled display, which can be haptic.

In one mode of operation, at least based on above, the server 112 can perform a method, which includes a set of steps. One step includes the server 112 storing a first file comprising a spreadsheet with a worksheet, where the worksheet comprises at least a first row and a second row.

The first row comprises a first statement cell comprising a first statement, a first data type cell comprising a first data type identifier, a first logic cell comprising a first logic, and a first field cell comprising a first field identifier, whether immediately adjacent to or spaced apart from each other via a cell, whether empty or containing a content, in the first row. Note that the first row can include other cells, such as a first key cell comprising a first key, whether immediately adjacent to or spaced apart from each other via a cell, whether empty or containing a content, in the first row.

The second row comprises a second statement cell comprising a second statement, a second data type cell comprising a second data type identifier, a second logic cell comprising a second logic, and a second field cell comprising a second field identifier, whether immediately adjacent to or spaced apart from each other via a cell, whether empty or containing a content, in the second row. Note that the second row can include other cells, such as a second key cell comprising a second key, whether immediately adjacent to or spaced apart from each other via a cell, whether empty or containing a content, in the second row. Note that at least one of the first row or the second row can comprise a key cell containing a key, such as a unique or primary identifier, where at least one of the first statement or the second statement is identified via the key, such as via calling the unique or primary identifier. For example, when the second row comprises the key cell, then the server 112 can call the key based on the first logic in response to the evaluating and then the second statement is identified via the key. Also, note that a cell in the first row and a cell in the second row can be shaped or sized identical to or different from each other. Note that the first row and the second row can be immediately adjacent to each other or spaced apart from each other via a row in-between. Note that the file can be a single file or a plurality of files. Also, note that other data structures can be used, whether additionally or alternative to the file. Further, note that any number of rows in a worksheet of a spreadsheet can be used. In some embodiments, the worksheet can comprise between 1 and 10,000 rows, such as between 2 and 5,000 rows, such as less than 4,000 rows. Note that this number is illustrative and more than 10,000 rows can be used, for example, 1,000,000 rows.

Note that a cell operates as a shell for the content stored therein. Therefore, an operation involving the cell or the content stored therein may include generation/formation, storage, retrieval, population, copying, moving, editing, modifying, sorting, searching, sending, receiving, updating, deleting, encrypting, decrypting, de-duplicating, converting, uploading, downloading, or any other local or network-based data cell operation. The content can contain any alphanumeric, image, acoustic, binary, symbolic, equation, formula, logic, or any other content. For example, alphanumeric data can include an alphabetic string, such as a statement or a question, whether or not including a punctuation mark of any type. For example, the alphanumeric data may include a numerical string, including a mathematical symbol of any type. For example, symbol data can include a barcode or a quick response (QR) code. For example, the logic data can include a conditional/Boolean logic statement (if/then logic evaluating whether a statement is true or false) of any branching depth, or any other type logic. For example, the first or second statement can include an alphabetic string representative of a question, such as "Are you currently licensed to fly an aircraft?" For example, the first or second data type identifier can include a Boolean type, a multi-value type, a string, a number, or others. For example, the first or second logic can include an alphanumeric string, such as "If QB00001 !=QB00101". For example, the first or second logic can include a causal conditional string, such as "if q10==true, then ask q16" or "if Q359!=false, then ask q3, otherwise ask q 458". The causal condition string may help data entry for users with little or minimum programming knowledge. For example, the first or second field identifier can include an alphanumeric string, such as C6 or 6x. For example, the first or second key can include an alphanumeric string, such as "B00010".

One step includes the server 112 serving, such as dynamically rendering, a page, such as a webpage, to a client, such as the client computing device 124, such as via the server 108 over the WAN 102. Such service can be based on the client requesting the page from the server 108. For example, upon receiving the page request from the client computing device 124, such service can comprise the server generating and then sending a set of executable instructions, such as markup language code, such as HTML or XML, to the client for execution, such as locally, to present the page, such as via a browser running on the OS of the client. Such service can comprise the server generating and then sending the page to the client for presentation, such as locally, such as via a browser running on the OS of the client or non-browser app running on the OS, such as a mobile non-browser app. Such service can comprise an authenticated session between the server 112 and the client, such as for security purposes. The authenticated communication session can be via HTTPS protocol. The authenticated communication session can be via login/password or biometrics.

The page visually presents, as dynamically generated, a first label and a first input element, such as a text entry box, a checkbox, a slider, a button, a dropdown menu, a sliding scale, or another other visual element. The first label comprises the first statement, such as an alphabetic string, sourced from the first statement cell based on dynamic page generation, such as via the first key. The first input element is configured for a first input, such as via a radio or option button or a dropdown menu, according to the first data type identifier sourced from the first data type cell based on dynamic page generation. The server 112 seeks, calls, or identifies the first statement in the first row, such as via the first key, such as when via a default key or as identified or pointed to via another key. Upon such seeking, calling, or identifying, the server 112 copies the first statement for dynamic page generation, such as via the server 112 or the server 108 as instructed via the server 112.

One step includes the server 112 receiving the first input from the client, such as over the WAN 102 via the server 108, and in response to such receipt, evaluating the first input against the first logic, such as if the first input matches a condition disclosed via the first logic, and serving, such as over the WAN 102 via the server 108, a second label and a second input element onto the page based such evaluation. The second label comprises the second statement sourced from the second statement cell based on dynamic page generation, such as via a second key. The second input element is configured for a second input according to the second data type identifier sourced from the second data type cell based on dynamic page generation. The server 112, upon evaluating the first input against the first logic, seeks, calls, or identifies the second statement in the second row, such as via the second key, such as when the first logic identifies or points to the second key. Upon such seeking, calling, or identifying, the server 112 copies the second statement for dynamic page generation, such as via the server 112 or the server 108 as instructed via the server 112. The page can be a single page, such that the page concurrently contains the first label, the second label, the first input element, and the second input element. For example, the single page can concurrently present the first label, the second label, the first input element, and the second input element along a horizontal scrolling plane, a vertical scrolling plane, or a diagonal scrolling plane. The page can be a plurality of pages, such that a first page contains the first label and the first input element, and a second page contains the second label and the second input element, with the first page and the second page being distinct pages, and the second page sequentially follows the first page. The first or second input can be of any data type, such an alphanumeric string, a Boolean value (true or false), a symbol, or others.

One step includes the server 112 receiving the second input, such as over the WAN 102, and in response insert the first input into a first field, such as an alphanumeric text entry field, of a second file, such as a productivity document file, such as an MS Word or Excel file, or a portable document format (PDF) document or a markup language file, such as an HTML file, based on the first field identifier, which identifies the first field in the second file, and the second input into a second field, such as a data entry field, such as a checkbox, of the second file based on the second field identifier, which identifies the second field in the second file. The server 112 can store the second file before the inserting or retrieve the second file via the DBMS hosted on the server 114 from the database hosted on the server 114. In addition, the server 112 can generate the second file before the inserting, whether immediately before or not immediately before. In addition, the second file may be an original file or a copy of another file, whether the copy is generated via the server 112 or the server 114. Additionally, the server 112 or the server 114 can generate the second file in response, whether immediate or not, to receiving the second input. Moreover, the second file can comprise a unique identifier before the inserting. For example, the unique identifier can be a barcode, a QR code, an alphanumeric string, or an image. For example, the server 112 or the server 114 can generate, retrieve, copy, or otherwise access the second file based on the unique identifier. In addition, if the page contains an alphanumeric or image content, such as graphical content, then the server 112 or the server 114 can be configured to filter out or avoid including such content in the second file when generating the second file, such as for a streamlined appearance when the second file is presented, displayed, or printed. In some embodiments, the server 112 or the server 114 may serve the second file to the client, such as the client computing device 124, where the second file comprises an electronic signature field that is ready to receive an electronic signature from the client. For example, such electronic signature may be useful for a network-based intake of a mortgage or insurance application, the first statement, and the second statements must match word-for-word what has been previously submitted to a government agency, such as electronically. For example, where the first statement and the second statement are literally recited in a third file in a first order, such as when previously submitted, the third file is generated before the second file and before the page is served with the first label and the first input element. The page may display the first statement and the second statement in a second order, where the first order and the second order are different orders, although identical orders are possible as well. The second file can be generated upon receiving a submit input, such as via an activation of a button or hyperlink on the page, or without receiving a submit input, such as upon reaching a threshold data point in the worksheet, such as a specific statement cell or logic cell. For example, the button can dynamically change from inactive or invisible to active or visible based on spreadsheet, such as upon reaching a threshold data point in the worksheet, such as a specific statement cell or logic cell. For example, the page can comprise a webpage with a dynamically updated form, including labels and fields. The page can contain a submission visual element, such as a button, programmed to activate an upload of the first input or the second input from the client to the application server 112, such as for storage in a record of the server 114, where the record can be subsequently accessed, such as via the DBMS as requested via the server 112, for generating the second file.

In other embodiments, the page can be a single page or the page comprises a first page and a second page, where the first page comprises the first label and the first input element, wherein the second page comprises the second label and the second input element, wherein the first page and the second page are distinct pages, such as a sequence of pages. The first row and the second row are not immediately adjacent to each other, although immediately adjacent positioning is possible, as well.

In some embodiments, the spreadsheet may comprise a cell comprising a content for at least one of (a) a control of how at least one of the first input element or the second input element is presented on the page, (b) a control of how at least one of the first label or the second label is presented on the page, (c) a control of how a help tip is presented for at least one of the first input element or the second input element is presented on the page, or (d) a control of a display attribute of the page. Such cell may be included in the first row or the second row or a third row, whether on a same or different worksheet. For example, the control of how at least one of the first input element or the second input element is presented on the page may control a lateral or longitudinal length, a color, a contrast, a position, a font, a shape, a size, or other relevant attribute. For example, the control of how at least one of the first label or the second label is presented on the page may control a lateral or longitudinal length, a color, a contrast, a position, a font, a shape, a size, or other relevant attribute. For example, the control of how the help tip is presented for at least one of the first input element or the second input element is presented on the page may control a lateral or longitudinal length, a color, a contrast, a position, a font, a shape, a size, or other relevant attribute. The help tip may be sourced from the spreadsheet, such as in the first row or the second row. Further, note that the help tip may be sourced similarly to the first statement or the second statement. For example, the control of the display attribute of the page may control a lateral or longitudinal length, a color, a contrast, a position, a font, a shape, a size, or other relevant attribute.

In some embodiments, the spreadsheet comprises a first worksheet and a second worksheet, where the first worksheet comprises the first row and the second worksheet comprises a second row. The first worksheet and the second worksheet can be a single worksheet or distinct worksheets. For example, where the page may be a first page, and the server 112 may receive a create worksheet request from the workstation 118 and in response create a third worksheet in the spreadsheet such that the third worksheet comprises a third row. The first page and the second page may be distinct pages. The third row may inherit from at least one of the first row or the second row such that the third row comprises at least one of a third statement cell comprising at least one of the first statement or the second statement, a third data type cell comprising at least one of the first data type identifier or the second data type identifier, a third logic cell comprising at least one of the first logic or the second logic, or a third field cell comprising at least one of the first field identifier or the second field identifier. The single worksheet, which may contain the first worksheet and the second worksheet, and the third worksheet may be distinct worksheets.

Note that such inheritance, whether single, multiple, or multilevel, is similar to inheritance in object-oriented programming, where a child object inherits a property/attribute/feature from a parent object. Likewise, a child worksheet can be based on another worksheet (parent worksheet), whether in a same or different spreadsheet or file or database or record or data structure, whether sourced locally or through a network, using a same implementation or specifying implementation to maintain a same behavior (realizing an interface or inheriting behavior). Such type of inheritance is a mechanism for code reuse and to allow independent extensions of an original worksheet or spreadsheet. For example, such relationships give rise to a worksheet hierarchy. For example, a child worksheet can inherit a row from a parent worksheet, such as responsive to a user input or automatically responsive to a detection of a trigger or a detection of a condition being met or a detection of a threshold being satisfied, and then such row can be modified or appended to, such as via a population of another cell in that row, such as responsive to a user input or automatically responsive to a detection of a trigger or a detection of a condition being met or a detection of a threshold being satisfied. For example, a child worksheet can inherit a first row from a parent worksheet and then a second row can be added, whether above or below the first line, where a content of the second row is responsive to or based on a content of the first row or vice versa. For example, responsive to such inheritance, the server 112 can serve a third label and a third input element onto a second page, which is distinct from the first page, where the third label comprises a statement sourced from the third statement cell, where the third input element is configured for a third input according an identifier sourced from the third data type cell. For example, the server 112 may receive a modify request, such as an alphanumeric value or other data type value, from a client, such as the workstation 118, and in response modify the third worksheet such that a content of at least one of the third statement cell, the third data type cell, the third logic cell, or the third field cell is changed based on the modify request.

In some embodiments, the server 112, or along with the server 114, may host a network-based document management system, such as MS SharePoint, FileSite, or Google Drive. The document management system may provide a document check-in/check-out functionality in order to prevent a conflict where multiple users may want to concurrently modify the file comprising the spreadsheet. For example, responsive to the server 112 providing a GUI with a check-in/check-out functionality to a client, such as the workstation 118, over the LAN 116, and a receiving a check-in request from the client based on the GUI, the server 112 may add a new or modified file to a document library or a list to replace a previous version of the file, where the file comprises the spreadsheet. Likewise, responsive to the server 112 providing a GUI with a check-in/check-out functionality to a client, such as the workstation 118, over the LAN 116, and a receiving a check-out request from the client based on the GUI, the server 112 may get a version of the file in a file list or a file library, where the file comprises the spreadsheet. Therefore, via checking-out the file, a user of the client can prevent other users from modifying/editing that a content of the file. Similarly, via checking-in the file, the user of the client can allow others to edit the content of the file, without needing to worry about overriding changes that others have made. When the file is checked out to the user of the client, then that user can work on that file, and other users cannot. Consequently, other users must wait for the user to check-in the file again (that is, perform a check-in) before the other users can modify/edit the file. While the file is checked-out, other users may or may not see only a last version of the file that was checked-in via the user of the client and therefore the other users may or may not see a change that the user of the client, which is a current user of the file, has made on the file while the file has been checked-out. For example, where the client is a first client, such as the client computing device 124, the server 112 may receive a check-out request, such as a message, from a second client, such as the client operating the workstation 118, such as over the LAN 116. The check-out request may be before the server 112 serves the page with the first label and the first input element to the first client. In response to the check-out request, the server 112 may check-out the first file to the second client such that the server 112 serves, such as over the LAN 116, a check-out message to a third client, such as the terminal 120, when the third client attempts to access the first file. Therefore, the server 112 prevents, such as via file locking/privilege control/permission (read, write, delete) control, the third client from accessing the first file when the third client attempts to access the first file. The check-out message may inform the third client that the first file is checked-out and may notify who the first file is check-out to, such as the second client. Subsequently, the server 112 may receive a check-in request, such as a message, from the second client, such as over the LAN 116. The check-in request may be before the server 112 serves the page with the first label and the first input element. In response to the check-in request, the server 112 checks-in the first file from the second client such that the third client can access the first file. Such check-out and check-in process can also occur when the server 112 is serving pages to clients, such as for data integrity purposes.

In one mode of operation, whether additional to or alternative to any embodiment disclosed herein, the server 112 may receive a request for a page from a client, such as the client computing device 124, such as over the WAN 102. In response to such receipt, the server 112 may access a file comprising a spreadsheet, as disclosed herein, such as via the server 114, generate a first set of instructions based on the spreadsheet, such as a set of HTML code, and serve the first set of instructions to the client such that the first set of instructions executably presents (e.g., renders) the page on the client, such as over the WAN 102. The spreadsheet comprises a first row and a second row, where the first row comprises a first statement cell comprising a first statement, a first data type cell comprising a first data type identifier, and a first logic cell comprising a first logic, and where the second row comprises a second statement cell comprising a second statement, a second data type cell comprising a second data type identifier, and a second logic cell comprising a second logic, as disclosed herein. The page comprises a first label and a first input element, where the first label comprises the first statement, and where the first input element is configured for a first input based on the first data type identifier, as disclosed herein. Consequently, the server receives the first input, as disclosed herein. In response to such receipt, the server 112 evaluates the first input against the first logic, identifies the second statement based on the evaluation, generates a second set of instructions based on the identifying, and serves the second set of instructions to the client such that the second set of instructions executably presents a second label and a second input element on the page, as disclosed herein. For example, the first set of instructions and the second set of instructions can be a single set of instructions or multiple sets of instructions, whether identical to or different from each other in type, such as HTML, XML, or others. For example, the server 112 can serve the client with a single set of instructions, including the first set of instructions and the second set of instructions, yet the second set of instructions is not client-processed until the first set of instructions is client-processed or the second set of instructions is client-processed but delayed for client presentation, such as for proper sequence of reflexive questioning. The second label comprises the second statement, as disclosed herein. The second input element is configured for a second input based on the second data type identifier, as disclosed herein.

In one mode of operation, whether additional to or alternative to any embodiment disclosed herein, the server 112 may access a file comprising a spreadsheet, where the spreadsheet comprises a parent worksheet, as disclosed herein. The parent worksheet comprises a first row, where the first row comprises a first statement cell comprising a first statement, a first data type cell comprising a first data type identifier, and a first logic cell comprising a first logic, as disclosed herein. The server 112 may receive a first command from a client, such as the workstation 118, such as over the LAN 116, and in response, the server 112 may create a child worksheet in the spreadsheet, where the child worksheet comprises a second row. The second row inherits the first row such that the second row comprises, whether in a same or different data, organizational, or presentation format, a second statement cell comprising the first statement, a second data type cell comprising the first data type identifier, and a second logic cell comprising the first logic, as disclosed herein. The server 112 may receive a second command from the client, and in response, the server 112 may modify at least one of the first statement in the second statement cell, the first data type identifier in the second data type cell, or the first logic in the second logic cell, as disclosed herein. For example, the second command may call a function of the spreadsheet, such as a sum function, or comprise a data input, such as an alphanumeric string or a data type value, as disclosed herein. Note that the second command may enable an addition, deletion, modification, editing, appending or any other data amendment to the child worksheet, on cellular, columnar, or row level, as disclosed herein. The server 112 may generate a set of instructions corresponding to a page based on the child worksheet such that the page comprises a label and an input element, where the label comprises the first statement from the second statement cell as modified if at all, and where the input element is configured for an input based on the first data type identifier in the second data type cell as modified if at all, as disclosed herein. The server 112 may serve the set of instructions to the second client, and in response to such service, the server 112 may receive the input, evaluate the input against the first logic in the second logic cell as modified if at all, and perform an action based on the evaluating, as disclosed herein. For example, the action can comprise data structure/message generation/formation, storage, retrieval, population, copying, moving, editing, modifying, sorting, searching, sending, receiving, updating, deleting, encrypting, decrypting, de-duplicating, converting, uploading, downloading, or any other local or network-based data structure/message operation associated with a structure/message (data shell) or the data itself (content), as disclosed herein. The data (content) can contain any alphanumeric, image, acoustic, binary, symbolic, equation, formula, or any other content, as disclosed herein. For example, a spreadsheet can comprise the data (content). For example, the action can comprise a generation of a file, a service of a statement, a memorialization of an input, or a service of a message or any other actions disclosed herein.

In one mode of operation, whether additional to or alternative to any embodiment disclosed herein, the server 112 may serve a user interface to a first client, such as the workstation 118, such as over the LAN 116, as disclosed herein. The user interface comprises a check-out element configured for a check-out input related to the file, such as a file name identifier for user selection or a checkbox, and a check-in element configured for a check-in input related to the file, such as a file name identifier for user selection or a checkbox, as disclosed herein. For example, the file can be checked-out by opening the file and the file can be checked-in by closing the file, as disclosed herein. The file comprises a spreadsheet, where the spreadsheet comprises a row, as disclosed herein. The row comprises a statement cell comprising a statement, a data type cell comprising a data type identifier, and a logic cell comprising a logic, as disclosed herein. The server 112 receives the check-out input from the first client, such as over the LAN 116, and in response, the server 112 checks-out the file such that the file cannot be modified by a second client, such as the terminal 120, until the server 112 receives the check-in input from the first client, and modifies at least one of the statement, the data type identifier, or the logic based on a write request from the first client during the modifying, as disclosed herein. For example, the write request may enable an addition, deletion, modification, editing, appending or any other data amendment to the spreadsheet, on cellular, columnar, or row level, as disclosed herein. The server 112 may receive the check-in input from the first client after the modifying, and in response to such receipt, the server 112 may check-in the file such that the file can be modified by the second client, as disclosed herein. The server 112 may generate a set of instructions corresponding to a page based on the spreadsheet such that the page comprises a label and an input element, as disclosed herein. The label comprises the statement as modified if at all, as disclosed herein. The input element is configured for an input based on the data type identifier as modified if at all, as disclosed herein. The server 112 may receive the input in response to serving the set of instructions to a third client, such as the client computing device 124 and evaluate the input against the logic as modified if at all, and perform n action based on the evaluating, as disclosed herein. For example, the action can comprise data structure/message generation/formation, storage, retrieval, population, copying, moving, editing, modifying, sorting, searching, sending, receiving, updating, deleting, encrypting, decrypting, de-duplicating, converting, uploading, downloading, or any other local or network-based data structure/message operation associated with a structure/message (data shell) or the data itself (content), as disclosed herein. The data (content) can contain any alphanumeric, image, acoustic, binary, symbolic, equation, formula, or any other content, as disclosed herein. For example, a spreadsheet can comprise the data (content). For example, the action can comprise a generation of a file, a service of a statement, a memorialization of an input, or a service of a message or any other actions disclosed herein. Note that the check-in/check-out technology can be implemented via the document management system, as disclosed herein, such as MS SharePoint or Google Drive.

In some embodiments, the file with the spreadsheet can be stored local on a client, such as on the client computing device 124 or a memory device coupled to the client, such as an external hard disk, or an optical drive, a network-based storage drive, or a flash drive. For example, the file with the spreadsheet can be stored remote from the client, such as a network-based file hosting service, which may provide a cloud-based storage, file synchronization, personal cloud, or client software. For example, the network-based file hosting service may allow a user to create a folder on the user's computer, where the folder is synchronized, whether in real-time or periodically, with the network-based file hosting service such that the folder appears to be same folder (with same contents) regardless of which computing device is used to view the folder. For example, the network-based file storage service can comprise Dropbox or Google Drive. Therefore, the file with the spreadsheet can be locally processed, whether additional to or alternative to server processing.

In some embodiments, any strings/symbols/identifiers disclosed herein can be in any human or machine language in any alphanumeric font or via any pictorial, symbolic, or sound representation, such as a string, an icon, a banner, an audio, a video, or a photo. Also, note that if any strings/symbols/identifiers disclosed herein are improperly formatted, then the application server 112 may format into an appropriate format. For example, if the application server 112 receives a string/symbol/identifier in a first format, then the application server 112 can convert the string/symbol/identifier from the first format into a second format, such as for data structure or processor compatibility or computational efficiency. For the example, the first format can be in a first character-encoding scheme and the second format can be in a second character-encoding scheme. For example, the first format can an archive or zipped file and the second format can be un-archived or unzipped file.

In some embodiments, an input can be in a natural language form, such as in a sentence, sound, or image, where such input can be subsequently processed via the application server 112 implementing a natural language processing algorithms, such as based on statistical model machine learning. For example, such algorithms can involve automatic summarization, co-reference resolution, discourse analysis, machine translation, morphological segmentation, named entity recognition (NER), native language identification, natural language generation, natural language understanding, OCR, part-of-speech tagging, parsing, question answering, relationship extraction, sentence breaking, sentiment analysis, speech recognition, speech segmentation, stemming, topic segmentation and recognition, word segmentation, word sense disambiguation, or others.

Figure 2:
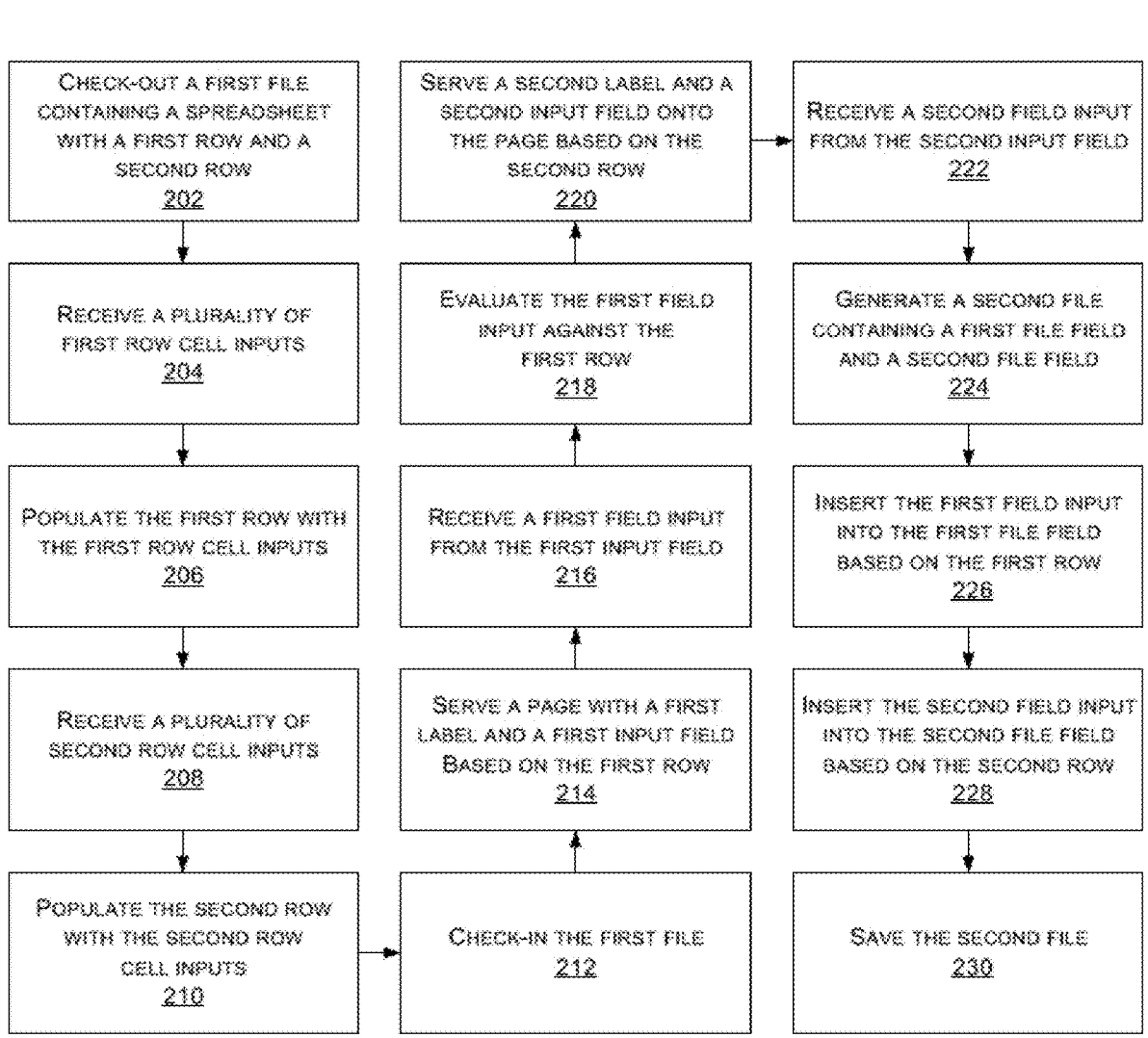
FIG. 2 shows a flowchart of an embodiment of a process for file generation according to an embodiment.

FIG. 2 shows a flowchart of an embodiment of a process for file generation according to the present disclosure. A process 200 includes a plurality of blocks 202-230. The process 200 can be performed via the topology 100 of FIG. 1, in whole or in part.

In a block 202, the server 112 checks-out a first file containing a spreadsheet with a first row and a second row, as disclosed herein. The first file is checked-out to a first client, such as the workstation 118. Therefore, a second client, such as the terminal 120, is unable to check-in the first file at least for modifying/editing, such as for data integrity purposes. For example, the checking-out can be managed via the document management system, as disclosed herein. The server 112 may not always check out the first file; it may retrieve the file from a database.

In a block 204, the server 112 receives a plurality of first row cell inputs from the first client, as disclosed herein. For example, the first row cell inputs comprise the first statement, the first data type identifier, the first logic, and the first field identifier. Note that other row inputs are possible, such as a key cell input, as disclosed herein.

In a block 206, the server 112 populates the first row with the first row cell inputs such that the first row comprises a first statement cell comprising the first statement, a first data type cell comprising the first data type identifier, a first logic cell comprising the first logic, and a first field cell comprising the first field identifier, as a single cell or a multiple cells, in whole or in part, whether immediately adjacent to or spaced apart from each other via a cell, whether empty or containing a content, in the first row. The first row can include other cells, such as a first key cell comprising a first key, whether immediately adjacent to or spaced apart from each other via a cell, whether empty or containing a content, in the first row.

In a block 208, the server 112 receives a plurality of second row cell inputs from the first client, as disclosed herein. For example, the second row cell inputs comprise the second statement, the second data type identifier, the second logic, and the second field identifier. Note that other row inputs are possible, such as a key cell input, as disclosed herein.

In a block 210, the server 112 populates the second row with the second row cell inputs such that the second row comprises a second statement cell comprising the second statement, a second data type cell comprising the second data type identifier, a second logic cell comprising the second logic, and a second field cell comprising the second field identifier, as a single cell or a multiple cells, in whole or in part, whether immediately adjacent to or spaced apart from each other via a cell, whether empty or containing a content, in the second row. Note that the second row can include other cells, such as a second key cell comprising a second key, whether immediately adjacent to or spaced apart from each other via a cell, whether empty or containing a content, in the second row. Note that at least one of the first row or the second row can comprise a key cell containing a key, such as a unique or primary identifier, where at least one of the first statement or the second statement is identified via the key, such as via calling the unique or primary identifier. For example, when the second row comprises the key cell, then the server 112 can call the key based on the first logic in response to the evaluating and then the second statement is identified via the key. A cell in the first row and a cell in the second row can be shaped or sized identical to or different from each other. The first row and the second row can be immediately adjacent to each other or spaced apart from each other via a row in-between. The file can be a single file or a plurality of files. Also, other data structures can be used, whether additionally or alternative to the file. Further, note that any number of rows in a worksheet of a spreadsheet can be used. In some embodiments, the worksheet can comprise between 1 and 10,000 rows, such as between 2 and 5,000 rows, such as less than 4,000 rows. Note that this number is illustrative and more than 10,000 rows can also be used.

A cell can operate as a shell for a content stored therein. Therefore, an operation involving the cell or the content stored therein may include generation/formation, storage, retrieval, population, copying, moving, editing, modifying, sorting, searching, sending, receiving, updating, deleting, encrypting, decrypting, de-duplicating, converting, uploading, downloading, or any other local or network-based data cell operation. The content can contain any alphanumeric, image, acoustic, binary, symbolic, equation, formula, logic, or any other content. For example, alphanumeric data can include an alphabetic string, such as a statement or a question, whether or not including a punctuation mark of any type. For example, the alphanumeric data include a numerical string, including a mathematical symbol of any type. For example, symbol data can include a barcode or a quick response (QR) code. For example, the logic data can include a conditional/Boolean logic statement (if/then logic evaluating whether a statement is true or false) of any branching depth, or any other type logic. For example, the first or second statement can include an alphabetic string representative of a question, such as "Are you currently licensed to fly an aircraft?" For example, the first or second data type identifier can include a Boolean type, a multi-value type, a string, a number, or others. For example, the first or second logic can include an alphanumeric string, such as "If QB00001 !=QB00101". For example, the first or second logic can include a causal conditional string, such as "if q10==true, then ask q16" or "if Q359!=false, then ask q3, otherwise ask q 458". Note that the causal condition string may help data entry for users with little or minimum programming knowledge. For example, the first or second field identifier can include an alphanumeric string, such as C6 or 6x. For example, the first or second key can include an alphanumeric string, such as "B00010". Furthermore, a cell may "call out" another operation that may be performed by another computing device coupled with the client computing device 124.

In a block 212, the server 112 checks-in the first file containing, as disclosed herein. The first file is checked-in from the first client. Therefore, the second client is able to check-out the first file at least for modifying/editing. For example, the checking-in can be managed via the document management system, as disclosed herein.

In a block 214, the server 112 serves a page with a first label and a first input field based on the first row. For example, the server 112 may serve, such as dynamically, a page, such as a webpage, to a client, such as the client computing device 124, such as via the server 108 over the WAN 102. Such service can be based on the client requesting the page from the server 108. For example, upon receiving the page request from the client, such service can comprise the server 112 generating and then sending a set of executable instructions, such as markup language code, such as HTML or XML, to the client for execution, such as locally, to present the page, such as via a browser running on the OS of the client. Note that such service can comprise the server 112 generating and then sending the page to the client for presentation, such as locally, such as via a browser running on the OS of the client or non-browser app running on the OS, such as a mobile non-browser app. Note that such service can comprise an authenticated session between the server 112 and the client, such as for security purposes. The authenticated communication session can be via HTTPS protocol. The authenticated communication session can be via login/password or biometrics.

For example, the page visually presents, as dynamically generated, the first label and the first input element, such as a text entry box, a checkbox, a slider, a button, a dropdown menu, a sliding scale, or another other visual element. The first label comprises the first statement, such as an alphabetic string, sourced from the first statement cell based on dynamic page generation, such as via the first key. The first input element is configured for a first input, such as via a radio or option button or a dropdown menu, according to the first data type identifier sourced from the first data type cell based on dynamic page generation. Note that the server 112 seeks, calls, or identifies the first statement in the first row, such as via the first key, such as when via a default key or as identified or pointed to via another key. Upon such seeking, calling, or identifying, the server 112 copies the first statement for dynamic page generation, such as via the server 112 or the server 108 as instructed via the server 112.

In a block 216, the server 112 receives a first field input from the first input field, such as the first input element. For example, the server 112 receives the first field input from the client, such as over the WAN 102 via the server 108.

In a block 218, the server 112 evaluates the first field input against the first row. For example, the server 112 evaluates the first field input against the first logic, such as if the first input matches a condition disclosed via the first logic.

In a block 220, the server 112 serves a second label and a second input field onto the page based on the second row. For example, the server 112 can serve, such as over the WAN 102 via the server 108, the second label and the second input element onto the page based such evaluation. The second label comprises the second statement sourced from the second statement cell based on dynamic page generation, such as via a second key. The second input element is configured for a second input according to the second data type identifier sourced from the second data type cell based on dynamic page generation. Note that the server 112, upon evaluating the first input against the first logic, seeks, calls, or identifies the second statement in the second row, such as via the second key, such as when the first logic identifies or points to the second key. Upon such seeking, calling, or identifying, the server 112 copies the second statement for dynamic page generation, such as via the server 112 or the server 108 as instructed via the server 112. Note that the page can be a single page, such that the page concurrently contains the first label, the second label, the first input element, and the second input element. For example, the single page can concurrently present the first label, the second label, the first input element, and the second input element along a horizontal scrolling plane, a vertical scrolling plane, or a diagonal scrolling plane. Note that the page can be a plurality of pages, such that a first page contains the first label and the first input element, and a second page contains the second label and the second input element, with the first page and the second page being distinct pages, and the second page sequentially follows the first page. Note that the first or second input can be of any data type, such an alphanumeric string, a Boolean value (true or false), a symbol, or others.

In a block 222, the server 112 receives a second field input from the second input field. For example, the server 112 can receive the second input, such as over the WAN 102.

In a block 224, the server 112 generates a second file containing a first file field and a second file field. Alternatively, the second file is preexisting and can be copied and then populated or populated without copying. The generation of the second file can be responsive to receiving the second field input.

In a block 226, the server 112 inserts the first input into the first file field, such as an alphanumeric text entry field, of the second file, such as a productivity document file, such as an MS Word or Excel file, or a PDF document or a markup language file, such as an HTML file, based on the first field identifier, which identifies the first file field in the second file.

In a block 228, the server 112 inserts the second input into the second file field, such as a data entry field, such as a checkbox, of the second file based on the second field identifier, which identifies the second file field in the second file.

In a block 230, the server 112 saves the second file, as populated. Such saving can be local or network-based, as disclosed herein. Note that the server 112 can store the second file before the inserting or retrieve the second file via the DBMS hosted on the server 114 from the database hosted on the server 114. Also, note that the server 112 can generate the second file before the inserting, whether immediately before or not immediately before. Also, note that the second file may be an original file or a copy of another file, whether the copy is generated via the server 112 or the server 114. Additionally, note that the server 112 or the server 114 can generate the second file in response, whether immediate or not, to receiving the second input. Moreover, the second file can comprise a unique identifier before the inserting. For example, the unique identifier can be a barcode, a QR code, an alphanumeric string, or an image. For example, the server 112 or the server 114 can generate, retrieve, copy, or otherwise access the second file based on the unique identifier. In addition, if the page contains an alphanumeric or image content, such as graphical content, then the server 112 or the server 114 can be configured to filter out or avoid including such content in the second file when generating the second file, such as for a streamlined appearance when the second file is presented, displayed, or printed. In some embodiments, the server 112 or the server 114 may serve the second file to the client, such as the client computing device 124, where the second file comprises an electronic signature field that is ready to receive an electronic signature from the client. For example, such electronic signature may be useful for a network-based intake of a mortgage or insurance application and the first statement and the second statements must match word-for-word what has been previously submitted to a government agency, such as electronically. For example, where the first statement and the second statement are literally recited in a third file in a first order, such as when previously submitted, the third file is generated before the second file and before the page is served with the first label and the first input element. The page may display the first statement and the second statement in a second order, where the first order and the second order are different orders, although identical orders are possible as well. Note that the second file can be generated upon receiving a submit input, such as via an activation of a button or hyperlink on the page, or without receiving a submit input, such as upon reaching a threshold data point in the worksheet, such as a specific statement cell or logic cell. For example, the button can dynamically change from inactive or invisible to active or visible based on spreadsheet, such as upon reaching a threshold data point in the worksheet, such as a specific statement cell or logic cell. For example, the page can comprise a webpage with a dynamically updated form, including labels and fields. The page can contain a submission visual element, such as a button, programmed to activate an upload of the first input or the second input from the client to the application server 112, such as for storage in a record of the server 114, where the record can be subsequently accessed, such as via the DBMS as requested via the server 112, for generating the second file.

Figure 3:
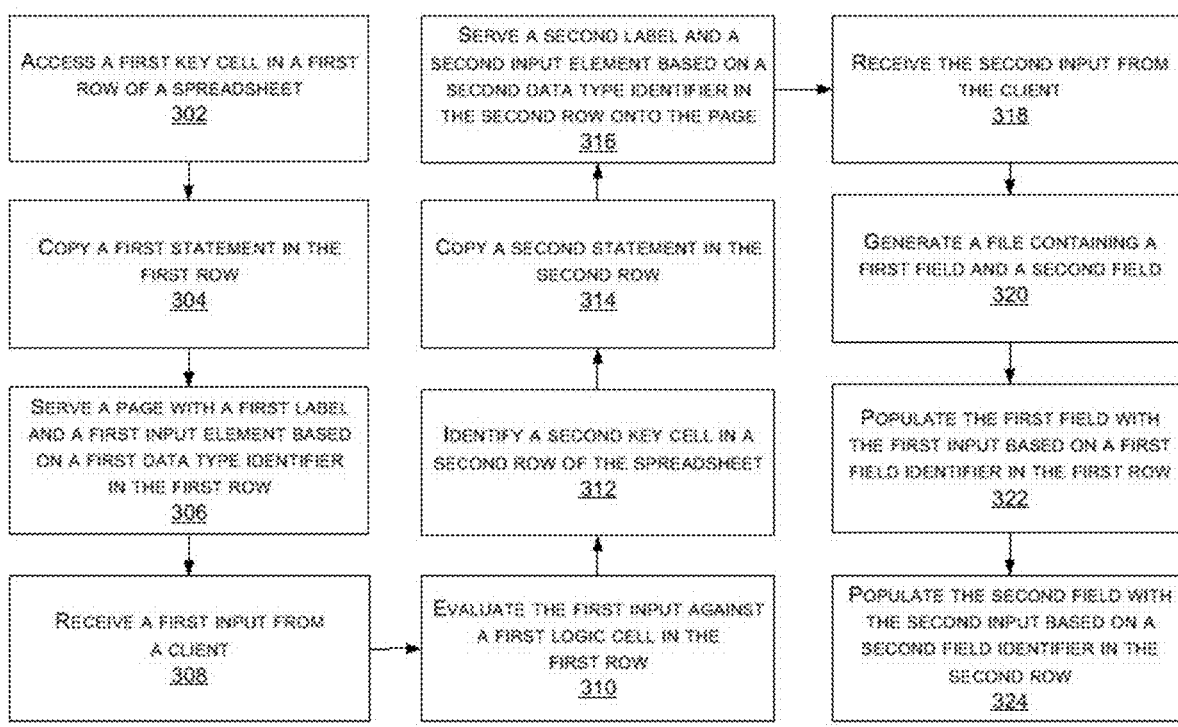
FIG. 3 shows a flowchart of an embodiment of a process for cell processing according to an embodiment.

FIG. 3 shows a flowchart of an embodiment of a process for cell processing according to the present disclosure. A process 300 includes a plurality of blocks 302-324. The process 300 can be performed via the topology 100 of FIG. 1, in whole or in part.

In a block 302, the server 112 accesses a first key cell in a first row of a spreadsheet containing the first row and a second row, as disclosed herein. The first row comprises a first statement cell comprising a first statement, a first data type cell comprising a first data type identifier, a first logic cell comprising a first logic, a first field cell comprising the first field identifier, and the first key cell comprising a first key. For example, the server 112 can access the first key in the first key cell. Note that such cell order is one example and other cell orders are possible, in any permutational or combinatory manner, such as the first key cell being positioned in a first column of a worksheet of the spreadsheet. Further, note that at least two of such first row cells can be a single cell. Likewise, the second row comprises a second statement cell comprising a second statement, a second data type cell comprising a second data type identifier, a second logic cell comprising a second logic, a second field cell comprising a second field identifier, and a second key cell comprising a second key. Further, note that at least two of such second row cells can be a single cell. Note that such cell order is one example and other cell orders are possible, in any per mutational or combinatory manner, such as the second key cell being positioned in the first column or the second column of the worksheet of the spreadsheet. Also, note that a cell in the first row and a cell in the second row can be shaped or sized identical to or different from each other. Note that the first row and the second row can be immediately adjacent to each other or spaced apart from each other via a row in-between.

Note that a cell operates as a shell for the content stored therein. Therefore, an operation involving the cell or the content stored therein may include generation/formation, storage, retrieval, population, copying, moving, editing, modifying, sorting, searching, sending, receiving, updating, deleting, encrypting, decrypting, de-duplicating, converting, uploading, downloading, or any other local or network-based data cell operation. The content can contain any alphanumeric, image, acoustic, binary, symbolic, equation, formula, logic, or any other content. For example, alphanumeric data can include an alphabetic string, such as a statement or a question, whether or not including a punctuation mark of any type. For example, the alphanumeric data include a numerical string, including a mathematical symbol of any type. For example, symbol data can include a barcode or a quick response (QR) code. For example, the logic data can include a conditional/Boolean logic statement (if/then logic evaluating whether a statement is true or false) of any branching depth, or any other type logic. For example, the first or second statement can include an alphabetic string representative of a question, such as "Are you currently planning to skydive?". For example, the first or second data type identifier can include a Boolean type, a multi-value type, a string, a number, or others. For example, the first or second logic can include an alphanumeric string, such as "If QB00031<QB00205A". For example, the first or second logic can include a causal conditional string, such as "if q10==true, then ask q16" or "if Q359!=4, then go q3, otherwise go to q458". Note that other logic operations are possible, whether additionally or alternatively, such as greater than or lesser than, whether inclusively or exclusively, addition, subtraction, multiplication, division, variable assignment, functions, string content operations, network access (data pull/push or data read/write/delete/append), or other logic. For example, some of such logic may be found in or be similar to a computer language, such as Perl, Python, or JavaScript. Moreover, note that if the spreadsheet has a macro functionality, then the macro functionality can be used, whether additionally or alternatively. Further, note that the causal condition string may help data entry for users with little or minimum programming knowledge. For example, the first or second field identifier can include an alphanumeric string, such as C6 or 6×. For example, the first or second key can include an alphanumeric string, such as "B00010". Further, note that any number of rows in a worksheet of a spreadsheet can be used. In some embodiments, the worksheet can comprise between 1 and 10,000 rows, such as between 2 and 5,000 rows, such as less than 4,000 rows. Note that this number is illustrative and more than 10,000 rows can be used, for example, a 1,000,000 rows.

In a block 304, the server 112 copies the first statement in the first row from the first statement cell. For example, the first statement can be copied based on the server 112 calling the first key in the first key cell and then being directed to the first statement cell to retrieve the first statement therefrom.

In a block 306, the server 112 serves a page with a first label and a first input field based on the first identifier. For example, the server 112 may serve, such as dynamically, the page, such as a webpage, to a client, such as the client computing device 124, such as via the server 108 over the WAN 102. Such service can be based on the client requesting the page from the server 108. For example, upon receiving the page request from the client, such service can comprise the server 112 generating and then sending a set of executable instructions, such as markup language code, such as HTML or XML, to the client for execution, such as locally, to present the page, such as via a browser running on the OS of the client. Note that remote execution is possible, whether additionally or alternatively, such as when the client is running an Amazon Silk browser. Further, note that such service can comprise the server 112 generating and then sending the page to the client for presentation, such as locally, such as via a browser running on the OS of the client or non-browser app running on the OS, such as a mobile non-browser app. Also, note that such service can comprise an authenticated session between the server 112 and the client, such as for security purposes. The authenticated communication session can be via HTTPS protocol. The authenticated communication session can be via login/password or biometrics. For example, the page visually presents, as dynamically generated, the first label and the first input element, such as a text entry box, a checkbox, a slider, a button, a dropdown menu, a sliding scale, or another other visual element. The first label comprises the first statement, such as an alphabetic string, sourced from the first statement cell based on dynamic page generation, such as via the first key. The first input element is configured for a first input, such as via a radio or option button or a dropdown menu, according to the first data type identifier sourced from the first data type cell based on dynamic page generation. As noted above, the server 112 may seek, call, or identify the first statement in the first row, such as via the first key, such as when via a default key or as identified or pointed to via another key. Upon such seeking, calling, or identifying, the server 112 copies the first statement for dynamic page generation, such as via the server 112 or the server 108 as instructed via the server 112.

In a block 308, the server 112 receives a first input from the first input element. For example, the server 112 receives the first input from the client, such as the client computing device 124, such as over the WAN 102 via the server 108. For example, the first input can comprise a Boolean value, such as true or false, or an alphanumeric string, such as "yes" or "sometimes" or "1980" or "5/27/1974" or "May 3, 2001." Note that the server 112 can store the first input locally or in the database hosted on the server 114. Such storage can persist temporarily or permanently. For example, the server 112 can communicably interface with the server 114 for storing or using the first input.

In a block 310, the server 112 evaluates the first input against the first logic cell in the first row. For example, the server 112 evaluates the first input against the first logic comprised in the first logic cell, such as whether the first input matches/satisfies or does not match/satisfy a condition/threshold disclosed via the first logic. For example, when (1) the first statement is a statement 42, such as whether identified as such via the first key in the first row or contained in a row 42 of a worksheet, and (2) the first input is associated with the first statement, such as responsive to the first statement being presented in the first label on the page, and (3) the first input comprises a true value, and (4) the first logic comprises a causal conditional string "if Q42==T, then seek Q50, otherwise seek Q19," then the server 112 would evaluate the true value in the first input against the causal condition string as being present/existent/matched/satisfied and then seek a statement 50, such as whether identified as such via the second key in the second row or contained in a row 50 of the worksheet. In contrast, if the first input comprises a false value, then the server 112 would seek a statement 19, such as whether identified as such via a third key in a third row or contained in a row 19 of the worksheet. Note that the worksheet can be a single worksheet or a plurality of worksheets.

In a block 312, the server 112 identifies a second key cell in a second row of the spreadsheet. For example, the server 112 can access the second key in the second key cell. For example, the server 112 can access, such as via calling, the second key in the second key cell based on the first logic in the first logic cell in response to the evaluating in the block 310 and then the second statement is identified via the second key. For example, when the first logic states "go to Q30" or "seek s12," then the server 112 can be programmed to go/seek a row 30 or row 12, such as whether identified as such via the second key in the second row or contained in a row 30 or row 12 of the worksheet.

In a block 314, the server 112 copies the second statement in the second row from the second statement cell. For example, the second statement can be copied based on the server 112 calling the second key in the second key cell and then being directed to the second statement cell to retrieve the second statement therefrom.

In a block 316, the server 112 serves a second label and a second input element based on a second data type identifier in the second row onto the page. For example, the server 112 can serve, such as dynamically, such as over the WAN 102 via the server 108, the second label and the second input element onto the page based such evaluation. For example, such service can be based on the client requesting the page from the server 108. The second label comprises the second statement sourced from the second statement cell based on dynamic page generation, such as via the second key. The second input element is configured for a second input according to the second data type identifier sourced from the second data type cell based on dynamic page generation. For example, the page visually presents the second label and the second input element, such as a text entry box, a checkbox, a slider, a button, a dropdown menu, a sliding scale, or another other visual element. The second label comprises the second statement, such as an alphabetic string, sourced from the second statement cell based on dynamic page generation, such as via the second key. The second input element is configured for a second input, such as via a radio or option button or a dropdown menu, according to the second data type identifier sourced from the second data type cell based on dynamic page generation.

Note that the page can be a single page, such that the page concurrently contains the first label, the second label, the first input element, and the second input element. For example, the single page can concurrently present the first label, the second label, the first input element, and the second input element along a horizontal scrolling plane, a vertical scrolling plane, or a diagonal scrolling plane. Note that the page can be a plurality of pages, such that a first page contains the first label and the first input element, and a second page contains the second label and the second input element, with the first page and the second page being distinct pages, and the second page sequentially follows the first page.

Note that the first or second input can be of any data type, whether identical to or different from each other, such an alphanumeric string, a Boolean value (true or false), a symbol, or others. Further, note that the server 112 may serve second label and the second input element onto the page based such evaluation during a same session when the first label and the first input element were served, such as a successive sequence of page events during a session. Note that the session can be a single session or a plurality of sessions, such as a resume from a left off point session. For example, upon receiving the page request from the client, such service can comprise the server 112 generating and then sending a set of executable instructions, such as markup language code, such as HTML or XML, to the client for execution, such as locally, to present the second label and the second input element onto the page, such as via a browser running on the OS of the client. Note that remote execution is possible, whether additionally or alternatively, such as when the client is running an Amazon Silk browser. Further, note that such service can comprise the server 112 generating and then sending the page to the client for presentation, such as locally, such as via a browser running on the OS of the client or non-browser app running on the OS, such as a mobile non-browser app. Also, note that such service can comprise an authenticated session between the server 112 and the client, such as for security purposes. The authenticated communication session can be via HTTPS protocol. The authenticated communication session can be via login/password or biometrics.

In a block 318, the server 112 receives a second input from the second input element. For example, the server 112 receives the second input from the client, such as the client computing device 124, such as over the WAN 102 via the server 108. For example, the second input can comprise a Boolean value, such as true or false, or an alphanumeric string, such as "no" or "never" or "1991" or "27/2/1982" or "4 Jun. 2001." Note that the server 112 can store the second input locally or in the database hosted on the server 114. Such storage can persist temporarily or permanently. For example, the server 112 can communicably interface with the server 114 for storing or using the second input. Note that although FIG. 3 shows processing for the first row and the second row, any number of rows can be used, as disclosed herein. For example, the second row can call a third row, which may call a fourth row, whether in a same or different worksheet in a same or different spreadsheet. Note that any rows disclosed herein can be immediately consecutive/adjacent or can be spaced apart in any manner.

In a block 320, the server 112 generates, such as via creating, a second file containing a first field, such as an alphanumeric string or Boolean data entry field, and a second field, such as an alphanumeric string or Boolean data entry field. Alternatively, the second file is preexisting and can be copied and then populated, as disclosed herein, or populated without copying, such as the second file being original, including unique, such as via a unique identifier contained therein. The generation of the second file can be responsive to receiving the second field input. The second file can comprise a productivity document file, such as an MS Word or Excel file, or a PDF document or a markup language file, such as an HTML file, an electronic document file, a database record, or any other file. For example, the first field can be configured for an alphanumeric string input, such as a text field, and the second field input can be configured for a Boolean data input, such as a checkbox.

In a block 322, the server 112 populates the first field with the first input based on a first field identifier in the first row. For example, the server 112 inserts, such as via copying and writing, the first input into the first file field based on the first field identifier, which identifies the first file field in the second file.

In a block 324, the server 112 populates the second field with the second input based on a second field identifier in the second row. For example, the server 112 inserts, such as via copying and writing, the second input into the second file field based on the second field identifier, which identifies the second file field in the second file. The second file can be presented to the client, such as the client computing device 124, or stored in the database on the server 114, as disclosed herein.

As noted above, the server 112 can store the second file before the populating or retrieve the second file via the DBMS hosted on the server 114 from the database stored on the server 114. Also, note that the server 112 can generate the second file before the populating, whether immediately before or not immediately before. Also, note that the second file may be an original file or a copy of another file, whether the copy is generated via the server 112 or the server 114. Additionally, note that the server 112 or the server 114 can generate the second file in response, whether immediate or not, to receiving the second input. Moreover, the second file can comprise a unique identifier before the inserting. For example, the unique identifier can be a barcode, a QR code, an alphanumeric string, or an image. For example, the server 112 or the server 114 can generate, retrieve, copy, or otherwise access the second file based on the unique identifier. In addition, if the page contains an alphanumeric or image content, such as graphical content, then the server 112 or the server 114 can be configured to filter out or avoid including such content in the second file when generating the second file, such as for a streamlined appearance when the second file is presented, displayed, or printed. In some embodiments, the server 112 or the server 114 may serve the second file to the client, such as the client computing device 124, where the second file comprises an electronic signature field that is ready to receive an electronic signature from the client. For example, such electronic signature may be useful for a network-based intake of a mortgage or insurance application and the first statement and the second statements must match word-for-word what has been previously submitted to a government agency, such as electronically. For example, where the first statement and the second statement are literally recited in a third file in a first order, such as when previously submitted, the third file is generated before the second file and before the page is served with the first label and the first input element. The page may display the first statement and the second statement in a second order, where the first order and the second order are different orders, although identical orders are possible as well. Further, note that the second file can be generated upon receiving a submit input, such as via an activation of a button or hyperlink on the page, or without receiving a submit input, such as upon receiving a data input from the client, such as alphanumeric or Boolean, or reaching a threshold data point in the worksheet, such as a specific statement cell or logic cell. For example, the button can dynamically change from inactive or invisible to active or visible based on spreadsheet, such as upon reaching a threshold data point in the worksheet, such as a specific statement cell or logic cell. For example, the page can comprise a webpage with a dynamically updated form, including labels and fields. The page can contain a submission visual element, such as a button, programmed to activate an upload of the first input or the second input from the client to the application server 112, such as for storage in a record of the server 114, where the record can be subsequently accessed, such as via the DBMS as requested via the server 112, for generating the second file. Note that the server 112 can also intake medical or employment application similarly, as disclosed herein.

In an embodiment, the server 112 may receive a first file containing a spreadsheet. The server 112 may receive the first file via the client computing device or may retrieve the first file from a database (check in the first file as described above). The spreadsheet may comprise a first row and a second row. Each row may comprise a statement cell comprising a statement, a data type cell comprising a data type identifier, a logic cell comprising logic, a field cell comprising a field identifier. The server 112 may receive cell inputs for each row in the spreadsheet. For example, the input data for the first statement cell may be "what is your date of birth." The inputted data for the data type cell may be "string." The inputted data may be metadata for the first row and the second row. The first and second row may include information corresponding to a first and second component in a graphical user interface (GUI). In some embodiments, the spreadsheet may be stored in a database (e.g., an internal or external database) and the server 112 may receive an identification of the spreadsheet and a request to retrieve said spreadsheet. For example, the spreadsheet may be stored locally on the client computing device 124 or other computing components described in FIG. 1 (e.g., workstation 118 and terminal 120). In some embodiments, the spreadsheet may be stored onto the same computing device on which the server renders the GUI. For example, the client computing device 124 may contain the spreadsheet used by the server 112 to dynamically render the GUI. In some other embodiments, the spreadsheet may be partially stored onto more than one computing devices as a security measure to combat unwanted data intercepts.

Based on the inputted data, the server 112 may dynamically render a GUI comprising a first component based on a rendering request received from the client computing device 124 or other computing devices (e.g., workstation 118 and terminal 120). For example, the GUI may include a first label and a first input element. The first label may be the first statement sourced from and corresponding to the first statement cell. The first input element may be configured according to the first data type identifier sourced from and corresponding to the first data type cell. For example, the GUI may display a question "what is your date of birth" and a text box next to it where the client can type his/her date of birth in the text box. In other examples, the GUI may display a radio button or a drop down box for the same question based on the client indicating a desire for a radio button or a drop down box in the spreadsheet.

In some embodiments, the server 112 may render the GUI on a webpage displayed on the client computing device 124. The server 112 may have access to one or more databases or pre-stored web-based interfaces, such as webpages, comprising a number of preconfigured sub-interfaces, or containers, dynamically populated from the data analyzed and anonymized by the server 112. For example, the above-mentioned webpages may contain code, such as HTML or PHP, presenting a website of any number of webpages having a common "look-and-feel." One or more output or results display webpages may contain additional code for containers, where the container code displays information or data (e.g., a questionnaire) that is configured to be dynamically and continuously generated (e.g., continuous and modular generation of the GUI based on user inputs). The server 112 may populate the sub-interfaces (containers) of the webpage with the appropriate components based on the spreadsheet, while the webpage display is configured to maintain the website's common aesthetic. The server 112 may modify the HTML code based on the received metadata from the spreadsheets in order to render the GUI.

The server 112 may receive a first input. For example, the client may input the requested date of birth in text box of the GUI displayed on the client device. After receiving the first input, the server 112 may evaluate the first input against a first logic included in the first row. If the first input is corresponding to the first logic, the server 112 may dynamically render a second component of GUI corresponding to the second row. The server 112 may render the GUI to include a second label and a second input element. The second label may be the second statement sourced from and corresponding to the second statement cell. The first input element may be configured according to the second data type identifier sourced from and corresponding to the second data type cell. For example, the server 112 may determine if the client is more than 18 years old to determine if the client is an adult. Based on the determination, the server 112 may provide different options depending on the application. For example, the server 112 may determine the client is more than 18 years old, and the server 112 may render the second component to ask if the client is married. The GUI may display a question "are you married" and a Boolean type input element (e.g., a radio button with options of "yes" and "no") next to it.

The server 112 may receive a second input. For example, the server 112 may receive the marital data from the client by extracting the input data from the second input element. The server 112 may evaluate the second input against a second logic in the second row and render more user interface components based on the evaluation results. There may be any number of rows. For example, the second row may call a third row, which may call a fourth row. The server 112 may also display other files based on the logic from the spreadsheet. For example, the spreadsheet may require the server 112 to display different disclaimers based on different answers received form the client. For example, if the server 112 receives an input indicating that the client lives in New York and the client is under 18, the server 112 may be required to display certain disclaimers. The server 112 may then query a database based on the logic from the spreadsheet (e.g., query an internal or external database based on the disclaimer identifier indicated within the spreadsheet) and retrieve a file including the disclaimer and render said disclaimer on the GUI.

After the server 112 renders all rows, or the logic reaches the end of processing, the server 112 may generate a second file by inserting the inputs into the corresponding field of the second file. For example, the server 112 may insert the first input into a first field of the second file based on the first field identifier, and insert the second input into the second file based on the second file identifier. For example, the server 112 may insert the inputted data of birth into a corresponding field in the first row of the second file, and the inputted marital status into a corresponding field of the second row of the second file. In some embodiments, the server 112 may generate the second file by replicating exactly what the client has viewed on the GUI. For example, all the boxes (e.g., radio buttons, drip downs, disclaimers, and other GUI components) may be the same. In some other embodiments, the server 112 may only retrieve the answers (e.g., inputted by the client) and generate the second file based on said inputs. The server 112 may also generate a third file (e.g., a report file) indicating whether the inputs are consistent with the logic of the spreadsheet. For example the report file may indicate (e.g., flag) the age of the client if the client is younger than 18 years of age. The server 112 may transmit the report file upon in real time or in batches (e.g., upon termination of one data intake).

Figure 4:
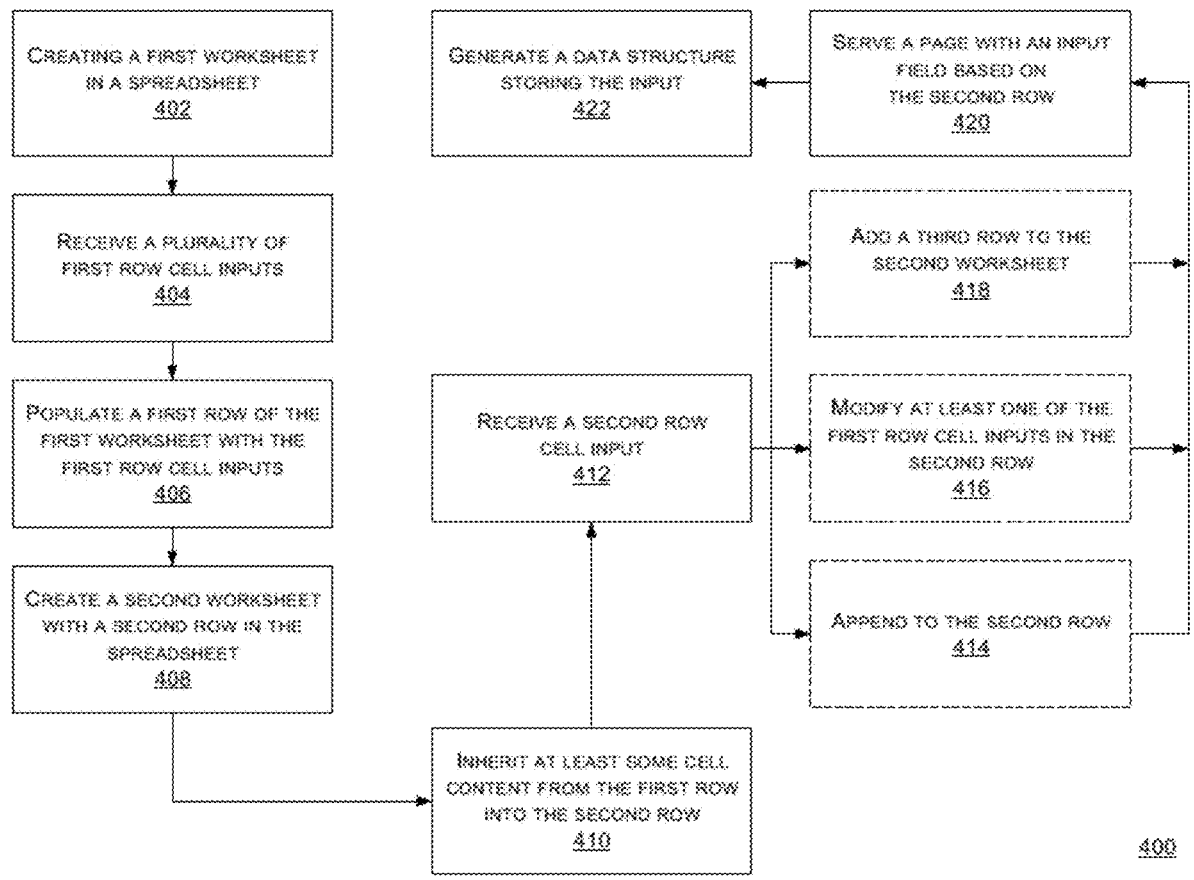
FIG. 4 shows a flowchart of an embodiment of a process for inheritance based data structure generation according to an embodiment.

FIG. 4 shows a flowchart of an embodiment of a process for inheritance based data structure generation according to the present disclosure. A process 400 includes a plurality of blocks 402-422. The process 400 can be performed via the topology 100 of FIG. 1, in whole or in part.

In a block 402, the server 112 creates a first worksheet in a spreadsheet, as disclosed herein. For example, the spreadsheet can be network-based, such as Google Docs or MS Office 365. The first worksheet comprises a first row. For example, the spreadsheet can be presented on a network page, such as a webpage, over the LAN 116 or the WAN 102.

In a block 404, the server 112 receives a plurality of first row cell inputs from a client, such as the workstation 118, as disclosed herein. For example, the first row cell inputs can include a first statement, a first data type identifier, a first logic, a first field identifier, or a first key.

In a block 406, the server 112 populates the first row of the first worksheet with the first row cell inputs, as disclosed herein. For example, the server 112 populates the first row of the first worksheet such that the first row comprises a first statement cell comprising the first statement, a first data type cell comprising the first data type identifier, a first logic cell comprising the first logic, a first field cell comprising the first field identifier, or the first key cell comprising the first key. Note that such cell order is one example and other cell orders are possible, in any permutation or combinatory manner, such as the first key cell being positioned in a first column of a worksheet of the spreadsheet. Further, note that at least two of such first row cells can be a single cell.

In a block 408, the server 112 creates a second worksheet with a second row in the spreadsheet, as disclosed herein. For example, the client requests the server 112 to create the second worksheet, such as via a create worksheet request.

In a block 410, the server 112 may inherit at least some cell content from the first row of the first worksheet into the second row of the second worksheet. Note that more than one row inheritance is possible, such as one-to-one, one-to-many, many-to-one, or many-to-many. During such creation, the second worksheet may inherit data or format from the first worksheet, such as the first row, whether on a columnar, row, or cellular basis, as disclosed herein. For example, the second row may comprise a second statement cell comprising the first statement, a second data type cell comprising the first data type identifier, a second logic cell comprising the first logic, a second field cell comprising the first field identifier, or a second key cell comprising the first key. Further, note that at least two of such second row cells can be a single cell. Note that such cell order is one example and other cell orders are possible, in any permutation or combinatory manner, such as the second key cell being positioned in the first column or the second column of the second worksheet. Also, note that a cell in the first row and a cell in the second row can be shaped or sized identical to or different from each other. Note that the first row and the second row can be immediately adjacent to each other or spaced apart from each other via a row in-between. Note that cell order, size, shape, or other cell attributes in rows can be inherited.

Note that such inheritance, whether single, multiple, or multilevel, is similar to inheritance in object-oriented programming, where a child object inherits a property/attribute/feature from a parent object. Likewise, a child worksheet can be based on another worksheet (parent worksheet), whether in a same or different spreadsheet or file or database or record or data structure, whether sourced locally or through a network, using a same implementation or specifying implementation to maintain a same behavior (realizing an interface or inheriting behavior). Such type of inheritance is a mechanism for code reuse and to allow independent extensions of an original worksheet or spreadsheet. For example, such relationships give rise to a worksheet hierarchy. For example, a child worksheet can inherit a row from a parent worksheet, such as responsive to a user input or automatically responsive to a detection of a trigger or a detection of a condition being met or a detection of a threshold being satisfied, and then such row can be modified or appended to, such as via a population of another cell in that row, such as responsive to a user input or automatically responsive to a detection of a trigger or a detection of a condition being met or a detection of a threshold being satisfied. For example, a child worksheet can inherit a first row from a parent worksheet and then a second row can be added, whether above or below the first line, where a content of the second row is responsive to or based on a content of the first row or vice versa. Note that more than two worksheets are possible, in any type of hierarchical branching. For example, the server 112 can maintain or generate a hierarchical worksheet map can be served, such as presented via display or print, so that a worksheet tree is displayed, where each of the nodes corresponds to a worksheet. This map allows a user to easily navigate inheritance hierarchy.

In a block 412, the server 112 receives a second row cell input, such as from the workstation 118 over the LAN 116. The second row cell input can trigger the server 112 for perform at least one of a block 414, a block 416, or a block 418. For example, all of the blocks 414, 416, and 418 can be performed; and in some embodiments, less than all the blocks can be performed.

In the block 414, the second row cell input can append to the second row. For example, such appending can include an addition or removal of a cell/content after last populated cell in the second row. For example, such appending can further define a child worksheet from a parent worksheet.

In the block 416, the second row cell input can modify at least one of the first row cell inputs in the second row. For example, such modification can edit at least one of the second statement cell comprising the first statement, the second data type cell comprising the first data type identifier, the second logic cell comprising the first logic, the second field cell comprising the first field identifier, or the second key cell comprising the first key. Such edit can include amending or deleting, in content or format. For example, such appending can further define a child worksheet from a parent worksheet.

In the block 418, the second row cell input can add a third row to the second worksheet. For example, the third row, which may be a new row, may further add content/rules to the second worksheet. The third row may be added, as disclosed herein, whether immediately or not immediately adjacent to the second row. For example, such adding can further define a child worksheet from a parent worksheet. However, note that removal of rows may be possible as well.

In a block 420, the server 112 serves, such as dynamically, a page with an input field based on the second row, as disclosed herein. For the example, the server 112 may serve the page to the client computing device 124 over the WAN 102 based on a request received from the client computing device 124 over the WAN 102. For example, upon receiving the page request from the client, such service can comprise the server generating and then sending a set of executable instructions, such as markup language code, such as HTML or XML, to the client for execution, such as locally, to present the page, such as via a browser running on the OS of the client. Note that such service can comprise the server generating and then sending the page to the client for presentation, such as locally, such as via a browser running on the OS of the client or non-browser app running on the OS, such as a mobile non-browser app. Note that such service can comprise an authenticated session between the server 112 and the client, such as for security purposes. The authenticated communication session can be via HTTPS protocol. The authenticated communication session can be via login/password or biometrics.

The page visually presents, as dynamically generated, a label and an input element, such as a text entry box, a checkbox, a slider, a button, a dropdown menu, a sliding scale, or another other visual element. The label comprises the first statement, such as an alphabetic string, sourced from the second statement cell, as modified if at all in the second worksheet, based on dynamic page generation, such as via the first key, as modified if at all in the second worksheet. The input element is configured for an input, such as via a radio or option button or a dropdown menu, according to the first data type identifier sourced from the second data type cell in the second worksheet, as modified if at all in the second worksheet, based on dynamic page generation.

In a block 422, the server 112 generates a data structure, such as a file, storing an input from the input field. The data structure can be a table, a list, a matrix, a grid, a queue, a stack, a deck, a quadtree, or others. For example, the file can comprise a productivity document file, such as an MS Word or Excel file, or a PDF document or a markup language file, such as an HTML file. Note that the server 112 can store the data structure before the storing of the input or retrieve the data structure via the DBMS hosted on the server 114 from the database hosted on the server 114. Also, note that the server 112 can generate the data structure before the storing, whether immediately before or not immediately before. Also, note that the data structure may be an original file or a copy of another data structure, whether the copy is generated via the server 112 or the server 114. Additionally, note that the server 112 or the server 114 can generate the data structure in response, whether immediate or not, to receiving the input. Moreover, the data structure can comprise a unique identifier before the inserting. For example, the unique identifier can be a barcode, a QR code, an alphanumeric string, or an image. For example, the server 112 or the server 114 can generate, retrieve, copy, or otherwise access the data structure based on the unique identifier.

Figure 5:
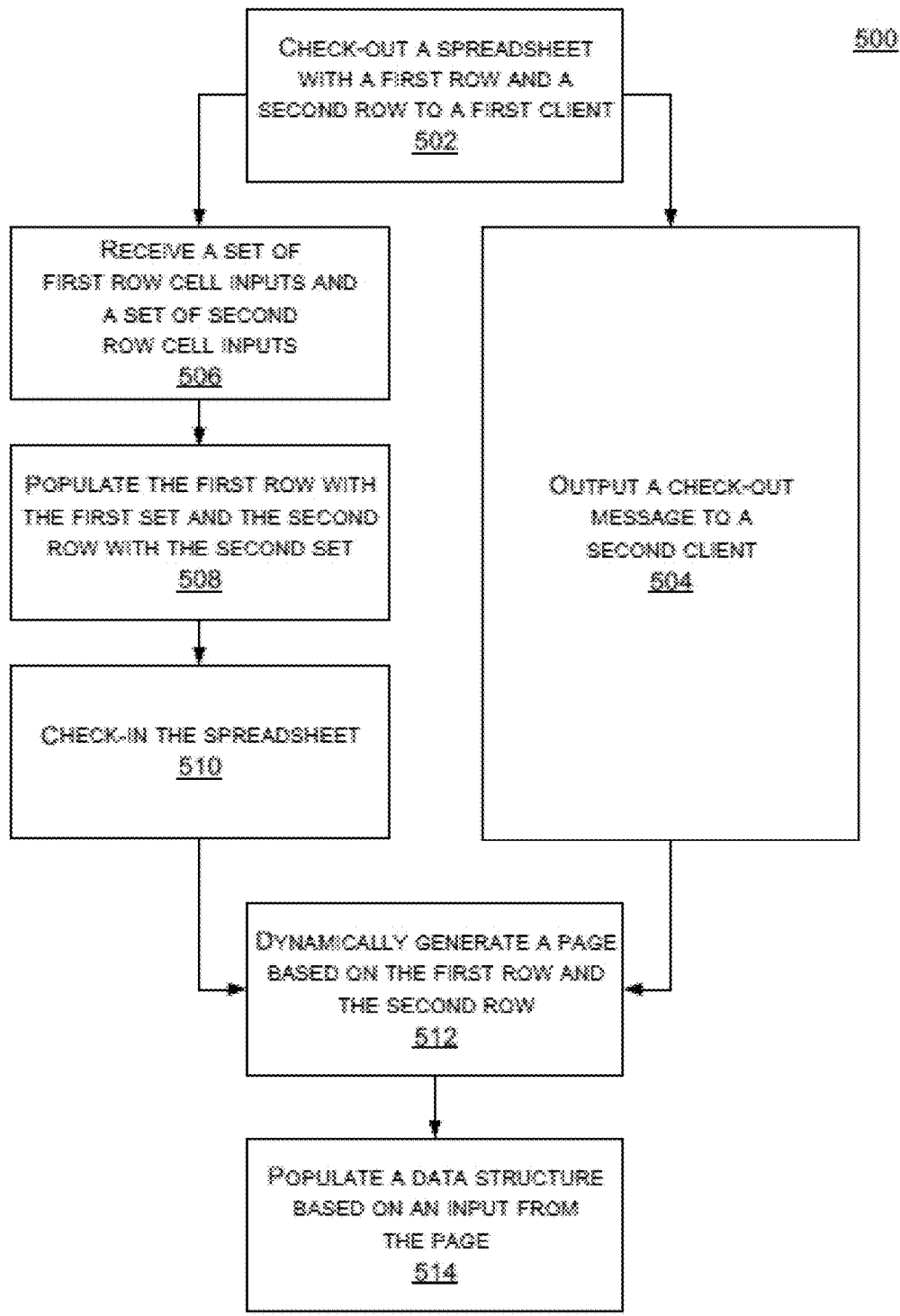
FIG. 5 shows a flowchart of an embodiment of a first process for document management according to an embodiment.

FIG. 5 shows a flowchart of an embodiment of a first process for document management according to the present disclosure. A process 500 includes a plurality of blocks 502-514. The process 500 can be performed via the topology 100 of FIG. 1, in whole or in part.

In a block 502, the server 112 checks-out a spreadsheet with a first row and a second row to a first client. For example, the server 112, or along with the server 114, may host a network-based document management system, such as MS SharePoint, MS Office 365, FileSite, or Google Drive. The document management system may provide a document check-in/check-out functionality in order to prevent a conflict where multiple users may want to concurrently modify the file comprising the spreadsheet. For example, the server 112 may serve a user interface, such as a GUI, to the first client, such as the workstation 118, such as over the LAN 116, as disclosed herein. The user interface comprises a check-out element configured for a check-out input related to a file, such as a file name identifier for user selection or a checkbox, and a check-in element configured for a check-in input related to the file, such as a file name identifier for user selection or a checkbox, as disclosed herein. For example, the file can be checked-out by opening the file and the file can be checked-in by closing the file, as disclosed herein. The file comprises the spreadsheet with the first row and the second row, as disclosed herein. For example, the server 112 receives the check-out input from the first client, such as over the LAN 116, and in response, the server 112 checks-out the file such that the file cannot be modified by a second client, such as the terminal 120, until the server 112 receives the check-in input from the first client. The check-out request may be before the server 112 serves the page with a label and an input element to a client, such as the client computing device 124. In an embodiment, the workstation may check out a file stored locally or onto any of the databases illustrated in FIG. 1. The checked-out spreadsheet may be used to dynamically generate a GUI on a client computing device (e.g., client computing device 124).

In a block 504, outputs a check-out message to the second client. For example, the server 112 serves, such as over the LAN 116, the check-out message to a second client, such as the terminal 120, when the second client attempts to access the file. Therefore, the server 112 prevents, such as via file locking/privilege control/permission (read, write, delete) control, the second client from accessing the file when the second client attempts to access the file. The check-out message may inform the second client that the file is checked-out and may notify who the file is check-out to, such as the first client.

In a block 506, the server 112 receives a set of first row cell inputs and a set of second row cell inputs, as disclosed herein. For example, the set of first row cell inputs can comprise a first statement, a first data type identifier, a first logic, a first field identifier, or a first key. For example, the set of second row cell inputs can comprise a second statement, a second data type identifier, a second logic, a second field identifier, or a second key. In an embodiment, the first client operating the workstation 118 may modify the checked out spreadsheet in order to customize the GUI to be generated.

In a block 508, the server 112 populates the first row with the first set of inputs and the second row with the second set of inputs. For example, the server 112 populates the first row of the worksheet such that the first row comprises a first statement cell comprising the first statement, a first data type cell comprising the first data type identifier, a first logic cell comprising the first logic, a first field cell comprising the first field identifier, or the first key cell comprising the first key. Likewise, the server 112 populates the second row of the worksheet such that the second row comprises a second statement cell comprising the second statement, a second data type cell comprising the second data type identifier, a second logic cell comprising the second logic, a second field cell comprising the second field identifier, or the second key cell comprising the second key. Note that such population can be original population or modifying population. For example, the modifying population can modify at least one of the first or second statement, the first or second data type identifier, or the first or second logic based on a write request from the first client during the modifying, as disclosed herein. For example, the write request may enable an addition, deletion, modification, editing, appending or any other data amendment to the spreadsheet, on cellular, columnar, or row level, as disclosed herein.

In a block 510, the server 112 checks-in the spreadsheet. For example, the server 112 may receive a check-in request, such as a message, from the first client, such as over the LAN 116. The check-in request may be before the server 112 serves the page with the label and the input element, as noted above. In response to the check-in request, the server 112 checks-in the spreadsheet from the first client such that the second client can access the spreadsheet. Such check-out and check-in process can also occur when the server 112 is serving pages to clients, such as for data integrity purposes.

Note that the block 504 is sized to correspond with the blocks 506, 508, and 510, such as for parallel processing purposes. As noted above, in some embodiments, the application server 112 comprises a processor hosting a plurality of cores, as disclosed herein. Therefore, during the block 504, the application server 112 may be parallel processing blocks 506, 508, and 510. This provides for more efficient use of the application server 112.

For example, responsive to the server 112 providing a GUI with a check-in/check-out functionality to the first client, such as the workstation 118, over the LAN 116, and a receiving a check-in request from the first client based on the GUI, the server 112 may add a new or modified file to a document library or a list to replace a previous version of the file, where the file comprises the spreadsheet. Likewise, responsive to the server 112 providing a GUI with a check-in/check-out functionality to a client, such as the workstation 118, over the LAN 116, and a receiving a check-out request from the client based on the GUI, the server 112 may get a version of the file in a file list or a file library, where the file comprises the spreadsheet. Therefore, via checking-out the file, a user of the client can prevent other users from modifying/editing that a content of the file. Similarly, via checking-in the file, the user of the client can allow others to edit the content of the file, without needing to worry about overriding changes that others have made. Note that when the file is checked out to the user of the client, then that user can work on that file, and other users cannot. Consequently, other users must wait for the user to check-in the file again (that is, perform a check-in) before the other users can modify/edit the file. While the file is checked-out, other users may or may not see only a last version of the file that was checked-in via the user of the client and therefore the other users may or may not see a change that the user of the client, which is a current user of the file, has made on the file while the file has been checked-out. For example, the server 112 may receive the check-in input from the first client after the modifying, and in response to such receipt, the server 112 may check-in the file such that the file can be modified by the second client, as disclosed herein.

In a block 512, the server 112 dynamically generates a page based on the first row and the second row. For example, the server 112 serves the page (on the client computing device 124) with a first input field based on the first row and a second input field based on the second row, as disclosed herein. The server 112 may serve the page to the client computing device 124 over the WAN 102 based on a request received from the client computing device 124 over the WAN 102. For example, upon receiving the page request from the client, such service can comprise the server generating and then sending a set of executable instructions, such as markup language code, such as HTML or XML, to the client for execution, such as locally, to present the page, such as via a browser running on the OS of the client. Note that such service can comprise the server generating and then sending the page to the client for presentation, such as locally, such as via a browser running on the OS of the client or non-browser app running on the OS, such as a mobile non-browser app. Note that such service can comprise an authenticated session between the server 112 and the client, such as for security purposes. The authenticated communication session can be via HTTPS protocol. The authenticated communication session can be via login/password or biometrics.

The page visually presents, as dynamically generated, a label and an input element, such as a text entry box, a checkbox, a slider, a button, a dropdown menu, a sliding scale, or another other visual element. The label comprises the first or second statement, such as an alphabetic string, sourced from the first or second statement cell, as modified if at all in the spreadsheet, based on dynamic page generation, such as via the first or second key, as modified if at all in the spreadsheet. The input element is configured for an input, such as via a radio or option button or a dropdown menu, according to the first or second data type identifier sourced from the first or second data type cell in the spreadsheet, as modified if at all in the spreadsheet, based on dynamic page generation.

In a block 514, the server 112 populates a data structure, such as a file, based on an input from the page, such as via an input field. The data structure can be a table, a list, a matrix, a grid, a queue, a stack, a deck, a quadtree, or others. For example, the file can comprise a productivity document file, such as an MS Word or Excel file, or a PDF document or a markup language file, such as an HTML file. Note that the server 112 can store the data structure before the storing of the input or retrieve the data structure via the DBMS hosted on the server 114 from the database hosted on the server 114. Also, note that the server 112 can generate the data structure before the storing, whether immediately before or not immediately before. Also, note that the data structure may be an original file or a copy of another data structure, whether the copy is generated via the server 112 or the server 114. Additionally, note that the server 112 or the server 114 can generate the data structure in response, whether immediate or not, to receiving the input. Moreover, the data structure can comprise a unique identifier before the inserting. For example, the unique identifier can be a barcode, a QR code, an alphanumeric string, or an image. For example, the server 112 or the server 114 can generate, retrieve, copy, or otherwise access the data structure based on the unique identifier. The file (e.g., data structure) may represent the page presented on the client computing device 124 (block 512) and may include all the responses (e.g., inputs) received from the client computing device 124.

In some embodiments, the file with the spreadsheet can be stored local on a client, such as on the client or a memory device coupled to the client, such as an external hard disk, or an optical drive, a network-based storage drive, or a flash drive. For example, the file with the spreadsheet can be stored remote from the client, such as a network-based file hosting service, which may provide a cloud-based storage, file synchronization, personal cloud, or client software. For example, the network-based file hosting service may allow a user to create a folder on the user's computer, where the folder is synchronized, whether in real-time or periodically, with the network-based file hosting service such that the folder appears to be same folder (with same contents) regardless of which computing device is used to view the folder. For example, the network-based file storage service can comprise Dropbox or Google Drive. Therefore, the file with the spreadsheet can be locally processed, whether additional to or alternative to server processing.

Figure 6:
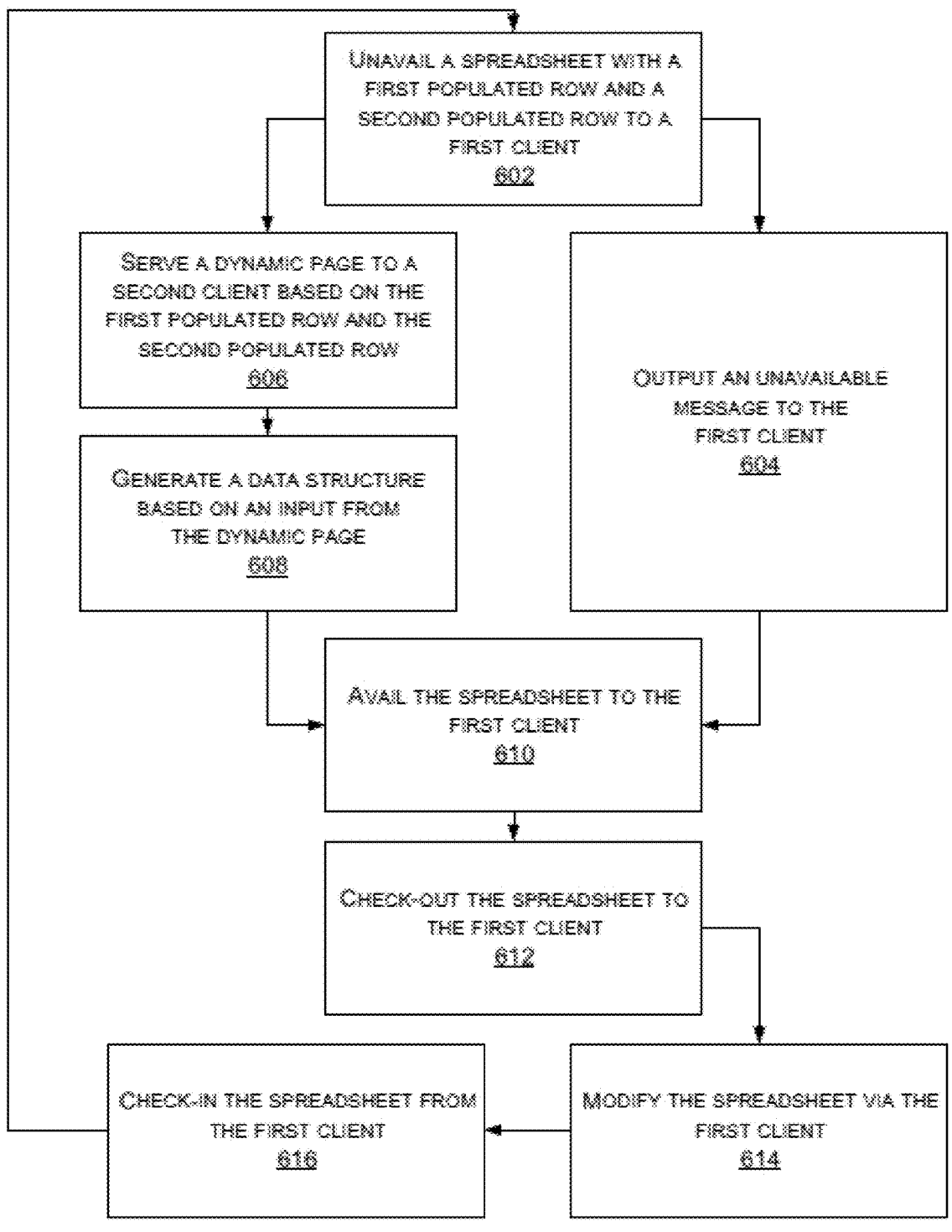
FIG. 6 shows a flowchart of an embodiment of a second process for document management according to an embodiment.

FIG. 6 shows a flowchart of an embodiment of a second process for document management according to the present disclosure. A process 600 includes a plurality of blocks 602-616. The process 600 can be performed via the topology 100 of FIG. 1, in whole or in part. The process 600 may be performed via the server 112 hosting a spreadsheet processing engine, which may comprise a document check-in/check-out component, a page generation component, and a data structure generation component. For example, a component may comprise a module, an engine, a function, a routine, a class, an object, or others. The process 600 may be useful to ensure data integrity for the spreadsheet processing engine, such as during dynamic page generation. The process 600 may also be useful to testing how a page is served or a data structure is generated.

In a block 602, the server 112 unavails a spreadsheet with a first populated row and a second populated row to a first client. The first populated row or the second populated row may be populated, as disclosed herein, such as via the first client before the unavailing. Also, note that such unavailing can be client-activated/triggered, such as via the first client communicably interfacing with the first server, such via check-in/check-out process. Further, such unavailing can be performed via a network security system process, such as via the firewall 106 or the firewall 110, a hiding of the spreadsheet process from the first client, such as the firewall 106 or the firewall 110, a document management system or the document check-in/out component, which may be unitary with the document management system. Therefore, via checking-out the spreadsheet to the first client, the server 112 prevents the first client from modifying/editing that a content of the spreadsheet, which may even include reading the content.

In a block 604, the server 112 outputs an unavailable message, such as a check-out message, to the first client. For example, the server 112 serves, such as over the LAN 116, the unavailable message, such as a spreadsheet unavailable message, to the first client when the first client attempts to access the spreadsheet. Therefore, the server 112 prevents, such as via file locking/privilege control/permission (read, write, delete) control, the first client from accessing the spreadsheet when the first client attempts to access the spreadsheet. The unavailable message may inform the first client that the spreadsheet is checked-out and may notify whom the spreadsheet is checked-out to, such as the server 112.

In a block 606, the server 112 serves a dynamic page to a second client based on the first populated row and the second populated row. For example, the server 112 dynamically generates the page based on the first populated row and the second populated row. For example, the server 112 serves the page with a first input field based on the first row and a second input field based on the second row, as disclosed herein. The server 112 may serve the page to the second client, such as the client computing device 124 or the terminal 120, over the WAN 102 based on a request received from the second client over the WAN 102. For example, upon receiving the page request from the second client, such service can comprise the server generating and then sending a set of executable instructions, such as markup language code, such as HTML or XML, to the second client for execution, such as locally, to present the page, such as via a browser running on the OS of the second client. Note that such service can comprise the server 112 generating and then sending the page to the second client for presentation, such as locally, such as via a browser running on the OS of the second client or non-browser app running on the OS, such as a mobile non-browser app. Note that such service can comprise an authenticated session between the server 112 and the second client, such as for security purposes. The authenticated communication session can be via HTTPS protocol. The authenticated communication session can be via login/password or biometrics.

The page visually presents, as dynamically generated, a label and an input element, such as a text entry box, a checkbox, a slider, a button, a dropdown menu, a sliding scale, or another other visual element. The label comprises the first or second statement, such as an alphabetic string, sourced from the first or second statement cell, as modified if at all in the spreadsheet, based on dynamic page generation, such as via the first or second key, as modified if at all in the spreadsheet. The input element is configured for an input, such as via a radio or option button or a dropdown menu, according to the first or second data type identifier sourced from the first or second data type cell in the spreadsheet, as modified if at all in the spreadsheet, based on dynamic page generation.

In a block 608, the server 112 generates a data structure based on an input from the dynamic page. For example, the server 112 populates the data structure, such as a file, based on the input from the page, such as via an input field. The data structure can be a table, a list, a matrix, a grid, a queue, a stack, a deck, a quadtree, or others. For example, the file can comprise a productivity document file, such as an MS Word or Excel file, or a PDF document or a markup language file, such as an HTML file. Note that the server 112 can store the data structure before the storing of the input or retrieve the data structure via the DBMS hosted on the server 114 from the database hosted on the server 114. Also, note that the server 112 can generate the data structure before the storing, whether immediately before or not immediately before. Also, note that the data structure may be an original file or a copy of another data structure, whether the copy is generated via the server 112 or the server 114. Additionally, note that the server 112 or the server 114 can generate the data structure in response, whether immediate or not, to receiving the input. Moreover, the data structure can comprise a unique identifier before the inserting. For example, the unique identifier can be a barcode, a QR code, an alphanumeric string, or an image. For example, the server 112 or the server 114 can generate, retrieve, copy, or otherwise access the data structure based on the unique identifier. Therefore, since the server 112 checks-out the spreadsheet to the spreadsheet processing engine, the server 112 ensures that the page is dynamically generated properly, while minimizing data integrity issues and maximizing data accuracy, which may arise if the spreadsheet is edited while the page is being served. Likewise, since the server 112 checks-out the spreadsheet to the spreadsheet processing engine, the server 112 ensures that the data structure is generated properly, while minimizing data integrity and maximizing data accuracy.

In some embodiments, the file with the spreadsheet can be stored local on a client, such as on the client or a memory device coupled to the client, such as an external hard disk, or an optical drive, a network-based storage drive, or a flash drive. For example, the file with the spreadsheet can be stored remote from the client, such as a network-based file hosting service, which may provide a cloud-based storage, file synchronization, personal cloud, or client software. For example, the network-based file hosting service may allow a user to create a folder on the user's computer, where the folder is synchronized, whether in real-time or periodically, with the network-based file hosting service such that the folder appears to be same folder (with same contents) regardless of which computing device is used to view the folder. For example, the network-based file storage service can comprise Dropbox or Google Drive. Therefore, the file with the spreadsheet can be locally processed, whether additional to or alternative to server processing.

In a block 610, the server 112 avails the spreadsheet to the first client. Such availing can be performed via a network security system process, such as via the firewall 106 or the firewall 110, an un-hiding of the spreadsheet process from the first client, such as the firewall 106 or the firewall 110, a document management system or the document check-in/out component, which may be unitary with the document management system. Therefore, via checking-in the file from the spreadsheet processing engine, the server 112 enables the first client to modify/edit a content of the spreadsheet, which may even including reading the content. Also, note that such availing can be client-activated/triggered, such as via the first client communicably interfacing with the first server, such via check-in/check-out process. For example, such client activation/trigger can be an interrupt command, which may interrupt page service or data structure generation.

In a block 612, the server 112 checks-out the spreadsheet to the first client, as disclosed herein. Therefore, a third client, such as the terminal 120, is unable to check-in the spreadsheet at least for modifying/editing, such as for data integrity purposes. For example, the checking-out can be managed via the document management system, as disclosed herein.

In a block 614, the server 112 modifies the spreadsheet via the first client, as disclosed herein. For example, such modification may be of the blocks 414-418.

In a block 616, the server 112 checks-in the spreadsheet from the first client. The spreadsheet is checked-in from the first client. Therefore, the third client or the spreadsheet processing engine is able to check-out the spreadsheet at least for modifying/editing or page service or data structure generation. For example, the checking-in can be managed via the document management system, as disclosed herein. Therefore, the spreadsheet processing engine may perform the block 602. Although FIG. 6 appears to show an infinite loop, note that the process 600 can be interrupted by the interrupt, as disclosed herein, or other process interrupt procedures, such as updates or maintenance or by the first client. The embodiment illustrated in FIG. 6, allows the page to be dynamically rendered to the second client without being modified by the first client while the page is being viewed by the second client. For example, the first client may not have access to the spreadsheet while the second client is interacting with the page. The first client must wait until the second client has completed interacting and the server 112 has generated the data structure (block 608).

Figure 7A:
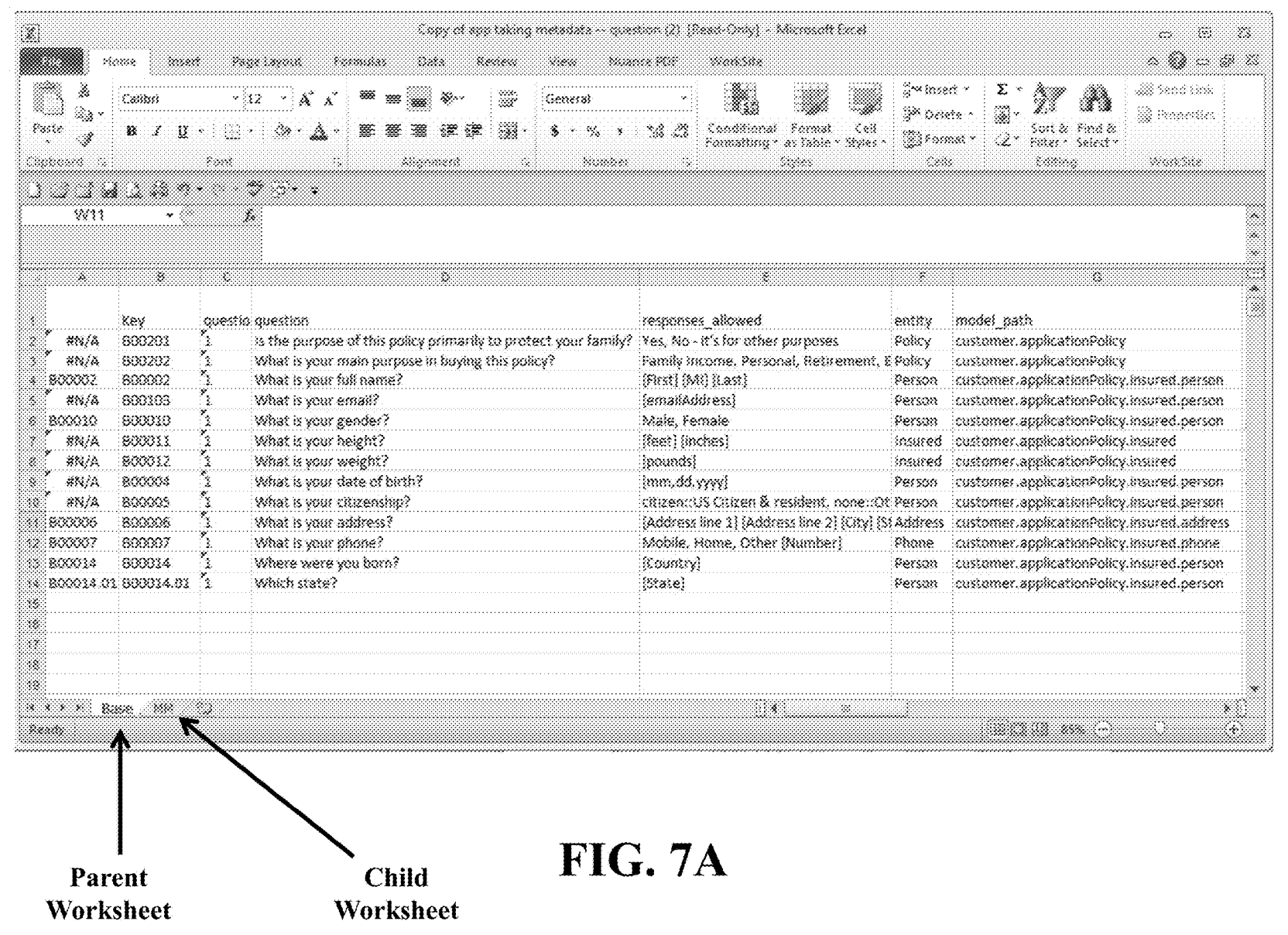
Figure 7B:
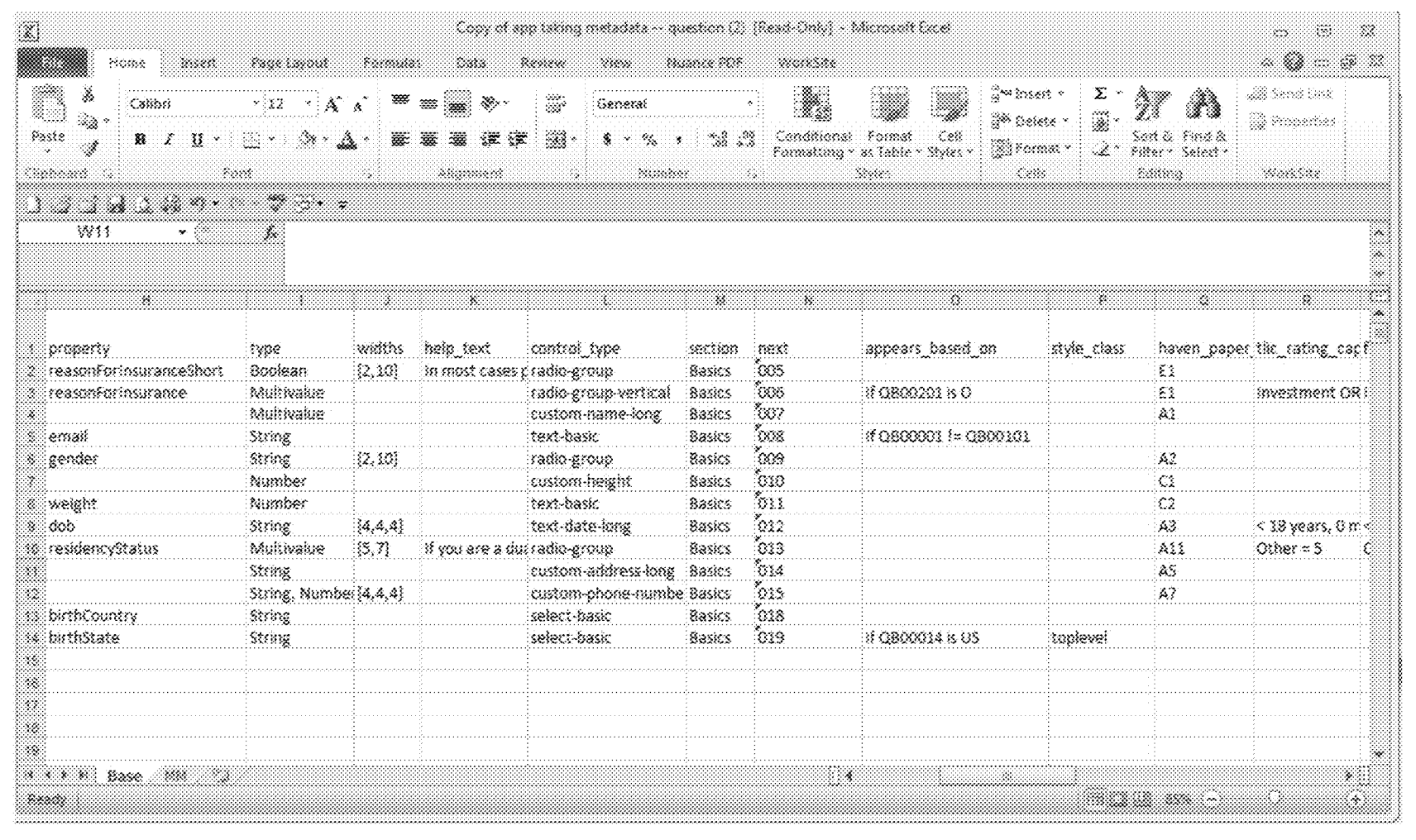
Figure 7C:
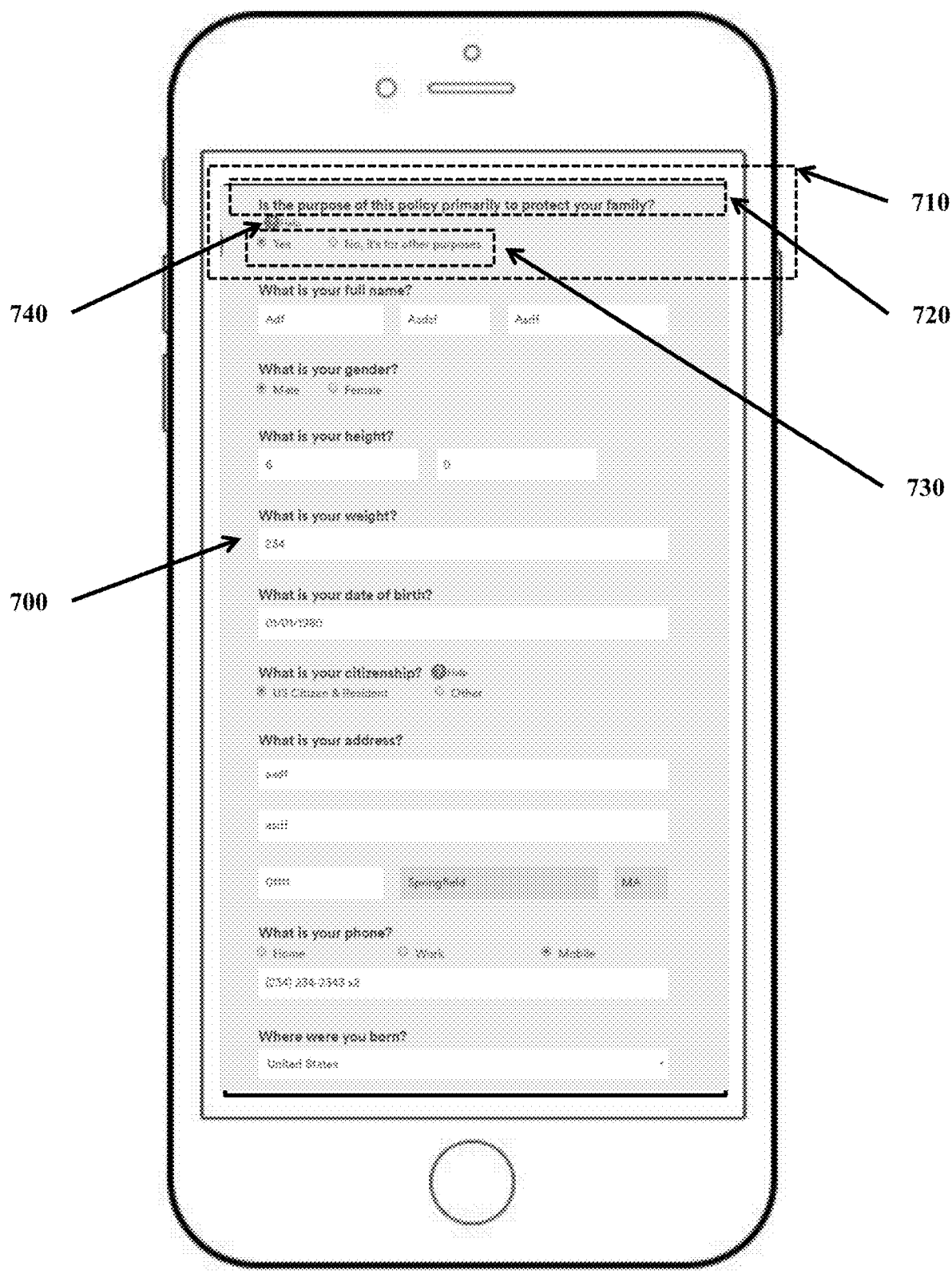
FIG. 7C shows a screenshot of an embodiment of a network page dynamically generated based on a parent worksheets of FIGS. 7A-B according to the an embodiment.

FIGS. 7A-B show a screenshot of an embodiment of a spreadsheet containing a parent worksheet being active for data input as selected via a parent worksheet tab and a child worksheet being inactive for data input as not selected via a child worksheet tab according to the present disclosure. FIG. 7C shows a graphical user interface dynamically rendered based on the spreadsheets illustrated in FIGS. 7A-B. As illustrated in FIG. 7A, the parent spreadsheet comprises of data needed to dynamically generate a GUI. For example, column B illustrates a key cell that identifies the row (e.g., the field to be rendered); Column C illustrates a question level that may be modified by the user; column D illustrates a statement cell (e.g., the question or the statement to be rendered); column E represents the logic of the response (e.g., accepted responses). In an embodiment, the server 112 uses row #2 (e.g., key #00201) to render component 710 on GUI 700. The server 112 uses cell D-2 to populate the text component 720, uses cell K-2 to render the help button 740 (e.g., when the use interacts with the help button 740, the GUI 700 displays the text from cell K-2), uses cell L-2 to render radio buttons 730. Some of the statements may comprise a question and the server 112 may present a question in a reflexive manner based on a rule controlling when a question will or will not be asked. For example, once the server 112 receives an input from the client computing device 124, the server 112 renders the next GUI component based on the information provided by column N and the conditions provided by column 0. For example, if the server 112 receives a "No, it's for other purposes" input to radio buttons 730 (as outlines in cell 0-3), the server 112 will display row #3 (e.g., Key #00202) based on the received instructions from cell N-3. As illustrated in FIG. 7C, the answer received by the server 112 was "yes." As a result, the server 112 renders row #2 instead of row #3. Parent worksheet also illustrates the aesthetic preferences for rendering the GUI 700. For example, cell J-2 instructs the server 112 as to the width of the component 710. The worksheets (the parent and the child worksheets) may also control lateral or longitudinal length, color/contrast, position, font, shape, size, or other relevant attribute of any GUI component.

Figure 8A:
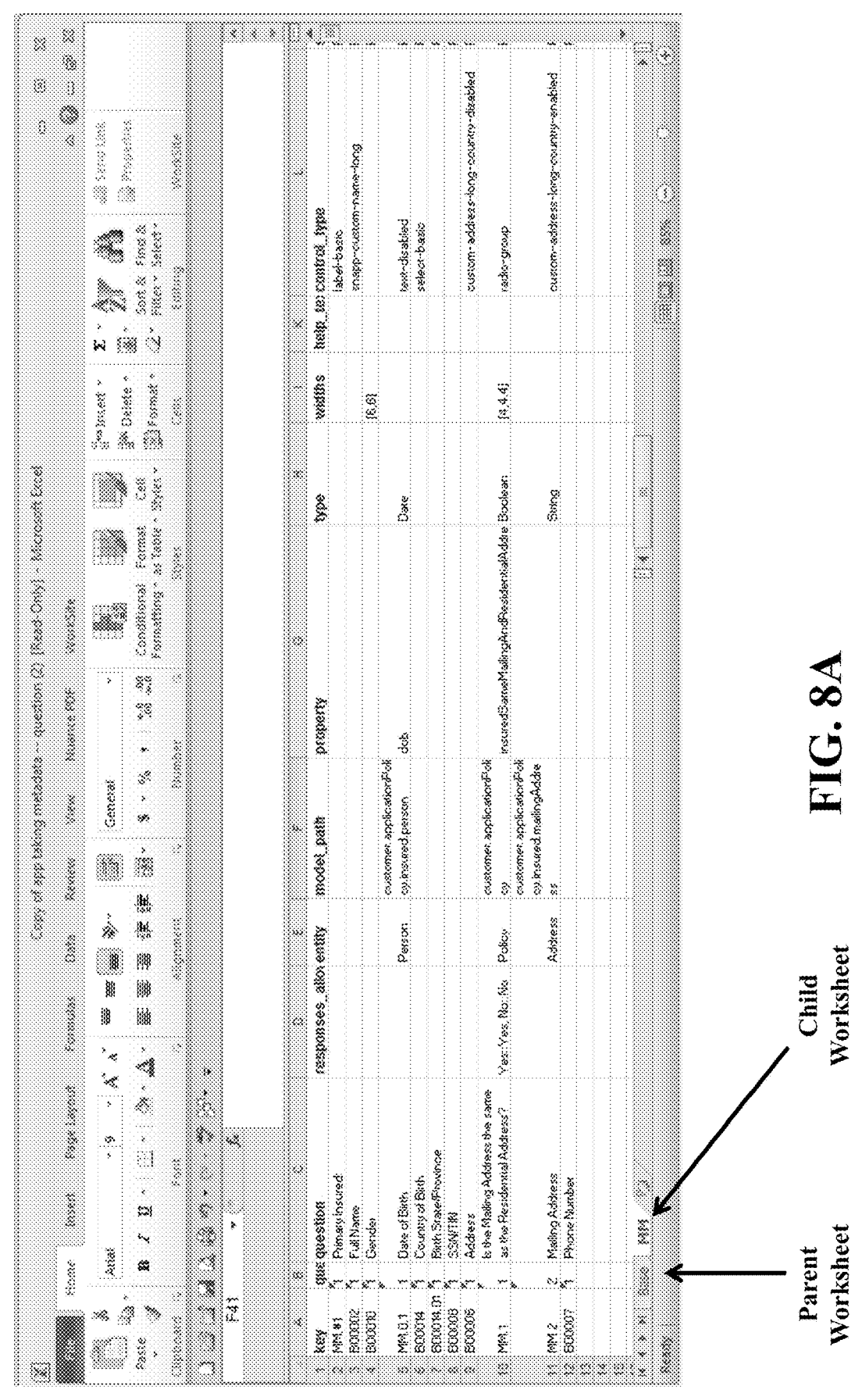
Figure 8B:
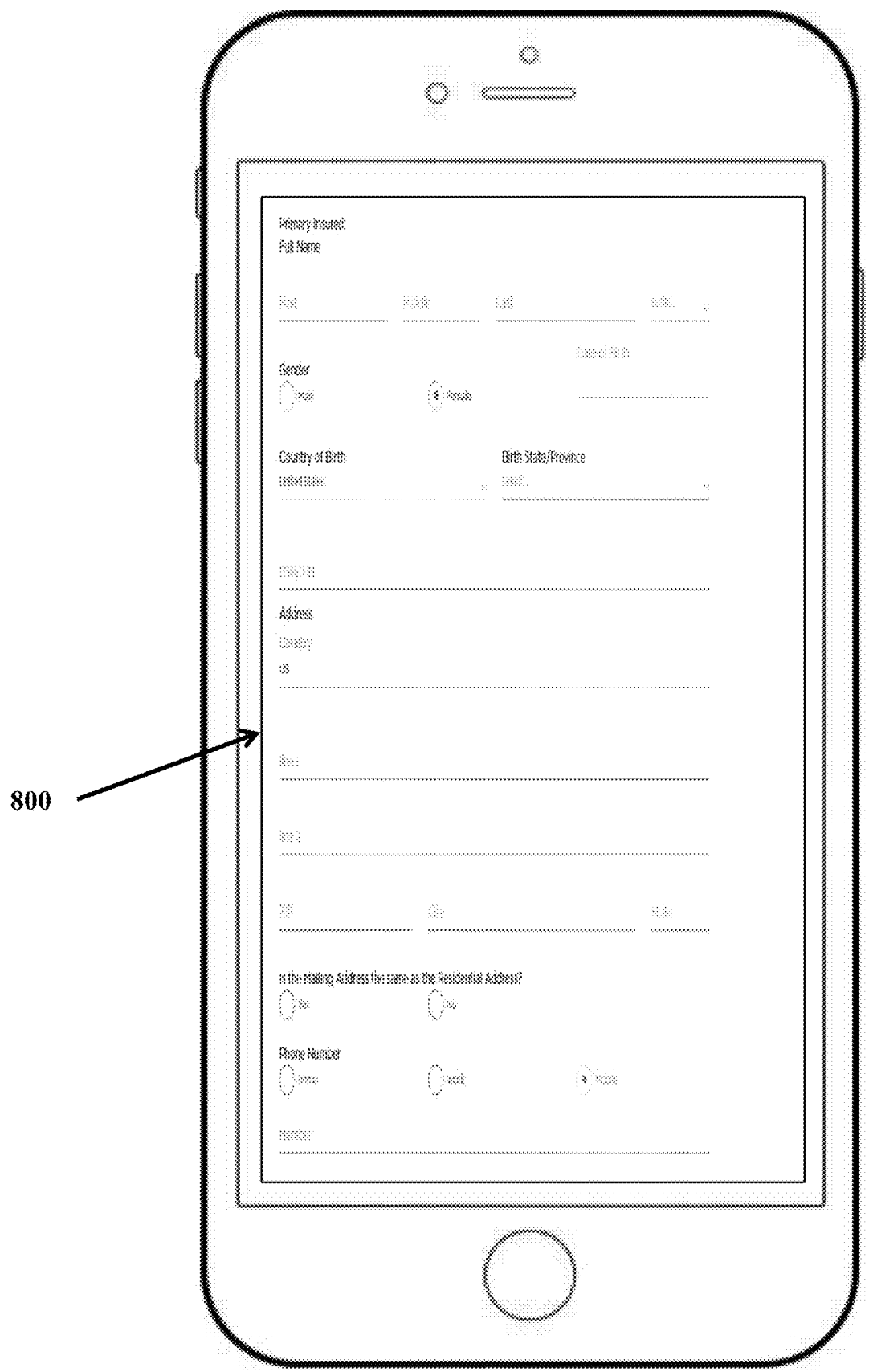
FIG. 8B shows a screenshot of an embodiment of a network page dynamically generated based on a parent worksheet of FIG. 8A according to an embodiment.

FIG. 8A shows a screenshot of an embodiment of a spreadsheet containing a parent worksheet being inactive for data input as not selected via a parent worksheet tab and a child worksheet being active for data input as selected via a child worksheet tab according to the present disclosure. FIG. 8B shows a graphical user interface dynamically rendered based on the spreadsheet illustrated in FIG. 8A. The child spreadsheet illustrated is FIG. 8A may be a spreadsheet generated by the server 112 using the object-oriented programming concept of "inheritance" where the rows of the child worksheet inherit the property, attribute, and features of the parent worksheet (or another worksheet as directed by the user). For example, in the spreadsheet illustrated in FIG. 8A, rows with a prefix of B inherit properties of their corresponding rows from the parent worksheet (FIG. 7A-B). The user may have the ability to override or modify these properties. If left blank (e.g., row #3) the server 112 may render the GUI based on the properties of the indicated key (e.g., row #4 of the parent worksheet). The server 112 may use the same method (shown above in FIG. 7A-C) to render a GUI that corresponds to the child worksheet. For example, the server 112 uses the cells of the child worksheet to render GUI 800.

Figure 9:
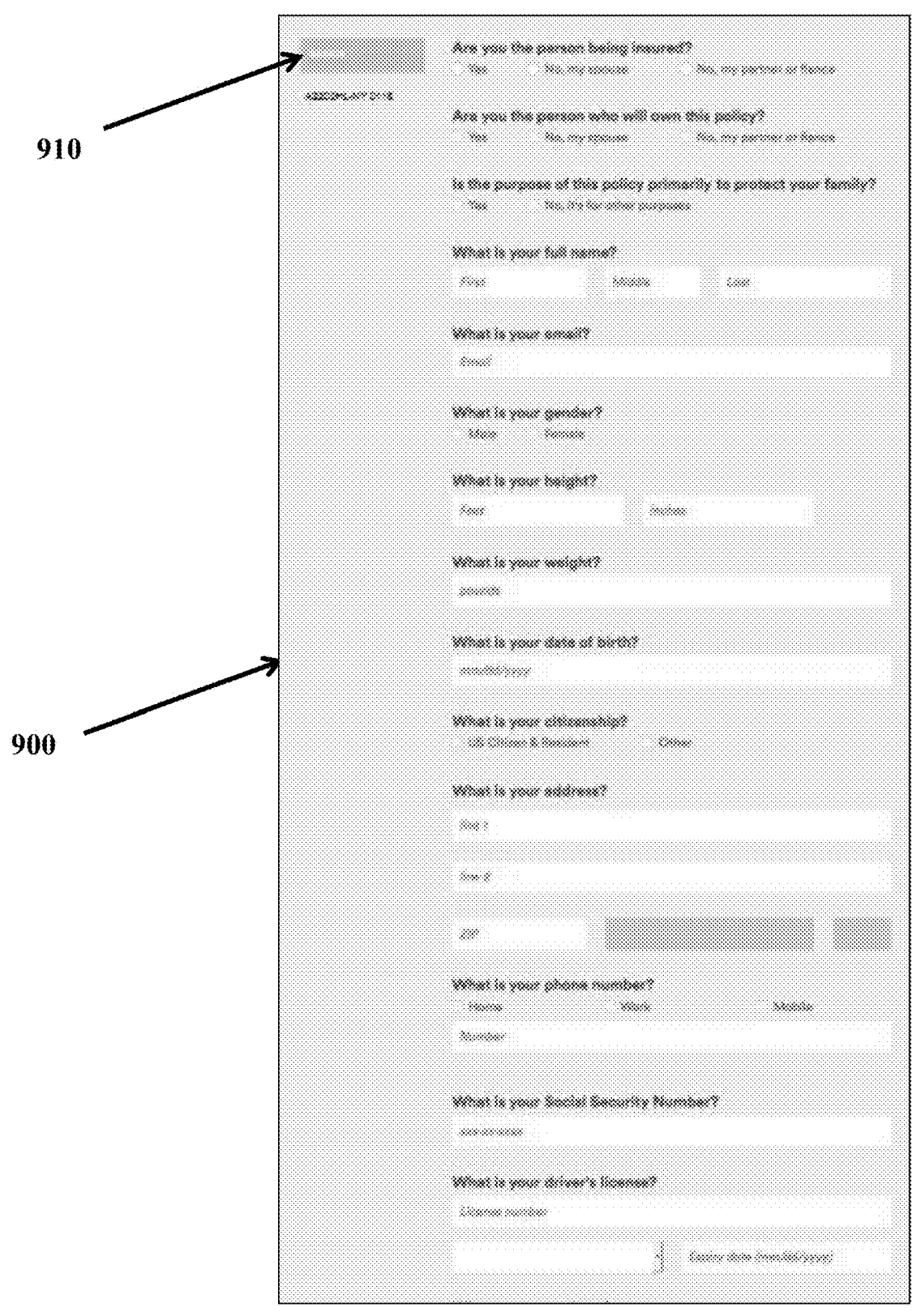

FIG. 9 shows a screenshot of an embodiment of a single network page generated based on a spreadsheet according to the present disclosure. The single network page is scrollable along a vertical plane. The single network page depicts various fields as generated via the worksheets of FIGS. 7A-B. Screenshot 900 may depict the components of GUI 700 and may include the inputs received from the client computing device (not shown). Furthermore, screenshot 900 may reorganize the GUI components in a way that is customizable by the user/client. For example, screenshot 900 may be generated to replicate the exact order of components and questions viewed by the user. The screenshot 900 may also designate and/or organize each component by its respective "section" (e.g., column M of the parent worksheet) or any other attribute of the worksheet that the server 112 has used to render the GUI.

FIG. 10 shows an embodiment of a table of reflexive questions and rules, where the reflexive questions appear in a dynamically adjusted network page based on the rules, where the rules determine when a question will or will not be asked according to the present disclosure. The server 112 may generate the table of reflexive questions based on the worksheet that the server 112 has used to render the GUI presented on the client computing device. For example, table 1000 corresponds to the parent worksheet illustrated in FIGS. 7A-B and illustrates the logic used to generate GUI 700. Table 1000 may comprise a plurality of columns and a plurality of rows. As shown; the question number column lists the key (a question number), the logic column lists the logic (a rule defining for when a question will or will not be asked i.e, controlling a reflexive question aspect of the spreadsheet), the statement column lists the statement (a question string) and the input type column lists the input type (an option for a response to a question string), For example, if an answer to a question 1 (key is 1), "Are you the person being insured?" is "my spouse" or "my partner or fiancé", then a reference to "your" from question 2 (key is 2) and beyond will change to "your spouse" or "your partner". If the answer to question 101 (key is 101) "my spouse" or "my partner or fiancé," then a reference to "your" from question number 102 (key is 102) through 191 (key is 191) will change to "your spouse" or "your partner".

Figure 11:
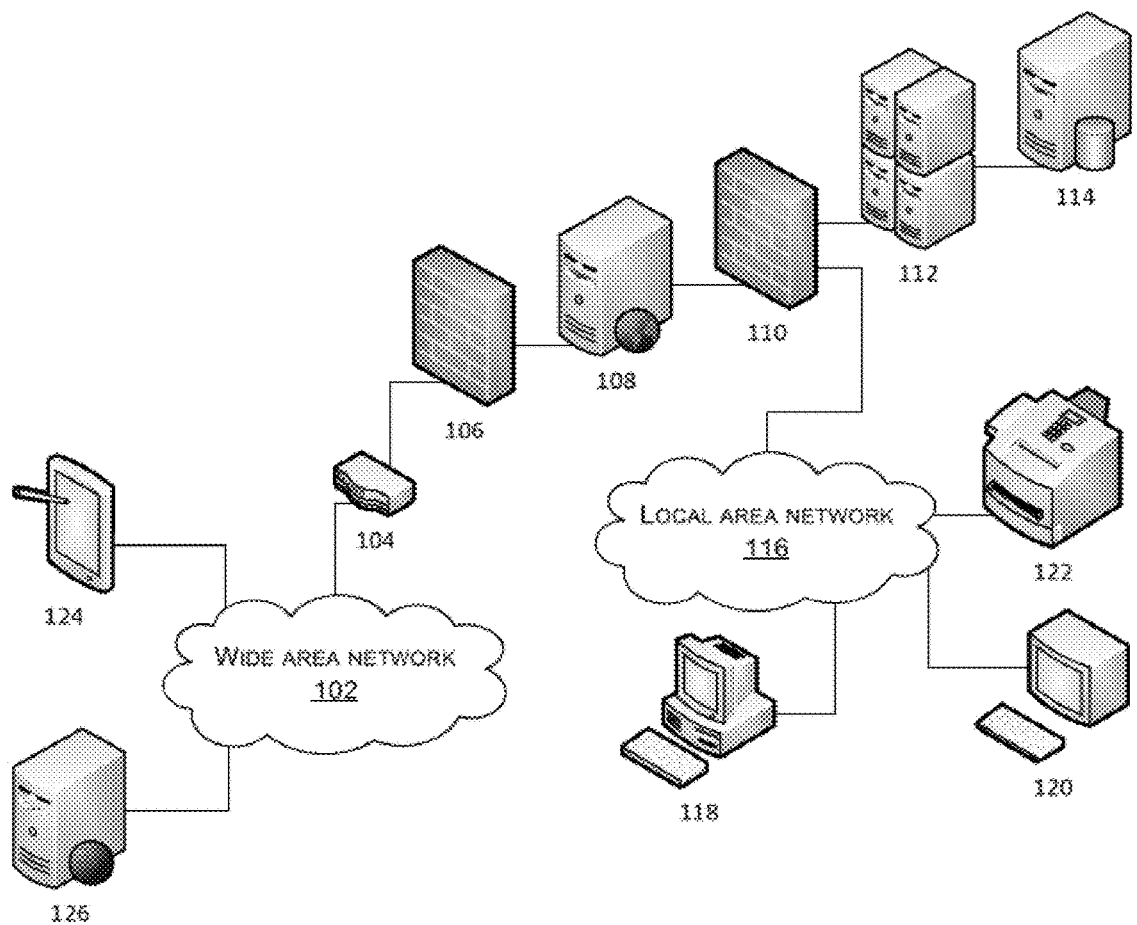
FIG. 11 shows a schematic view of an embodiment of a network topology according to an embodiment.

FIG. 11 shows a schematic view of an embodiment of a network topology according to an embodiment. A topology 1100 is similar to the topology 100 except for an inclusion of a data source 126 communicably coupled to the WAN 102, whether directly or indirectly. The data source 126 can include a server, such as a network server, an application server, a database server, or any other server or a combination thereof, including any disclosed herein. For example, the server can include a network server, such as the server 108, an application server, such as the server 112, or a database server, such as the server 114, or any other server or any combination thereof. Note that the data source 126 can include a single server or a multiple servers, which may be communicably coupled with each other, whether directly or indirectly, such as via a storage area network (SAN). The data source 126 can be stationary, such as housed in a single data center or distributed among a plurality of data centers, or mobile, such as a mobile device or a vehicle, whether land, marine, or aerial. The data source 126 may source content, such as via serving, such as an alphanumeric content, image content, sound content, data structures, strings, symbols, files, streams, records, fields, or other data, whether in an encrypted or unencrypted manner, whether raw or formatted, whether before sourcing or during sourcing. The data source 126 can be included in the first segment, the second segment, or a third segment operated via a third operator, as disclosed herein.

Various data gathering/collection/generation/analyses processes are described below. Any of such processes may be used with a worksheet of a spreadsheet, as disclosed herein, to receive an intake for a service application, such as for an insurance application, a mortgage application, or any other document management process. For example, an intake for an application, such as a word processing document, a database record, a table, or another data structure, may involve pulling a set of data from a data source over a network, such as a 3rd party server, such as the data source 126, or assume, such as via pre-association or data structure pre-population, a set of inputs for a set of outputs, such as via having a null or a default value being associated with a query, or exclude a set of content from a file, such as an alphanumeric formatted content. Note that reflexive output generation and service may be used. For example, such processing may be useful in mobile device environments, where users may be challenged in answering a multiplicity of queries, such as due to small display size.

In operation, when a mobile client (e.g., a client operating a mobile electronic device) submits a first set of data to a server, the server may interface with a data source, such as via a web service transaction to deliver data and retrieve a second set of data relevant to the first set of data. The second set of data may get layered in order to determine what the second set of data represents in aggregate, such as understanding a medical history for a user by creating a category of information, such as medical history with info from other data sources and applying a set of rules or logic from a worksheet on aggregated class of information, as to whether the server should present the mobile client with a first set of queries or a second set of queries longer (with more questions) than the first set of queries. Therefore, the server is enabled to examine categories of data, which may be standardized, from multiple data sources rather than look at a single source. For example, if a data category is associated with a set of recent laboratory procedures data for the user, then the server may retrieve relevant data from prescription provider server that gives more user profile insight and interface with another service provider server to obtain more user profile insight. For example, such categorical data retrievals may relate to additional questions, such as sourced from a worksheet, as disclosed herein, but not necessarily all of additional questions. For example, data category triggers may request secondary or tertiary rounds of questions specific to that user. For example, upon presenting questions on the mobile client, the server can gather data that shows a certain concept or property, and then ask another question. Since data categories may need data properties, and if data category is triggered, then data properties have required or optional statuses, and if data property is required and unfulfilled, then the data property needs a question to fulfill that property. In some use cases, each data category is a module with defined variables as required/option and a set of action items to resolve a conflict, if any. Generally, such type of processing cannot be manually performed because data is complex and in large volumes. For example, a single response from a data source might include hundreds or thousands of data elements, which then may be combined with other query responses, including from multiple data sources. For example, in some use cases, such processing needs to happen within 40-50 seconds after a set of data is received from a client, where 40 seconds is how long to generate a query, send the query, and receive a response for the query, and where 6-7 seconds are needed to apply one or more rules, such as from a worksheet. Further, user/client identity validation and verification, which may involve another data source, which may involve data cleaning or pre-processing, takes more time, especially since such processing may reduce false positives or reduce inaccurate matches or reduces failed transactions. In some embodiments, at least some of such software techniques are device-agnostic and, as such, can be performed via other computing devices, such as desktops, servers, mainframes, workstations, terminals, light-clients, or others computing devices, whether locally or via interfacing with a network-based data source.

Figure 12:
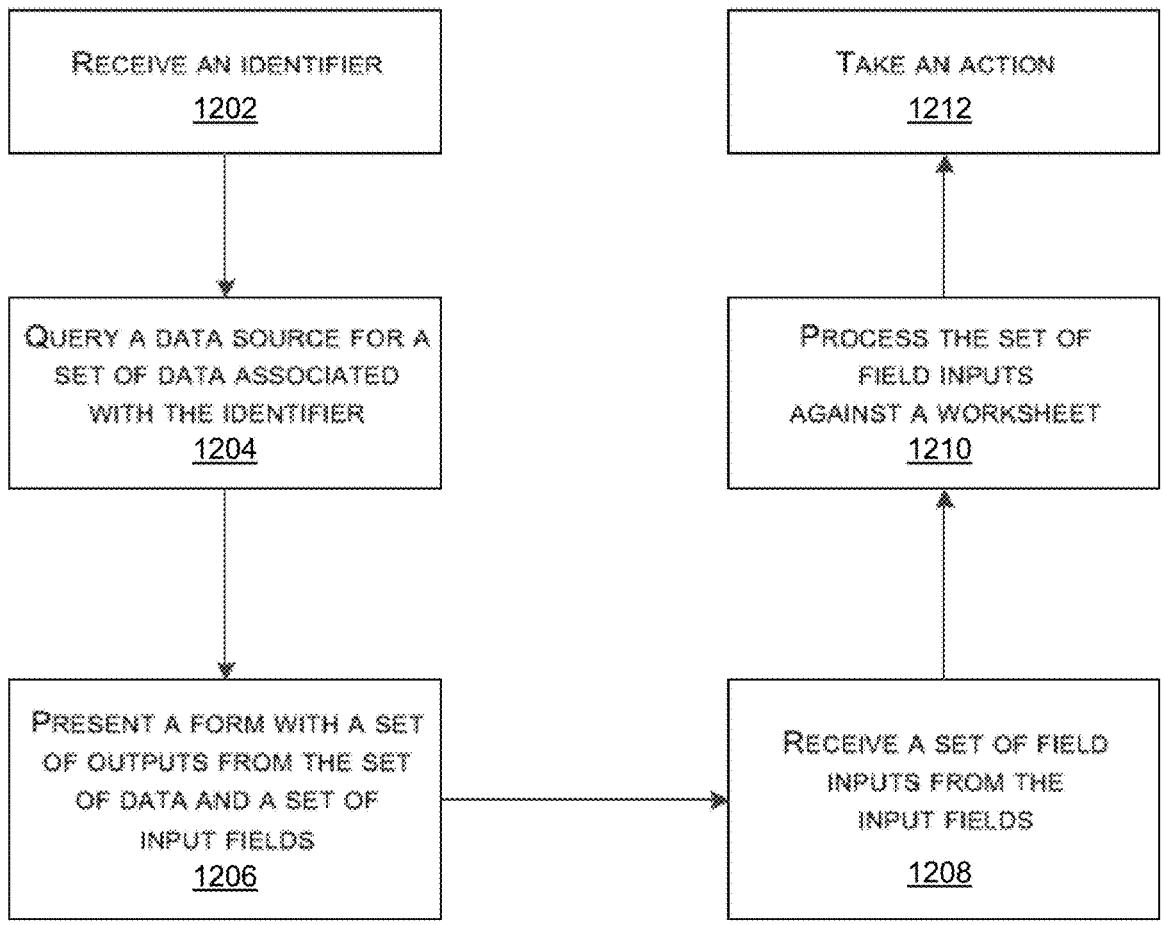
FIG. 12 shows an embodiment of a process employing a worksheet according to an embodiment.

FIG. 12 shows an embodiment of a process employing a worksheet according to this disclosure. A process 1200 includes a plurality of blocks 1202-1212. The process 1200 can be performed via the topology 1100 of FIG. 11, in whole or in part.

In a block 1202, the server 112 receives an identifier from the client 124 over the WAN 102. The identifier can be received during a communication session between the server 112 and the client 124. For example, the communication session can be a service of a network page, such as a web page programmed as a form to contain a set of fields configured to receive a set of inputs from the client 124. For example, the identifier can be a user identifier, which may be unique, whether in content or format. For example, the identifier can include an alphanumeric string, an image, a sound file, a biometric, or others. For example, the identifier can include a social security number.

In a block 1204, the server 112 queries the data source 126 for a set of data associated with the identifier. The querying is over the WAN 102 through the server 108, the router 104, the firewall 106, and the firewall 110. For example, the data source 126 may host or provide access to a database record associated with the identifier, where the set of data associated with the identifier is at least partially extracted or copied from the database record. The set of data may be formatted or raw, encrypted or unencrypted. The set of data may include alphanumeric data, image data, sound data, or other types of data.

In a block 1206, the server 112 presents a form with a set of outputs from the set of data and a set of input fields to the client 124 over the WAN 102, such as disclosed herein. The form may be manifested through a network page, such as a web page, whether static or dynamic. The set of outputs are based on the set of data retrieved from the data source 126. In data content, type, or format, the set of outputs can be precisely as retrieved from the set of data or formatted, massaged, or converted from the set of data. The input fields on the form may be empty or pre-populated with preset values of any data type, such as alphanumeric or others. Such pre-population may be sourced via a worksheet, such as when the set of data is processed against the worksheet, as disclosed herein. The input fields can be programmed for any type of input, such as text entry, dials, buttons, sliders, checkboxes, or other input elements of any type, such as Boolean.

In a block 1208, the server 112 receives a set of field inputs from the input fields. The server 112 receives the set of field inputs from the client 124 over the WAN 102, such as disclosed herein, whether in a single action or a plurality of actions, whether consecutive or not. For example, some members of the set of field inputs may be received at one point in time and others in another point in time, which may be non-immediate, such as periodic, such as every five seconds. For example, the set of field inputs may be received as the form is being populated in real-time or after or upon an activation of an element presented on the form, such as a hyperlink or a button. The set of field inputs may be of any data type, such as alphanumeric, image, sound, or others. The set of field inputs may edit, correct, add, or supplement the set of outputs of the block 1206.

In a block 1210, the server 112 may process the set of field inputs against a worksheet, as disclosed herein. The server 112 may also process the set of outputs that were not modified by the set of field inputs, where such processing involves processing the set of outputs against a worksheet, as disclosed herein.

In a block 1212, the server 112 takes an action, which may be local or remote, whether a single action or multiple actions. For example, the action may be instructed in the worksheet. The action can be of any type, such as generating a message, sending a message, receiving a message, acting on a data structure, an image, a sound, a record, a field, a file, a stream, a string, a text, a worksheet, a document, a database, or any other content/structure where the acting may include modifying, editing, supplementing, deleting, reading, writing, sorting, de-duplicating, archiving, or any other data operations, querying a data source, retrieving a set of data, requesting for an input device to take an action, requesting an output device to take an action, or any other actions.

Figure 13:
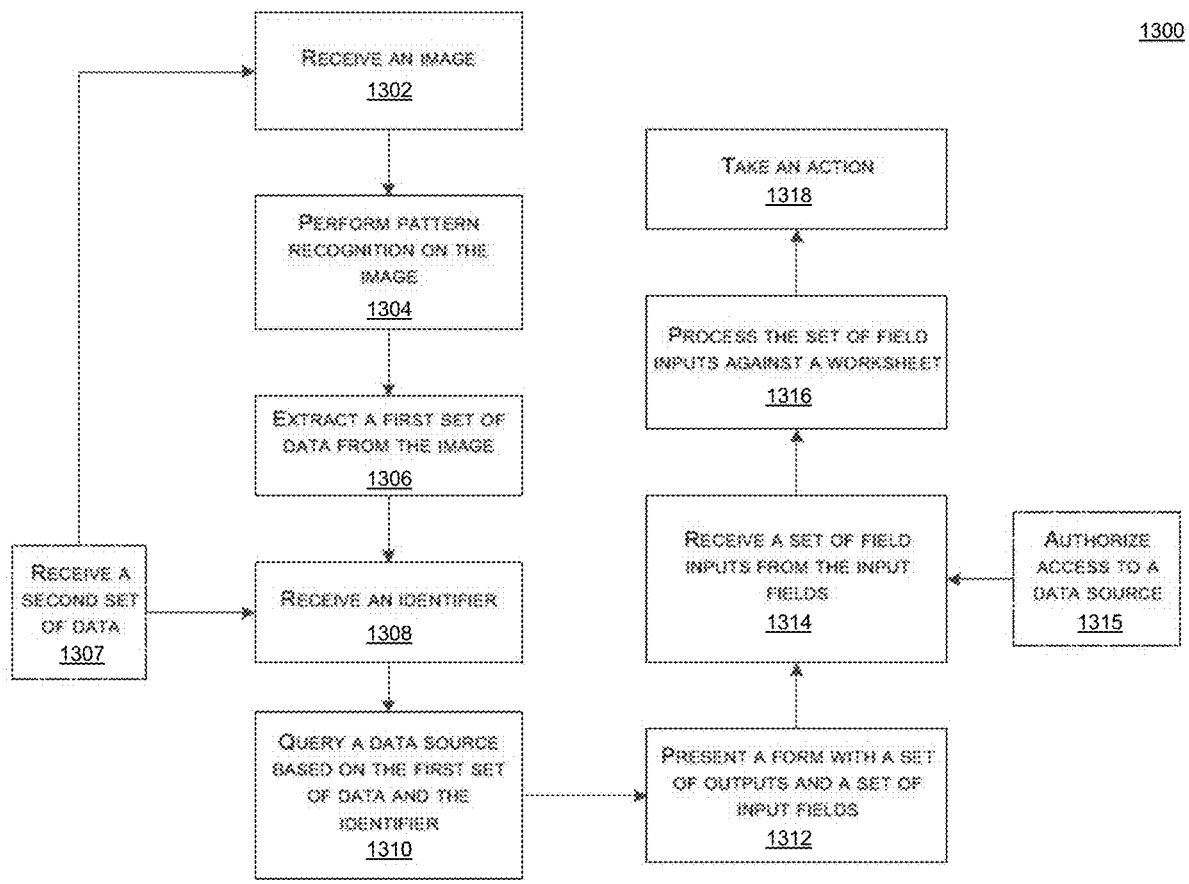
FIG. 13 shows an embodiment of a process employing a worksheet according to an embodiment.

FIG. 13 shows an embodiment of a process employing a worksheet according to an embodiment. A process 1300 includes a plurality of blocks 1302-1318. The process 1300 can be performed via the topology 1100 of FIG. 11, in whole or in part.

In a block 1302, the server 112 receives an image from the client 124 over the WAN 102, as disclosed herein. The image can be a photo or a video, whether captured via a camera of the client 124 or another device. For example, the image can depict a driver's license, including a user photo. The image can be received via an email, a chat, a fax, or an upload via a network page served by the server 112 to the client 124 over the WAN 102. In some embodiments, a self-photo, such as selfie, can also be received, such as captured via the client 124.

In a block 1304, the server 112 performs a pattern recognition on the image. The pattern recognition can include an OCR process. The pattern recognition can be fully or partially performed on the server 112. In some embodiments, the pattern recognition can run on the self-photo in order to determine if a face depicted in the self-photo matches to a face depicted in a license, such as for identity verification.

In a block 1306, the server 112 extracts a first set of data from the image based on the pattern recognition. For example, when the image depicts a driver's license, then the server 112 can extract various data items from the image, such as personal information, address, biological information, identification number, or others. Note that such extraction can include extracting data as depicted or combining various data items into a single data category. For example, such extraction can include an extraction of a height or weight as depicted in the image, such as 70 inches, 5'9, five feet and 11 inches, 2 meters, 180 pounds, 200, or 80 kilograms. For example, such extraction can include extraction of a first address line and a second address line and combining/aggregation of the first address line and the second address line into a single address data item, such as street address and town name/zip code, such as based on positioning of such items in the image or content of such items.

In a block 1307, the server 112 receives a second set of data from the client 124 over the WAN 102, as disclosed herein. The second set of data can include alphanumeric data, image data, sound data, and other data types. The second set of data may be received via a network page, such as a webpage containing a form with a set of fields configured for receiving a set of inputs, where the network page was served via the server 112. For example, the second set of data can include personal information, address, health information, and others. The second set of data is used to verify, add, compliment, correct, or supplement the first set of data. In some embodiments, the block 1307 is omitted. In some embodiment, the second set of data may include additional data received from the user.

In a block 1308, the server 112 receives an identifier from the client 124 over the WAN 102. If the first set of data includes the identifier, then such receipt serves to confirm proper data extraction. If the first set of data does not include the identifier, then such receipt serves as an extra data point for identity verification/validation. The identifier can be received during a communication session between the server 112 and the client 124, which may be a secure session, such as an HTTPS session. For example, the communication session can be a service of a network page, such as a web page programmed as a form to contain a set of fields configured to receive a set of inputs from the client 124. For example, the identifier can be a user identifier, which may be unique, whether in content or format. For example, the identifier can include an alphanumeric string, an image, a sound file, a biometric, or others. For example, the identifier can include a social security number. In some embodiments, the block 1307 and the block 1308 are a single block, where the second set of data includes the identifier.

In a block 1310, the server 112 queries the data source 126 based on the first set of data and the identifier. The first set of data and the identifier are used to maximize chances of matching data, such as a database record, at the data source 126. For example, such querying may be for a set of data, such as a database record, associated with or containing the identifier. In some embodiments, such querying is based on the second set of data, whether additionally or alternatively. The querying is over the WAN 102 through the server 108, the router 104, the firewall 106, and the firewall 110. For example, the data source 126 may host or provide access to a database record containing or associated with the identifier, where the set of data associated with the identifier is at least partially extracted or copied from the database record. The set of data may be formatted or raw, encrypted or unencrypted. The set of data may include alphanumeric data, image data, sound data, or other types of data. In some embodiments, the server 112 may send a query including a facial depiction from the self-photo and a facial depiction from the license in order to maximize chances of a successful record match. In some embodiments, the second set of data may also be used to query the database.

In a block 1312, the server 112 presents a form with a set of outputs and a set of input fields to the client 124 over the WAN 102, such as disclosed herein. The form may be manifested through a network page, such as a web page, whether static or dynamic. The set of outputs are based on querying of the block 1310 and a set of data correspondingly retrieved from the data source 126. In data content, type, or format, the set of outputs can be precisely as retrieved from the set of data or formatted, massaged, or converted from the set of data. The input fields on the form may be empty or pre-populated with preset values of any data type, such as alphanumeric or others. Such pre-population may be sourced via a worksheet, such as when the set of data is processed against the worksheet, as disclosed herein. The input fields can be programmed for any type of input, such as text entry, dials, buttons, sliders, checkboxes, or other input elements of any type, such as Boolean.

In a block 1314, the server 112 receives a set of field inputs from the input fields. The server 112 receives the set of field inputs from the client 124 over the WAN 102, such as disclosed herein, whether in a single action or a plurality of actions, whether consecutive or not. For example, some members of the set of field inputs may be received at one point in time and others in another point in time, which may be non-immediate, such as periodic, such as every five seconds. For example, the set of field inputs may be received as the form is being populated in real-time or after or upon an activation of an element presented on the form, such as a hyperlink or a button. The set of field inputs may be of any data type, such as alphanumeric, image, sound, or others. The set of field inputs may edit, correct, add, compliment, or supplement the set of outputs of the block 1312.

In a block 1315, the server 112 may receive an authorization to access a data source, whether the data source 126 or another data source, such as a healthcare provider server or an electronic health record server. The authorization is received from the client 124 over the WAN 102. Such authorization may be received when the set of outputs, such as presented on the form, or the set of field inputs meet a predetermined set of criteria or satisfy a set of thresholds, such as accessible to the server 112. For example, when the set of outputs are not sufficiently informative, such as via being null or incorrect, then the server 112 can output a message to the client 124, such as via a network page, and request for the client 124 to authorize access to the data source. Then, upon such authorization, the server 112 may access that data source to request data to make up for the set of outputs not being sufficiently informative.

In a block 1316, the server 112 may process the set of field inputs against a worksheet, as disclosed herein. The server 112 may also process the set of outputs that were not modified by the set of field inputs, where such processing involves processing the set of outputs against a worksheet, as disclosed herein.

In a block 1318, the server 112 takes an action, which may be local or remote, whether a single action or multiple actions. For example, the action may be instructed in the worksheet. The action can be of any type, such as generating a message, sending a message, receiving a message, acting on a data structure, an image, a sound, a record, a field, a file, a stream, a string, a text, a worksheet, a document, a database, or any other content/structure where the acting may include modifying, editing, supplementing, deleting, reading, writing, sorting, de-duplicating, archiving, or any other data operations, querying a data source, retrieving a set of data, requesting for an input device to take an action, requesting an output device to take an action, or any other actions.

In operation, a user may log into a website provided by the server 112 and provide an image of his driver's license (e.g., server 112 may activate a camera associated with the electronic device operated by client 124 and the client 124 may use the camera to capture an image of his driver's license). Server 112 may then perform OCR and parse data associated with the user's driver's license. Server 112 may then query one or more databases (e.g., database 126) and retrieve data associated with the user and may generate a customized reflexive questionnaire or a pre-populated reflexive questions (or both), which is customized for the user based on the retrieved user-specific data. For example, if the data retrieved from the user indicates that the user has been prescribed a certain drug, the server 112 may then include one or more questions specific to that drug based on the pre-determined rules established by spreadsheets described in FIG. 7. The server 112 may also prepopulate the reflexive questionnaire with the user's data (e.g., age, address, height, medical condition and the like). In a non-limiting example, if server 112 determines that the user has been prescribed anti-depressant drugs within the last five years (or any other threshold based on the rules of spreadsheet in FIG. 7), the server 112 may include one or more questions specific to that particular drug and/or depression, which otherwise (unless the user has been prescribed anti-depressant) would not have been displayed to the user. Furthermore, the server 112 may also display a (partial or full) pre-populated form where the user's information is prepopulated and the user is provided with an option to accept or modify the prepopulated data.

Figure 14:
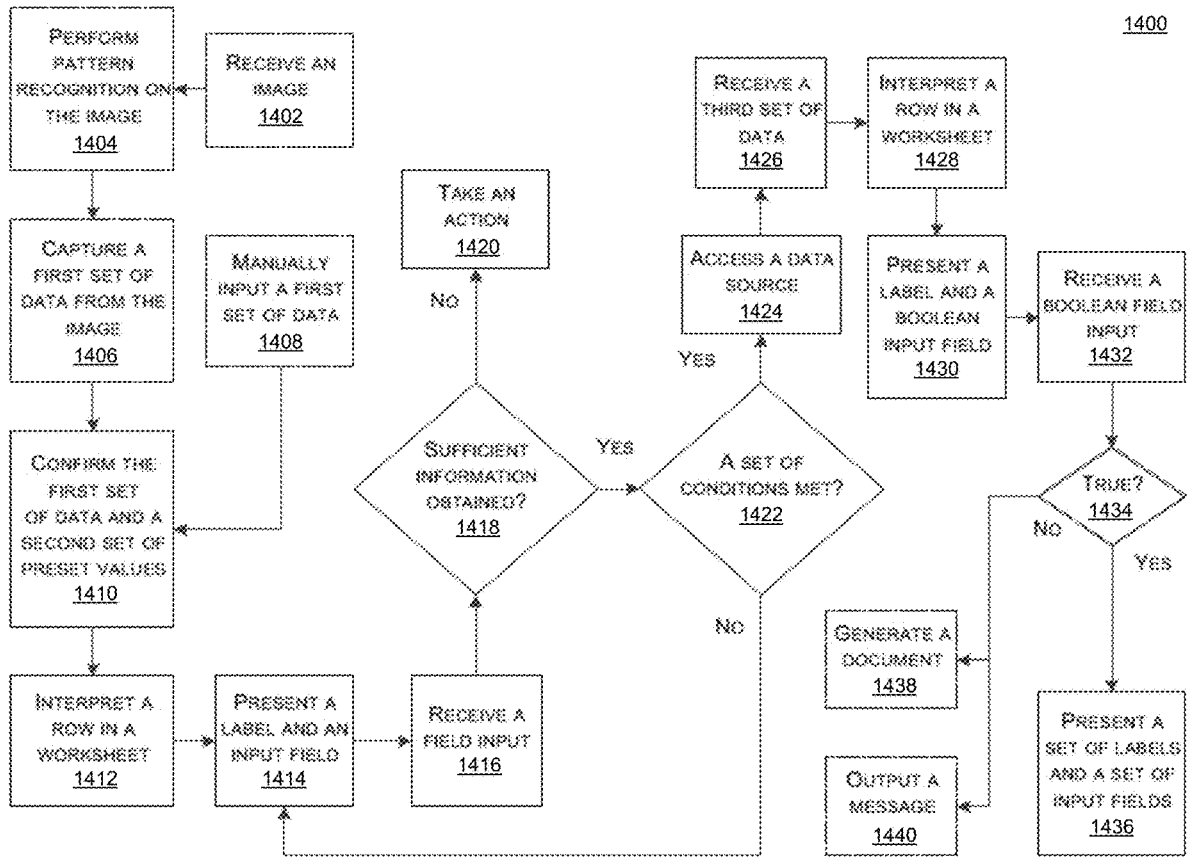
FIG. 14 shows an embodiment of a process employing a worksheet according to an embodiment.

FIG. 14 shows an embodiment of a process employing a worksheet according to this disclosure. A process 1400 includes a plurality of blocks 1402-1442. The process 1400 can be performed via the topology 1100 of FIG. 11, in whole or in part.

In a block 1402, the server 112 receives an image from the client 124 over the WAN 102, as disclosed herein. The image can be a photo or a video, whether captured via a camera of the client 124 or another device. For example, the image can depict a driver's license. The image can be received via an email, a chat, a text message, or an upload via a network page served by the server 112 to the client 124 over the WAN 102, such as when the network page is accessed via a present hyperlink.

In a block 1404, the server 112 performs a pattern recognition on the image. The pattern recognition can include an OCR process. The pattern recognition can be fully or partially performed on the server 112.

In a block 1406, the server 112 captures a first set of data from the image based on the pattern recognition. For example, when the image depicts a driver's license, then the server 112 can capture various data items from the image, such as personal information, address, biological information, identification number, or others. For example, the image can include a passport page with a photo of a passport holder. Note that such capture can include capturing data as depicted or combining various data items into a single data category. For example, such capture can include a capture of a height or weight as depicted in the image, such as 70 inches, 5'9, five feet and 11 inches, 2 meters, 180 pounds, 200, or 80 kilograms. For example, such capture can include capturing of a first address line and a second address line and combining/aggregation of the first address line and the second address line into a single address data item, such as street address and town name/zip code, such as based on positioning of such items in the image or content of such items.

In a block 1408, the server 112 can provide an interface to the client 124 over the WAN 102 in order to receive the first set of data. The interface can be provided as a network page, whether static or dynamic, programmed to contain a set of fields ready for population. In some embodiments, the set of fields is prepopulated with a set of default values and can be edited from the default values. The interface can allow for adding, editing, modifying, complimenting, or supplementing the first set of data. The interface can allow for receipt of the first set of data when the image is not captured or incorrectly captured or pattern recognition cannot be performed or adequately or correctly performed. In some embodiments, the interface is provided instead of receiving the image.

In a block 1410, the server 112 receives an input from the client 124 over the WAN 102. The input confirms the first set of data, such as captured from the image, and a second set of preset values, which may be responsively retrieved from the data source 126 based on the first set of data.

In a block 1412, the server 112 interprets a row in a worksheet, as disclosed herein. The interpretation is based on the first set of data and the second set of data applying to a logic in the row, as disclosed above (for example in FIG. 7).

In a block 1414, the server 112 presents a label and an input field in a network page, such as a webpage. The label and the input field are generated and inserted in the network page, whether dynamically or statically, based on the block 1412. The input field can be of any type, such as a textbox, a checkbox, a dial, a slider, a button, a hyperlink, or others.

In a block 1416, the server 112 receives a field input as input into the input field of the block 1414. The input field can modify the label.

In a block 1418, the server 112 determines if sufficient information has been obtained so far. Such determination takes place based a comparison of a current set of parameters obtained so far against a baseline set of parameters (e.g., predetermined thresholds). If a preset amount of the current set of parameters matches or does not match against the baseline set of parameters, then a determination can be made if sufficient information has been obtained so far. For example, in a context of an application intake for a service, if information obtained so far is sufficient to decline a user for the service, then an action, such as a decline message output, can be taken. If sufficient information has been obtained so far, then a block 1422 is performed, otherwise a block 1420 is performed.

In the block 1420, the server 112 takes an action, which may be local or remote, whether a single action or multiple actions. For example, the action may be instructed in the worksheet. The action can be of any type, such as generating a message, sending a message, receiving a message, acting on a data structure, an image, a sound, a record, a field, a file, a stream, a string, a text, a worksheet, a document, a database, or any other content/structure where the acting may include modifying, editing, supplementing, deleting, reading, writing, sorting, de-duplicating, archiving, or any other data operations, querying a data source, retrieving a set of data, requesting for an input device to take an action, requesting an output device to take an action, or any other actions. For example, in a context of an application intake for a service an action can include a generation and sending of a decline message output to the client 124 over the WAN 102.

In the block 1422, the server 112 determines if a set of conditions have been met. Such determination may include a comparison of a currently collected/gathered set of data against a set of thresholds or conditions. For example, such comparison may involve a determination if appropriate input fields, such as checkboxes being checked off, from a network page, as noted above. If not, then the block 1414 is performed, otherwise a block 1424 is performed.

In the block 1424, the server 112 can access a data source, such as the data source 126 over the WAN 102. Note that the data source can include a single data source or a plurality of data sources, whether operated via a single operator or a plurality of operators, whether on a single communication network or a plurality of communication networks, whether identical or different from each other. Such access may involve the server 112 querying the data source 126 for a set of data associated with a set of data collected/gathered so far, such as the first set of data, the second set of preset values, the field input, or others. For example, the data source 126 may host or provide access to a database record associated with the identifier, where the set of data associated with the identifier is at least partially extracted or copied from the database record. The set of data may be formatted or raw, encrypted or unencrypted. The set of data may include alphanumeric data, image data, sound data, or other types of data. For example, the database record may be an electronic health record or medical prescription record.

In a block 1426, the server 112 receives a third set of data from the data source based on the block 1424. The third set of data may be formatted or raw, encrypted or unencrypted. The third set of data may include alphanumeric data, image data, sound data, or other types of data. Note that the block 1426 can be iterated or repeated, such as via a function or a loop, such as a while-loop or a for-loop, in some embodiments, to include more than three sets of data, such as four, eight, ten, twenty, fifty three, ninety four, one hundred, or even more.

In a block 1428, the server 112 interprets a row in a worksheet, as disclosed herein. The interpretation is based on a set of data collected/gathered so far, such as the first set of data, the second set of preset values, the field input, the third set of data, or others. Note that the row can include a single row or a plurality of rows, whether in a single worksheet or a plurality of worksheets, whether in a single data structure, such as an array, a file, a stream, or a record, or a plurality of data structures, whether identical or different from each other in structure. For example, as disclosed herein, the server 112 can interpret a plurality of rules stored in a plurality of cells in a plurality of rows of a worksheet, as per a set of metadata design, whether descriptive, structural, or administrative, and can also call for other functions, whether local or remote, such as a remote-procedure call (RPC), or devices/machines in order to perform more complex functions. In some embodiments, this data may even be passed to a model, such as stored in a file or a record, housed on a separate server and a response to such pass may be factored into an output, which may be or include a final output.

In a block 1430, the server 112 presents a label and a Boolean input field to the client 124 over the WAN 102. The label and the Boolean input field are generated and inserted in a network page, whether dynamically or statically, based on the block 1428. The Boolean input field can be of any type, such as a checkbox or others. However, note that this Boolean format is illustrative and other formats can be used, such as a text format, whether raw or formatted, an alphanumeric format, a symbolic format, an image format, a sound format, or any other type of data in any format may be used.

In a block 1432, the server 112 receives a Boolean field input form the client 124 over the WAN 102. For example, the Boolean field input can be true or false, 1 or 0, black or white, yes or no, or others. For example, the Boolean field input can be based on the label requesting a confirmation of presented information being correct or incorrect or known or unknown. However, note that this Boolean format is illustrative and other formats can be used, such as a text format, whether raw or formatted, an alphanumeric format, a symbolic format, an image format, a sound format, or any other type of data in any format may be used.

In a block 1434, the server 112 evaluates the Boolean field input against a logic in a worksheet. If true, then a block 1436 is performed, otherwise at least one of a block 1438 or a block 1440 may be performed. In some embodiments, the input received from the user may also be compared with the third set of data received in block 1426. For example, if the third set of data indicates that the user is a smoker, the Boolean label may inquire whether the user is a smoker; the server 112 may then determine whether the user's answer (input in block 1432) matches the third set of data (e.g., whether the user is truthful about being a smoker). In some other embodiments, the input received in block 1432 may be used to determine whether the user qualifies to continue with the reflexive questionnaire or not. For example, if the third set of data indicates that the user is currently enrolled for a service and the user confirms said indication, the server 112 may notify the user that the user is no longer qualified to continue with the reflexive questionnaire.

In the block 1436, the server 112 presents a set of labels and a set of input fields on a network page, which are sourced or generated based on a worksheet, as disclosed herein. The network page is presented on the client 124 over the WAN 102. The network page may be static or dynamic, as generated by the server 112. For example, in an application for a service process, if an abridged or shortened set of questions are not able to sufficiently qualify a user for the service, as determined via continuing comparison against a set of data, whether local or remote, then a full or long set of questions are presented for qualifying the user for the service.

In the block 1438, the server 112 generates a document, such as an electronic document or a record. For example, the document can include a file, such as a spreadsheet file or a word processor file, which may be formatted in a specified manner, including data population, such as user personal information or other information gathered/collected so far. The server 112 can share the document, such as with the client 124 over the WAN 102. For example, the document can include a service policy containing a set of rules and conditions. For example, the document, including format, positioning, and content, can be generated based on a worksheet, as disclosed herein.

In the block 1440, the server 112 can output a message, whether pre-generated or generated in real-time, such as via a worksheet, as disclosed herein. The message may contain content informing a user of qualification for the service or of the block 1438. The message can be output to the client 124 over the WAN 102.

In a non-limiting example, the user may log into a website provided by server 112, capture an image of his driver's license using a mobile device, and transmit the image to server 112. Upon receiving the captured image, server 112 may perform OCR in order to parse and extract identification data associated with the user. For example, server 112 may extract the user's residential address and his date of birth. Server 112 may further use the extracted data to retrieve user information from one or more data sources (e.g., database 126 as described above). Server 112 may then display a first set of reflexive questions (e.g., one or more questions) where one or more questions are prepopulated. For example, server 112 may display a question inquiring about the user's address. However, the input field may already be prepopulated with the identification data extracted from his driver's license. The user may then confirm, deny, or modify the prepopulated data. For example, the user may confirm that he resides in New York. Upon receiving the above-mentioned confirmation, server 112 may then evaluate the user's state of residence based on one or more logic cells within the logic spreadsheet (as shown in FIG. 7) and may dynamically render the next set of questions based on the user's confirmed state of residence. For example, if the user confirms that he resides in New York, server 112 may then display a follow up question, which is only applicable to New York residents.

In another non-limiting example, server 112 may also pre-populate the first set if reflexive questions with the user data received from the one or more data sources. For example, server 112 may user the identification data extracted from the user's driver's license, retrieve user information, and determine that the user has a five-year-old son. Server 112 may then evaluate the retrieved information based on one or more logic cells within the logic spreadsheet (as shown in FIG. 7) and may dynamically render the next set of questions in a manner customized to the user. For example, server 112 may render one or more questions inquiring about the user's son (e.g., age, medical conditions, and the like). In this way, server 112 may only display questions regarding users' children to those users who have children. In another example, if New York law requires users to respond to specific set of question (e.g., extra questions), server 112 may only display said questions to New York residence. As mentioned before, server 112 ensures a positive user experience by eliminating (e.g., not displaying) irrelevant questions based on users' attributes.

Various embodiments of the present disclosure may be implemented in a data processing system suitable for storing and/or executing program code that includes at least one processor, including a multicore processor, coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language, "R" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity or actor in any manner.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

Furthermore, relative terms such as "below," "lower," "above," and "upper" can be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

The terminology used herein is for describing particular example embodiments and is not intended to be necessarily limiting of the present disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof.

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

As used herein, the term "about" and/or "substantially" refers to a +/−10% variation from the nominal value/term. Such variation is always included in any given.

If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

What is claimed is:

1. A method comprising:
   causing, by a server, a user interface to be presented on a client, wherein the user interface is programmed to receive a selection of an image depicting a set of data;
   receiving, by the server, a copy of the image based on the selection;
   determining, by the server, a pattern in the set of data sourced from the copy;
   querying, by the server, a database based on the pattern;
   accessing, by the server, a spreadsheet containing a plurality of rows each having a plurality of cells among which a plurality of text statements, data type identifiers, and logic statements are linearly distributed;
   causing, by the server, the user interface to present a reflexive questionnaire having a plurality of first questions and a plurality of first user input fields, wherein the first user input fields correspond to the first questions, wherein the first questions and the first user input fields are generated based on the text statements and the data type identifiers sourced from the spreadsheet, wherein the first user input fields are prepopulated with a content based on the query; and
   updating, by the server, the user interface such that the reflexive questionnaire presents a plurality of second questions and a plurality of second user input fields based on the content satisfying the logic statements, wherein the second user input fields correspond to the second questions, wherein the second questions and the second user input fields are generated based on the text statements and the data type identifiers sourced from the spreadsheet.

2. The method of claim 1, wherein the client runs a browser application, wherein the server causes the user interface to be presented via the browser application.

3. The method of claim 1, wherein the client runs a non-browser application, wherein the server causes the user interface to be presented via the non-browser application.

4. The method of claim 1, wherein the server evaluates the content as prepopulated against the logic statements.

5. The method of claim 1, wherein the server evaluates the content as user modified against the logic statements.

6. The method of claim 1, wherein the set of data includes a set of alphanumeric data, wherein the server recognizes the pattern based on an optical character recognition process on the set of alphanumeric data.

7. The method of claim 1, wherein the set of data includes a face, wherein the server recognizes the pattern based on a facial recognition process on the face.

8. The method of claim 7, wherein the image is a first image, wherein the face is a first face, and further comprising:
   receiving, by the server, a second image from the client, wherein the second image depicts a second face; and
   performing, by the server, a determination whether the first face matches the second face, wherein the query is generated based on the first face matching the second face.

9. The method of claim 7, wherein the image is a first image, wherein the face is a first face, and further comprising:
   receiving, by the server, a second image from the client, wherein the second image depicts a second face, wherein the query includes the first face and the second face.

10. The method of claim 1, wherein the client is operated by a user, wherein the pattern is at least one of a physical information associated with the user or a demographic information associated with the user.

11. A system comprising:
    a server programmed to:
    cause a user interface to be presented on a client, wherein the user interface is programmed to receive a selection of an image depicting a set of data;
    receive a copy of the image based on the selection;
    determine a pattern in the set of data sourced from the copy;
    query a database based on the pattern;
    access a spreadsheet containing a plurality of rows each having a plurality of cells among which a plurality of text statements, data type identifiers, and logic statements are linearly distributed;
    cause the user interface to present a reflexive questionnaire having a plurality of first questions and a plurality of first user input fields, wherein the first user input fields correspond to the first questions, wherein the first questions and the first user input fields are generated based on the text statements and the data type identifiers sourced from the spreadsheet, wherein the first user input fields are prepopulated with a content based on the query; and
    update the user interface such that the reflexive questionnaire presents a plurality of second questions and a plurality of second user input fields based on the content satisfying the logic statements, wherein the second user input fields correspond to the second questions, wherein the second questions and the second user input fields are generated based on the text statements and the data type identifiers sourced from the spreadsheet.

12. The system of claim 11, wherein the client runs a browser application, wherein the server is programmed to cause the user interface to be presented via the browser application.

13. The system of claim 11, wherein the client runs a non-browser application, wherein the server is programmed to cause the user interface to be presented via the non-browser application.

14. The system of claim 11, wherein the server is programmed to evaluate the content as prepopulated against the logic statements.

15. The system of claim 11, wherein the server is programmed to evaluate the content as user modified against the logic statements.

16. The system of claim 11, wherein the set of data includes a set of alphanumeric data, wherein the server is programmed to recognize the pattern based on an optical character recognition process on the set of alphanumeric data.

17. The system of claim 11, wherein the set of data includes a face, wherein the server is programed to recognize the pattern based on a facial recognition process on the face.

18. The system of claim 17, wherein the image is a first image, wherein the face is a first face, wherein the server is programmed to:
    receive a second image from the client, wherein the second image depicts a second face; and
    perform a determination whether the first face matches the second face, wherein the query is generated based on the first face matching the second face.

19. The system of claim 17, wherein the image is a first image, wherein the face is a first face, wherein the server is programmed to:
  receive a second image from the client, wherein the second image depicts a second face, wherein the query includes the first face and the second face.

20. The system of claim 11, wherein the client is operated by a user, wherein the pattern is at least one of a physical information associated with the user or a demographic information associated with the user.

\* \* \* \* \*